United States Patent
Fein et al.

(10) Patent No.: US 8,928,695 B2
(45) Date of Patent: Jan. 6, 2015

(54) FORMATTING OF ONE OR MORE PERSISTENT AUGMENTATIONS IN AN AUGMENTED VIEW IN RESPONSE TO MULTIPLE INPUT FACTORS

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 37 days.

(21) Appl. No.: 13/646,147

(22) Filed: Oct. 5, 2012

(65) Prior Publication Data
US 2014/0098125 A1 Apr. 10, 2014

(51) Int. Cl.
*G09G 5/00* (2006.01)
*G06F 3/01* (2006.01)
*G06T 19/00* (2011.01)
*G06T 11/00* (2006.01)

(52) U.S. Cl.
CPC .............. *G06F 3/011* (2013.01); *G06T 19/006* (2013.01); *G06T 11/00* (2013.01)
USPC ........... 345/633; 345/629; 345/630; 345/631; 345/632; 715/757

(58) Field of Classification Search
CPC ....... G06T 19/006; G06T 19/00; G06F 3/011; G06F 3/012; G06F 3/0304
USPC .................................. 345/629–633; 715/757
See application file for complete search history.

(56) References Cited

U.S. PATENT DOCUMENTS 6,774,898 B1 * 8/2004 Katayama et al. ............ 345/428
6,891,563 B2 5/2005 Schofield et al.
(Continued)

FOREIGN PATENT DOCUMENTS

KR 10-2012-0066552 A 6/2012
WO WO 2012/108721 A2 8/2012

OTHER PUBLICATIONS

Doobybrain; "GE's Augmented Reality Demo"; YouTube; uploaded Feb. 4, 2009; pp. 1-2; located at: http://www.youtube.com/watch?v=00FGtH5nkxM.

(Continued)

*Primary Examiner* — Xiao Wu
*Assistant Examiner* — Todd Buttram

(57) ABSTRACT

Computationally implemented methods and systems include presenting a first augmented view of a first scene from a real environment, the first augmented view to be presented including one or more persistent augmentations in a first one or more formats, the inclusion of the one or more persistent augmentations in the first augmented view being independent of presence of one or more visual cues in the actual view of the first scene from the real environment, obtaining an actual view of a second scene from the real environment that is different from the actual view of the first scene, and presenting a second augmented view of the second scene from the real environment, the second augmented view to be presented including the one or more persistent augmentations in a second one or more formats that is based, at least in part, on multiple input factors.

41 Claims, 29 Drawing Sheets

(56) References Cited

U.S. PATENT DOCUMENTS

| | | | |
|---|---|---|---|
| 7,119,829 B2 * | 10/2006 | Leonard et al. | 348/14.16 |
| 7,690,975 B2 * | 4/2010 | Watanabe et al. | 463/1 |
| 8,116,526 B2 * | 2/2012 | Sroka et al. | 382/103 |
| 8,184,070 B1 | 5/2012 | Taubman | |
| 8,188,880 B1 | 5/2012 | Chi et al. | |
| 8,203,605 B1 | 6/2012 | Starner | |
| 8,402,356 B2 * | 3/2013 | Martinez et al. | 715/201 |
| 2001/0030654 A1 | 10/2001 | Iki | |
| 2002/0144259 A1 * | 10/2002 | Gutta et al. | 725/10 |
| 2003/0210832 A1 | 11/2003 | Benton | |
| 2004/0113885 A1 | 6/2004 | Genc et al. | |
| 2008/0071559 A1 | 3/2008 | Arrasvuori | |
| 2009/0167787 A1 | 7/2009 | Bathiche et al. | |
| 2009/0182499 A1 | 7/2009 | Bravo | |
| 2009/0237328 A1 * | 9/2009 | Gyorfi et al. | 345/9 |
| 2009/0300535 A1 | 12/2009 | Skourup et al. | |
| 2009/0322671 A1 | 12/2009 | Scott et al. | |
| 2010/0104185 A1 * | 4/2010 | Johnson et al. | 382/173 |
| 2010/0214284 A1 * | 8/2010 | Rieffel et al. | 345/419 |
| 2010/0328344 A1 | 12/2010 | Mattila et al. | |
| 2011/0055049 A1 | 3/2011 | Harper et al. | |
| 2011/0074658 A1 | 3/2011 | Sato | |
| 2011/0134108 A1 * | 6/2011 | Hertenstein | 345/419 |
| 2011/0141254 A1 | 6/2011 | Roebke et al. | |
| 2011/0164163 A1 * | 7/2011 | Bilbrey et al. | 348/333.01 |
| 2011/0227820 A1 | 9/2011 | Haddick et al. | |
| 2011/0292220 A1 * | 12/2011 | Georgis et al. | 348/207.1 |
| 2012/0025975 A1 | 2/2012 | Richey et al. | |
| 2012/0062596 A1 | 3/2012 | Bedi et al. | |
| 2012/0105475 A1 | 5/2012 | Tseng | |
| 2012/0113140 A1 | 5/2012 | Hilliges et al. | |
| 2012/0113274 A1 | 5/2012 | Adhikari et al. | |
| 2012/0116920 A1 | 5/2012 | Adhikari et al. | |
| 2012/0120101 A1 | 5/2012 | Adhikari et al. | |
| 2012/0120113 A1 | 5/2012 | Hueso | |
| 2012/0133650 A1 | 5/2012 | Lee | |
| 2012/0154638 A1 | 6/2012 | Chou | |
| 2012/0176410 A1 | 7/2012 | Meier et al. | |
| 2012/0194549 A1 * | 8/2012 | Osterhout et al. | 345/633 |
| 2012/0206323 A1 | 8/2012 | Osterhout et al. | |
| 2012/0223966 A1 | 9/2012 | Lim | |
| 2012/0244907 A1 | 9/2012 | Athsani et al. | |
| 2012/0246027 A1 | 9/2012 | Martin | |
| 2012/0249416 A1 * | 10/2012 | Maciocci et al. | 345/156 |
| 2012/0249591 A1 | 10/2012 | Maciocci et al. | |
| 2012/0268491 A1 * | 10/2012 | Sugden et al. | 345/633 |
| 2012/0269494 A1 | 10/2012 | Satyanarayana et al. | |
| 2012/0293548 A1 | 11/2012 | Perez et al. | |
| 2012/0306920 A1 | 12/2012 | Bathiche et al. | |
| 2012/0327119 A1 | 12/2012 | Woo et al. | |
| 2012/0329432 A1 * | 12/2012 | Gupta et al. | 455/414.1 |
| 2013/0044128 A1 * | 2/2013 | Liu et al. | 345/633 |
| 2013/0050258 A1 * | 2/2013 | Liu et al. | 345/633 |
| 2013/0057577 A1 * | 3/2013 | Jeong | 345/629 |
| 2013/0076788 A1 * | 3/2013 | Ben Zvi | 345/633 |
| 2013/0278631 A1 * | 10/2013 | Border et al. | 345/633 |
| 2014/0002357 A1 * | 1/2014 | Pombo et al. | 345/158 |

OTHER PUBLICATIONS

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.com/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses-Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtube.com/watch?v=QoZRHLmUKtM.

Vuzix-View the Future Today Home page; bearing a date of Sep. 18, 2012, printed on Sep. 27, 2012; p. 1; Vuzix; located at: http://www.vuzix.com/home/.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; Jul. 17, 2014; pp. 1-4.

PCT International Search Report; International App. No. PCT/US2014/025604; Jul. 11, 2014; pp. 1-3.

PCT International Search Report; International App. No. PCT/US2014/025669; Jul. 9, 2014; pp. 1-3.

PCT International Search Report; International App. No. PCT/US2014/025579; Jul. 29, 2014; pp. 1-4.

PCT International Search Report; International App. No. PCT/US2014/016022; Jun. 6, 2014; pp. 1-3.

* cited by examiner

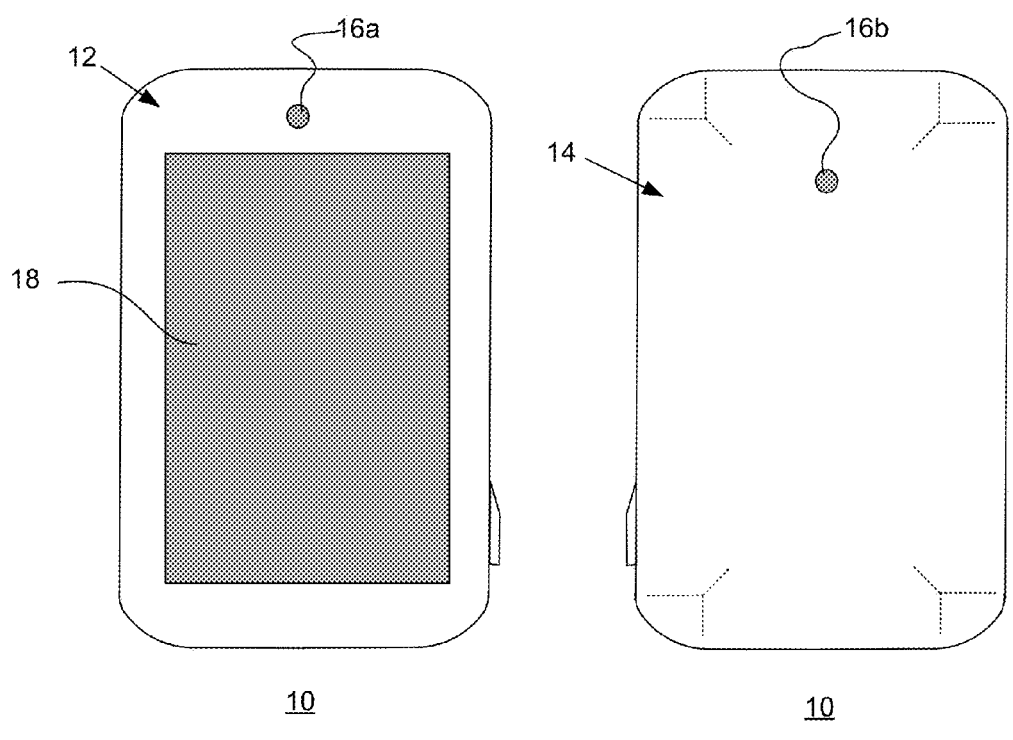
Smartphone implementation

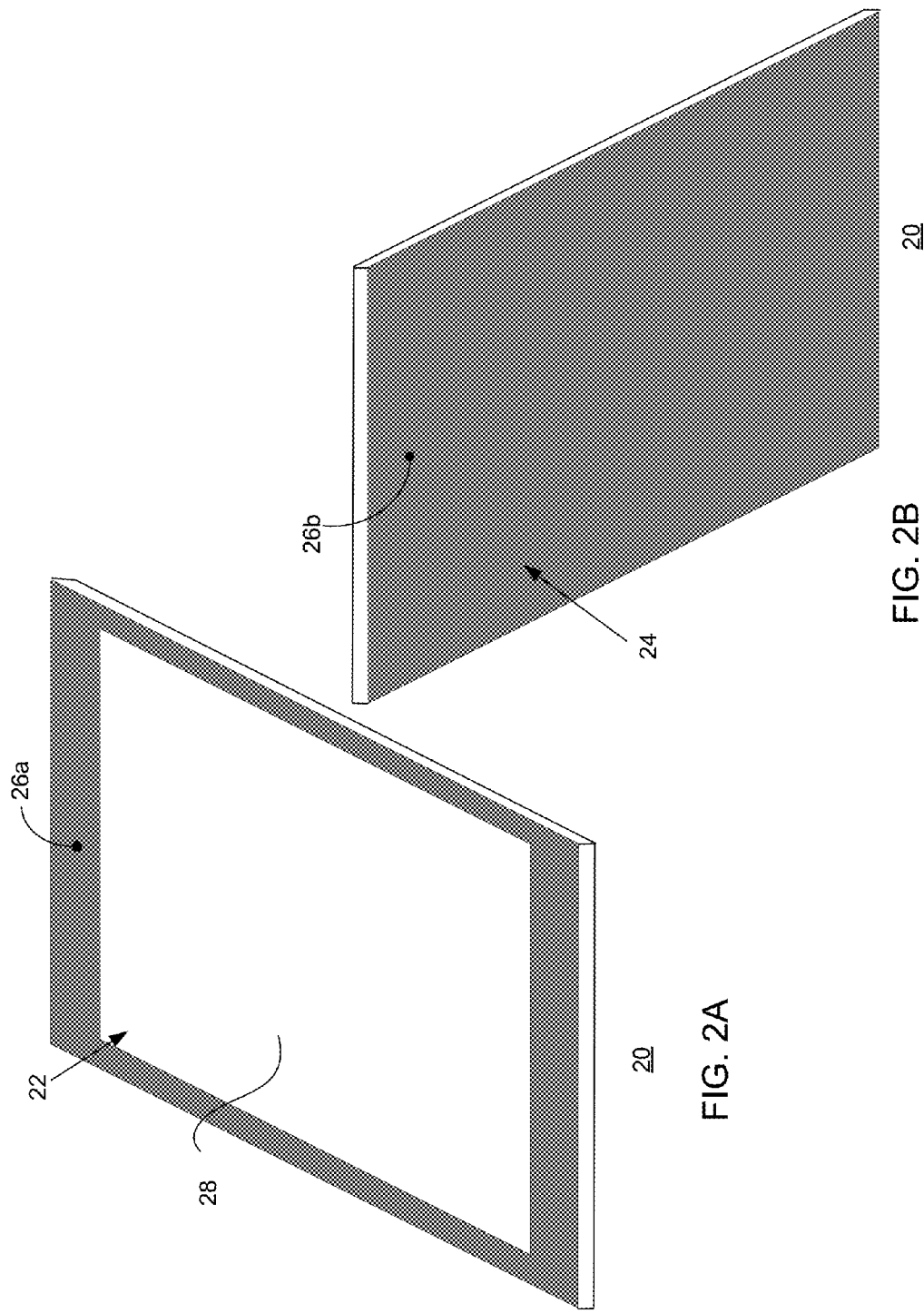

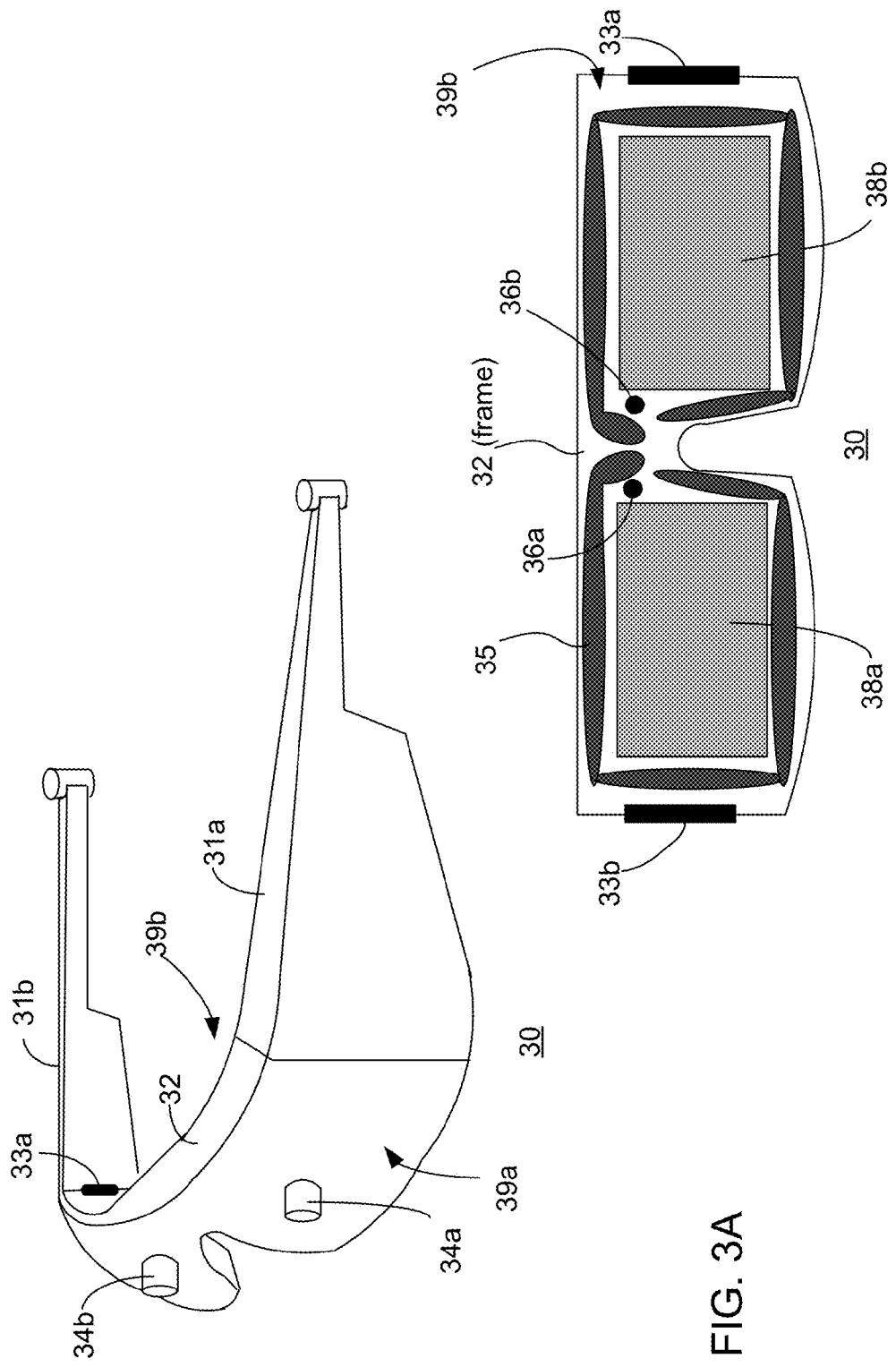

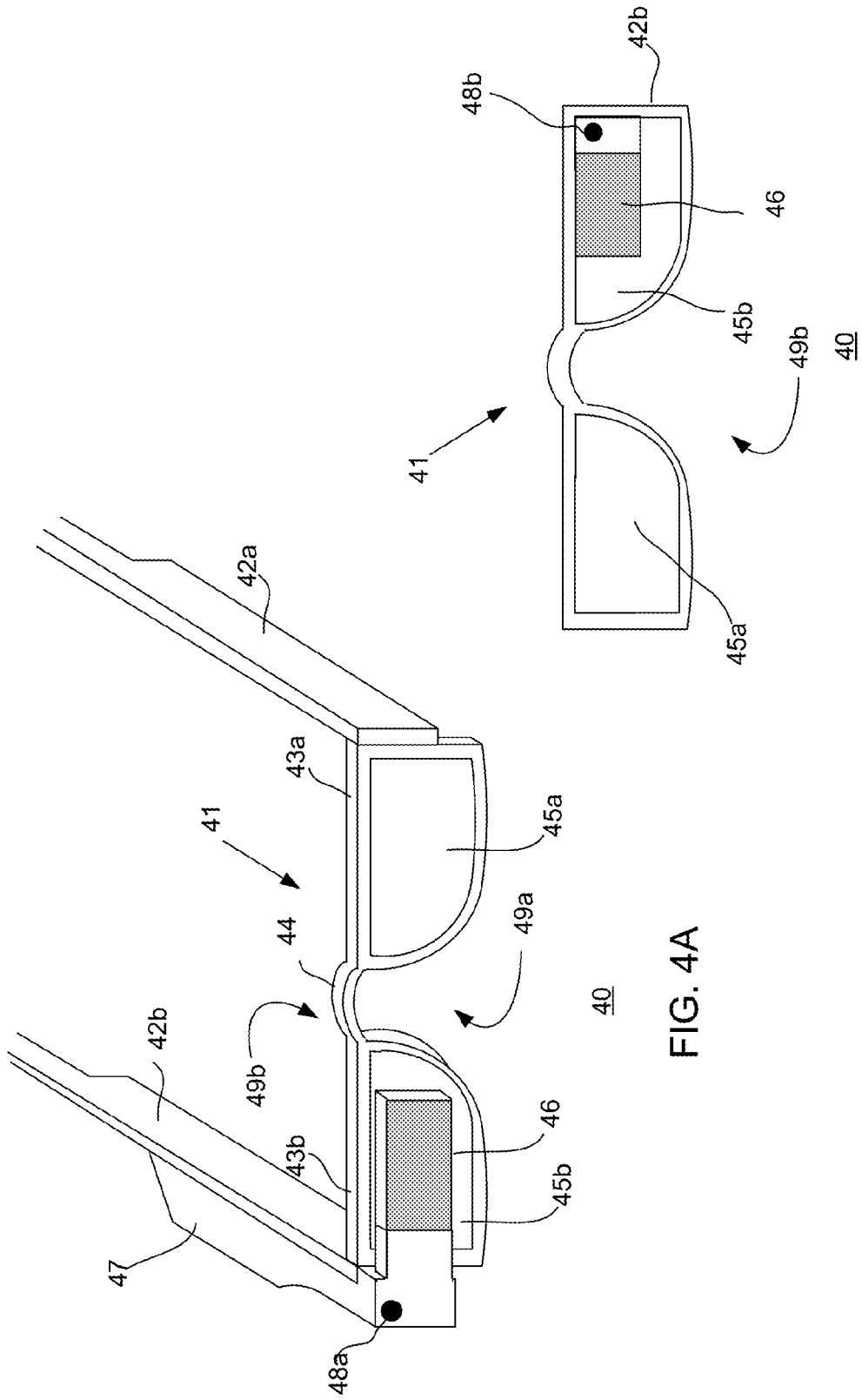

Actual View 60a

Aug View 60b

Aug View 60c

Aug view 60d

Aug View 60e

Aug View 60f - stockmarket

Aug View 60g

Actual View 60h

Aug View 60i

Actual View 60k

Aug View 60m

Aug View 60n

Actual View 60p

PA 61e

Aug View 60q

Aug View 60r

PA 61f

110 User Interface
- 852 Display[s] - touchscreen
- 854 Visual Capturing Device[s]
- 856 Audio Speaker[s]
- 858 Audio Input Device[s]
- 860 Keyboard/keypad

FIG. 8B

120 Sensor[s]
- 870 Camera[s]
- 872 Audio Sensor[s]
- 874 Location Sensor[s]
  - 875 GPS
- 876 Orientation/Movement Sensor[s]
  - 877 Accelerometer[s]
  - 878 Gyroscope[s]
  - 879 Inertia Sensor[s]
  - 880 Pedometer[s]
- 882 User Physiological Sensor[s]
  - 883 Blood Pressure Sensor[s]
  - 884 Pulse/Heart Rate Sensor[s]
  - 885 Blood Sugar Sensor[s]

FIG. 8C

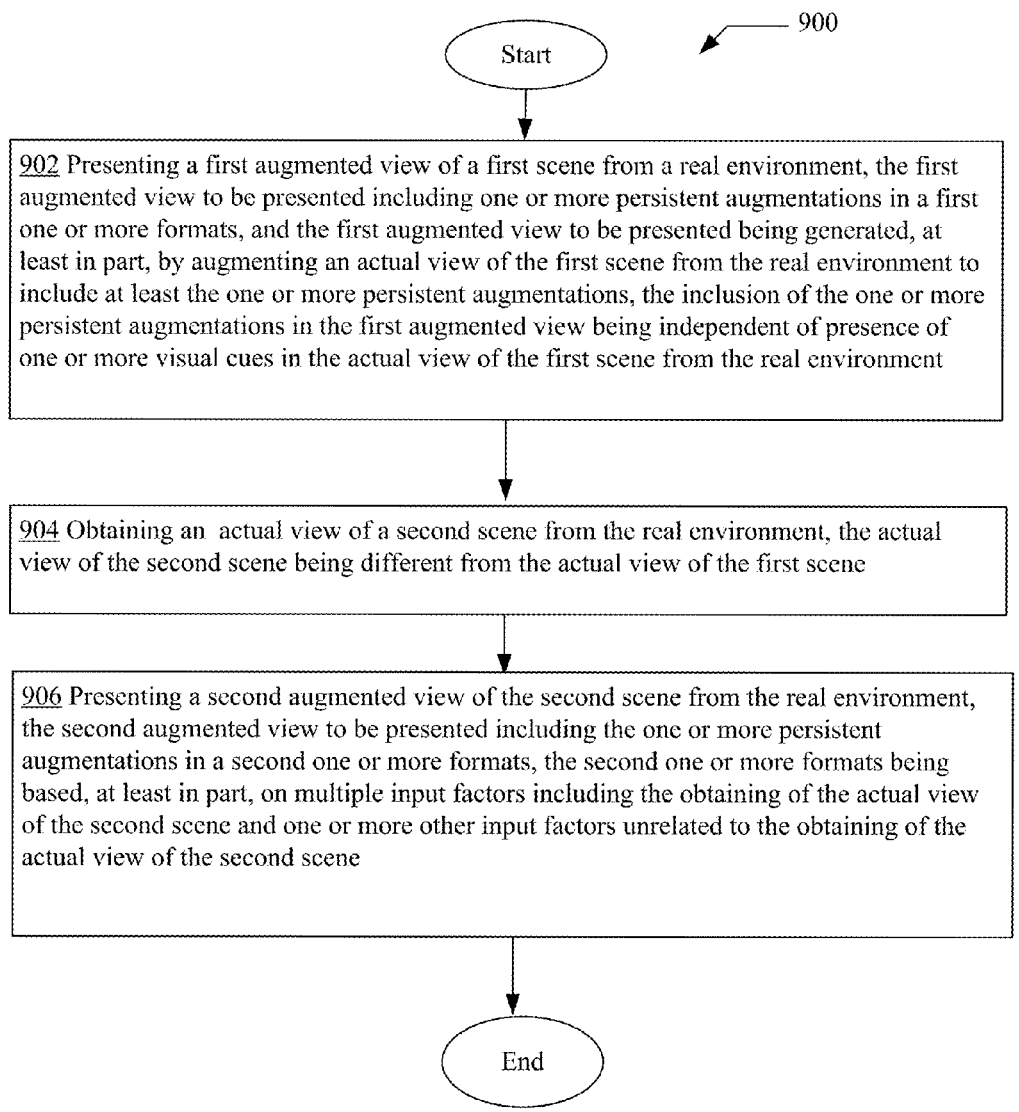

902 Presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment 904 Obtaining an actual view of a second scene from the real environment, the actual view of the second scene being different from the actual view of the first scene 906 Presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene

FIG. 9

FORMATTING OF ONE OR MORE PERSISTENT AUGMENTATIONS IN AN AUGMENTED VIEW IN RESPONSE TO MULTIPLE INPUT FACTORS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications

None

Related Applications

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, obtaining an actual view of a second scene from the real environment, the actual view of the second scene being different from the actual view of the first scene, and presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, means for obtaining an actual view of a second scene from the real environment, the actual view of the second scene being different from the actual view of the first scene, and means for presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. In addition to the foregoing, other system aspects are described in the claims, drawings, and text forming a part of the disclosure set forth herein.

In one or more various aspects, a system includes, but is not limited to, circuitry for presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, circuitry for obtaining an actual view of a second scene from the real environment, the actual view of the second scene being different from the actual view of the first scene, and circuitry for presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, obtaining an actual view of a second scene from the real environment, the actual view of the second scene being different from the actual view of the first scene, and presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 1A and 1B show the front and back views of an augmented reality (AR) device that is in the form of a smartphone 10.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

FIG. 8B shows another perspective of the user interface 110 of FIGS. 7A and 7B.

FIG. 8C shows another perspective of the one or more sensors 120 of FIGS. 7A and 7B.

FIG. 9 is a high-level logic flowchart of a process, e.g., operational flow 900, according to some embodiments.

DETAILED DESCRIPTION

Figure 5A:
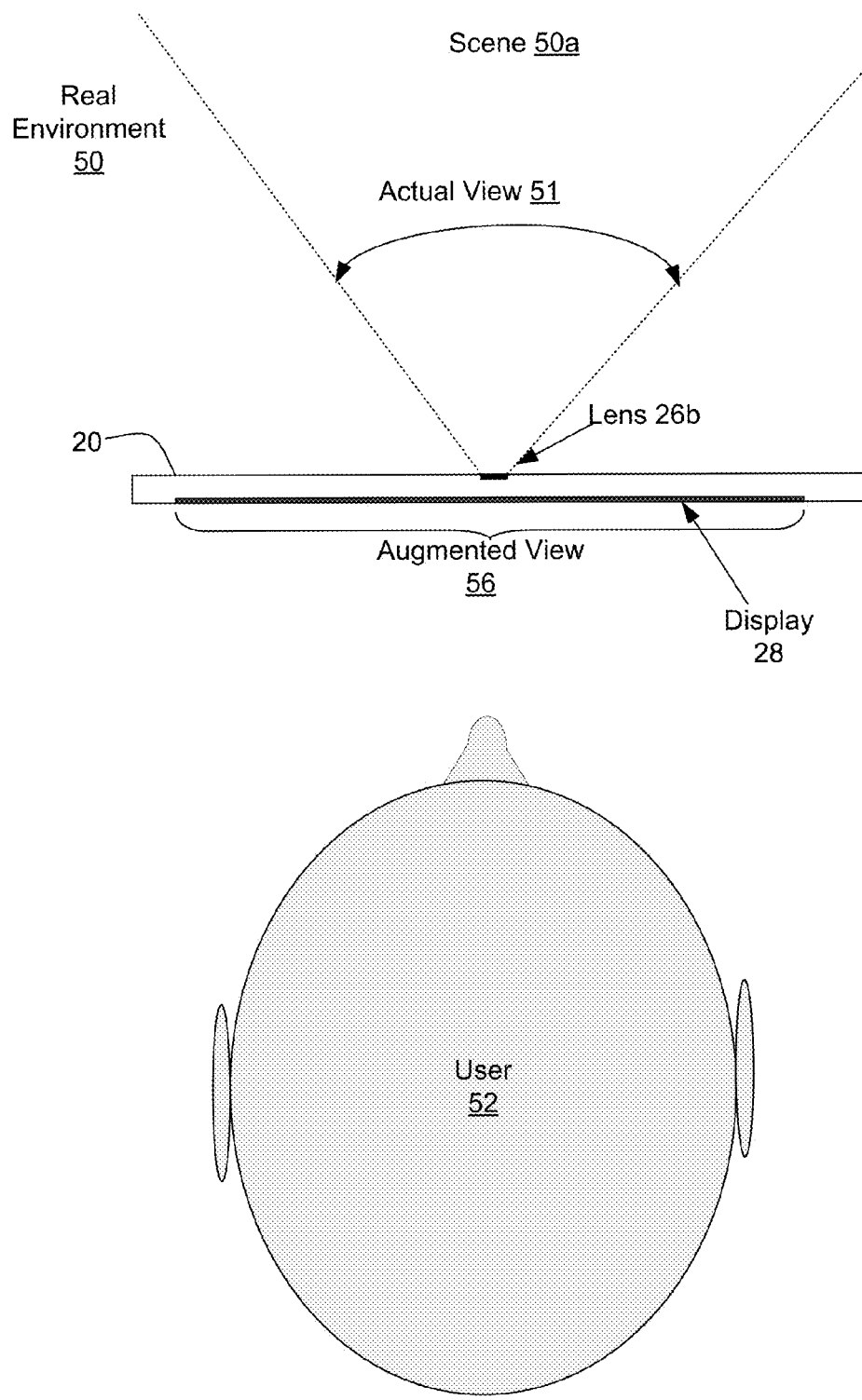
FIG. 5A shows a user 52 using the tablet computer 20 of FIGS. 2A and 2B in order to view the real environment 50.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene from a real environment" will be in reference to an actual or true (visual) scene from an actual physical environment (as opposed to a virtual environment or world) in the proximate vicinity of an AR system and/or the user of the AR system (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that is included in an augmented view of a scene from the real environment and that is not present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of head-mounted display (HMD) such as eyeglasses, goggles, helmet, and so forth. These devices are sometimes referred to as "wearable computing devices." Typically these wearable computing devices will include one or more features that allows the user to wear the device on his/or her head (e.g., a coupling device for coupling the AR device to a user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see temple 42a or 42b of FIG. 4A, or in the case of a helmet the helmet structure itself). Alternatively, a wearable computing device may be made wearable by having a feature (e.g., one or more clips or hooks) that allows it to be attached or clipped onto the frame of a pair glasses or goggles thus allowing the AR device to be coupled to the user's head.

All of these devices (e.g., specifically-designed AR systems and nonspecifically-designed AR systems) will usually have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, and so forth).

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a non-specifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for a forward-facing camera on the front-side 12 and lens 16b for a rear-facing camera on the back-side 14 of the smartphone 10. When employed to provide one or more augmented views of one or more scenes of real world environments, the display 18 may be used in order to display the augmented views. In some cases, the forward-facing camera associated with lens 16a may be used in order to track the gaze or focus of one or more eyes of a user. The rear-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for a forward-facing camera on the front-side 22 and lens 26b for a rear-facing camera on the back-side 24 of the tablet computer 20.

In some cases, the forward-facing camera associated with lens 26a may be used in order to track the gaze or focus of one or more eyes of a user. The rear-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left camera and a right lens 36b for a right camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze and focus of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the types of electronics (e.g., microprocessors, controllers, network interface card, memory, etc.) that are often found in mobile computing/communication devices such as the smartphone 10 or the tablet computer 20 described earlier.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 45, and electronics housing 47. The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45a, in alternative implementations, a second see-through display may be disposed over the left lens 45a.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze and focus of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze and focus of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as backward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses.

There are many types of augmentations that can be provided through AR systems including, for example, augmentations in the form of text that is added to an augmented view, an augmentation in the form of 2 or 3-dimensional item (which may or may not be an animated item that moves) that is added to an augmented view, and/or an augmentation that simply modifies, emphasizes, deletes, or de-emphasizes existing real world item (e.g., intensity of light, color of a car, removal of undesirable elements in the corresponding real field of view such as rubbish on the ground, etc.) in the augmented view.

One type of augmentation that many currently available AR systems can include into an augmented view of an actual scene of the real environment are vision-based augmentations that depend, for their existence in the augmented view, on the presence of one or more visual cues in the actual view of a scene from the real environment. That is, in many currently available AR systems, an augmentation will be included into an augmented view only when one or more visual cues are detected in the actual view of a scene from the real environment. In some cases, the visual cue or cues that may be the basis for the inclusion of the augmentation in the augmented view may be a visual marker (e.g., a recognizable symbol or pattern such as the word "Coke") that may have been purposefully placed in an actual scene of the real environment in order to prompt an AR system to insert a particular augmentation into the augmented view of the actual scene of the real environment. In other cases, the visual cue or cues may be any one or more recognizable or identifiable visual patterns (e.g., a human face or the dash of an automobile) that may be recognized using image feature analysis (e.g., image tracking such as Parallel Tracking).

There are, of course, other types of augmentations that currently available systems can provide or have been proposed that depend, for their existence in an augmented view, on factors other than visual cues in the actual views of scenes of the real environment. For example, in some cases, an augmentation could depend, for its existence in the augmented view, on the location and/or orientation of the AR system that is presenting (e.g., displaying and/or transmitting) the augmented view. Several currently available AR systems are designed to insert one or more augmentations into an augmented view based on the location of the AR system and/or which direction is the AR system "facing" (e.g., east, west, north, up, down, etc.).

For purposes of the following description, augmentations that may be included into augmented views of actual scenes of the real environment may also be categorized into at least two distinct groups: persistent augmentations and non-persistent augmentations. A non-persistent augmentation is an augmentation that depends on, for its existence in an augmented view of an actual scene of the real environment, the presence of one or more visual cues (e.g., markers or recognizable visual patterns) in the actual scene of the real environment. In contrast, a persistent augmentation is an augmentation that does not depend on, for its existence in an augmented view of an actual scene of the real environment, the presence (or absence) of any one or more visual cues in the actual scene of the real environment. That is, a persistent augmentation is an augmentation that may be included in multiple augmented views of different scenes of the real environment even when the different scenes have no common visual cues between them. In some cases, a persistent augmentation may be, for its existence in an augmented view of an actual scene of the real environment, independent of the location and/or orientation of the AR system presenting the augmented view.

In some cases, a persistent augmentation may be included into multiple augmented views of different scenes of the real environment when a user requests the insertion of the persistent augmentations in augmented views. That is, a user of an AR system (herein "AR device user") may input a command that a certain augmentation be always presented in his/her augmented views of the real environment. Examples of the types of persistent augmentations that a user may wish to see in his/her augmented views include, for example, time of day, user physiological data, listing of audio or textual electronic messages, environmental conditions such as humidity and local temperature, and so forth. There are, of course, countless ways to present (e.g., format) such augmentations. For example, and with respect to an augmentation that indicates time, such an augmentation can be presented in vastly different ways including as an old-fashion clock, as a digital clock, as a wristwatch/timer, and so forth. Of course, not all formats for a particular augmentation will be appropriate for every situation. That is, some augmentation formats (e.g., time augmentation format) may be very appropriate for some circumstances but may not be appropriate for other circumstances, particularly as they relate to the mood and/or atmosphere of the actual scenes of the real environment being augmented. As a quick illustration and as will be further described below, a user may wish to always have displayed on his augmented views of scenes from the real environment time information. In some cases, the user may wish to have the time information presented as an augmentation that is in the form of a digital clock, while in other situations the user may want the time information in an augmentation that is in the form of a chronograph wristwatch.

In accordance with various embodiments, computationally implemented methods, systems, circuitry, articles of manufacture, and computer program products are described herein that are designed to, among other things, format and present one or more persistent augmentations that are to be presented in one or more augmented views of one or more actual scenes of the real environment surrounding an AR device and/or its user, the formatting being reflective of the mood or atmosphere of the one or more actual scenes, where the mood or atmosphere being based on multiple input factors including visual factors associated with the one or more actual scenes. More particularly, the computationally implemented methods, systems, circuitry, articles of manufacture, and computer program products may be designed to, among other things, presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, obtaining an actual view of a second scene from the real environment, the actual view of the second scene being different from the actual view of the first scene, and presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. As will be further described herein, the methods, systems, circuitry, articles of manufacture, and computer program products may be implemented by the AR device 70\* of FIG. 7A or 7B. Note that for purposes of the following, "\*" represents a wildcard. Thus, references in the following to the AR device 70\* of FIG. 7A or 7B may be in reference to the AR device 70' of FIG. 7A or to the AR device 70" of FIG. 7B. Note further that the AR device 70\* of FIG. 7A or 7B may have a variety of form factors including any one of the form factors illustrated in FIGS. 1A, 1B, 2A, 2B, 3A, 3B, 4A, and 4B.

Figure 5B:
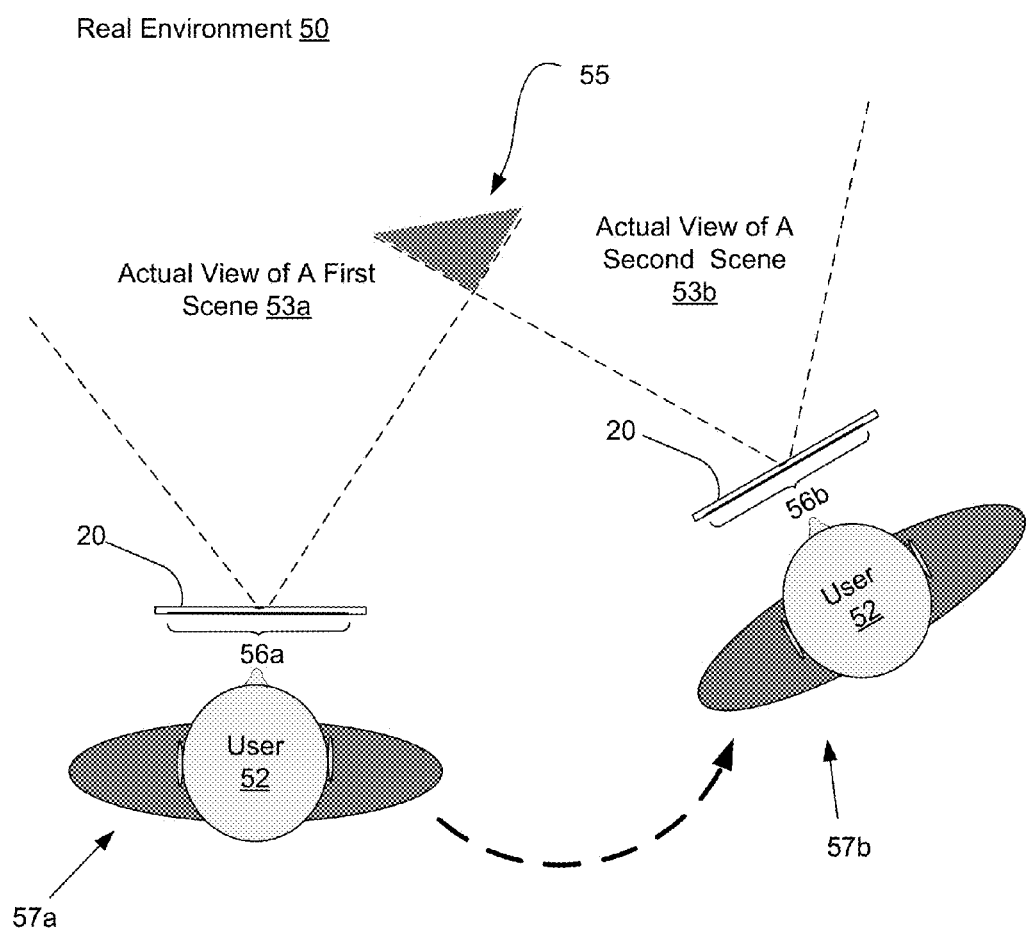
FIGS. 5B and 5C show the user 52 of FIG. 5A moving in space and using the tablet computer 20 to view different scenes from the real environment 50.
Figure 5C:
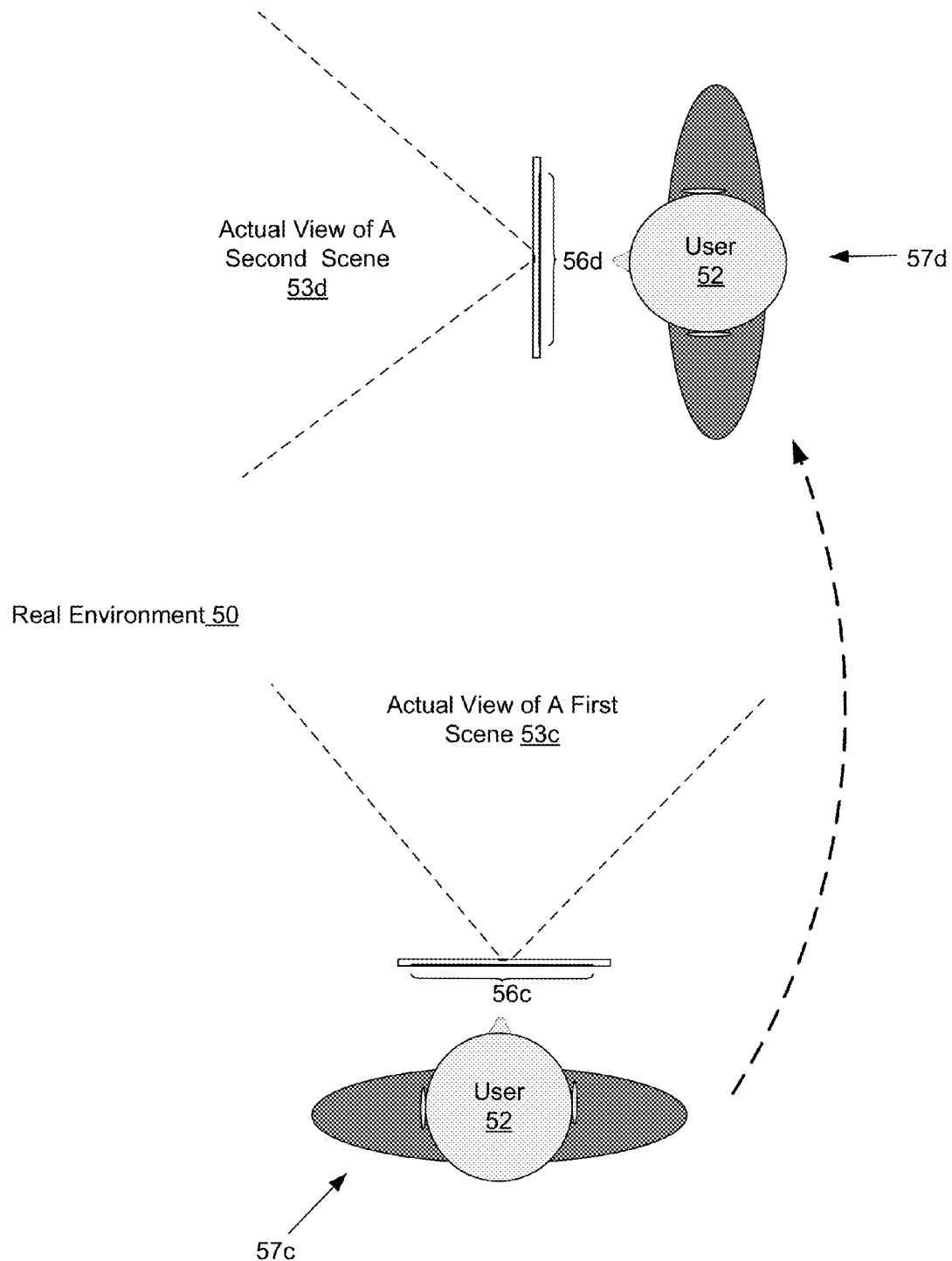

In order to further facilitate understanding of the various operations, processes, and systems to be described herein, certain concepts and terms will now be introduced and as illustrated in FIGS. 5A, 5B, and 5C. In particular, FIG. 5A is a top-down view of an AR user 52 (herein simply "user 52") using an AR device 70\* that is in the form of a tablet computer 20 illustrated in FIGS. 2A and 2B. Note that although the AR device illustrated here is in the form of a tablet computer 20, the concepts to be introduced here as well as in FIGS. 5B and 5C will apply to other AR devices having other form factors (e.g., smartphone, video goggles, electronic goggles, and so forth). Returning now to FIG. 5A which shows user 52 viewing an augmented view 56 of a (actual) scene 50a of the real environment 50 surrounding an AR device (e.g., tablet computer 20) presenting the augmented view 56 and the AR device user 52. An actual view 51 of the scene 50a of the real environment 50 may be captured by a camera through lens 26b, and the augmented view 56 of the scene 50a of the real environment 50 being presented through a display 28 of the tablet computer 20.

Referring to FIG. 5B, which shows the views of the AR device user 52 through an AR device (e.g., the tablet computer 20 of FIGS. 2A and 2B) as the user 52 moves from a first location 57a to a second location 57b in the real environment 50. In the first location 57a, the AR device (e.g., the tablet computer 20) of the user 52 may capture the actual view of a first scene 53a of the real environment 50 using, for example, an optical or visual sensor such as a camera that may be included with the AR device (e.g., tablet computer 20). In FIG. 5B, the user 52 along with the AR device (e.g., tablet computer 20) is depicted as moving to a second location 57b. At the first location 57a the AR device (e.g., tablet computer 20) captures the actual view of a first scene 53a from the real environment 50. Based, at least in part, on the actual view of the first scene 53a, the AR device (e.g., tablet computer 20) may present an augmented view 56a to the user 52 via a display (e.g. the display 28 of the tablet computer 20) of the AR device. In the second location, 57b, the AR device (e.g., tablet computer 20) captures the actual view of a second scene 53b from the real environment 50. Based, at least in part, on the actual view of the second scene 53b, the AR device (e.g., tablet computer) an augmented view 56b may be presented to the user 52 via a display (e.g. the display 28 of the tablet computer 20) of the AR device. Note that in the example illustrated in FIG. 5B, the actual view of the first scene 53a and the actual view of the second scene 53b at least partially overlaps (see, for example, overlap 55).

Although not illustrated in FIG. 5B, in some cases, the actual view of the first scene 53a may at least partially overlap with the actual view of the second scene 53b when, for example, the actual view of the first scene 53a overlaps completely with the actual view of the second scene 53b. This may occur when, for example, a user of the AR device 70 stays stationary in one spatial location and using the AR device looks towards the same scene in the real environment for a period of time, and where the actual view of the same scene changes due to changes in natural lighting (e.g., from daylight to dusk) and/or from the entrance or departure of one or more objects (e.g., a passing truck or a person) in the scene.

Turning now to FIG. 5C, which shows the views of the AR device user 52 through an AR device (e.g., the tablet computer 20) as the user 52 moves from a first location 57c to a second location 57d in the real environment 50. In the first location 57c the AR device (e.g., the tablet computer 20) of the user 52 may capture the actual view of a first scene 53c of the real environment 50 using, for example an optical or visual sensor such as a camera that may be included with the AR device (e.g., tablet computer 20). In FIG. 5C, the user 52 along with the AR device (e.g., tablet computer 20) is depicted as moving to a second location 57d. At the first location 57c the AR device (e.g., tablet computer 20) may capture the actual view of a first scene 53c from the real environment 50 using, for example, a camera. Based, at least in part, on the actual view of the first scene 53c, the AR device (e.g., tablet computer 20) may present an augmented view 56c to the user 52 via a display (e.g. the display 28 of the tablet computer 20) of the AR device. In the second location, 57d, the AR device (e.g., tablet computer 20) captures the actual view of a second scene 53d from the real environment 50. Based, at least in part, on the actual view of the second scene 53d, the AR device (e.g., tablet computer) may present an augmented view 56d that may be presented to the user 52 via a display (e.g. the display 28 of the tablet computer 20) of the AR device. Note that unlike the example illustrated in FIG. 5B, in the example illustrated in FIG. 5C, the actual view of the first scene 53c and the actual view of the second scene 53d do not overlap. That is, no part of the actual view of the first scene 53c can be seen in the actual view of the second scene 53d.

Turning now to FIGS. 6A, 6B, 6C, 6D, 6E, 6F, 6G, 6H, 6I, 6K, 6M, 6N, 6P, 6Q, and 6R that illustrate exemplary actual views and augmented views of various scenes from the real environment. The exemplary actual views and the exemplary augmented views illustrated in these figures are provided in order to facilitate understanding of various concepts that will be described in connection with the various operations and processes to be discussed herein. Note that in various embodiments at least the augmented views (e.g., augmented views 60b, 60c, 60d, 60e, 60f, 60g, 60i, 60m, 60n, 60q, and 60r) illustrated in FIGS. 6B, 6C, 6D, 6E, 6F, 6G, 6I, 6M, 6N, 6Q, and 6R may be presented by the AR device 70* (e.g., AR device 70' or AR device 70") of FIG. 7A or 7B.

Figure 6A:
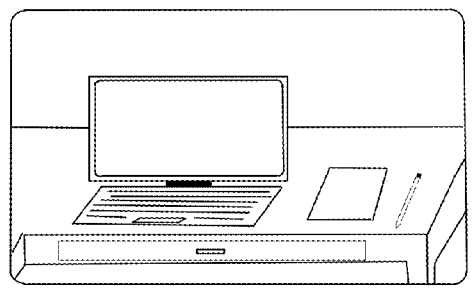
FIGS. 6A, 6B, 6C, 6D, 6E, 6F, 6G, 6H, 6I, 6K, 6M, 6N, 6P, 6Q, and 6R show exemplary actual and augmented views of various scenes from the real environment.

Referring particularly now to FIG. 6A, which illustrates an actual view 60a of a scene from the real environment. In this case, the actual scene is an actual "office" scene that includes a computer, a notebook, and a pen laid on top of a desk. The actual view 60a may be captured by, for example a camera of an AR device 70* (e.g., AR device 70' of FIG. 7A or AR device 70" of FIG. 7B) and may, in some cases, be displayed through the display (e.g., display 28 of an AR device 70*. In this actual view 60a, no augmentation has been included in the actual view 60a of the actual office scene.

Figure 6B:
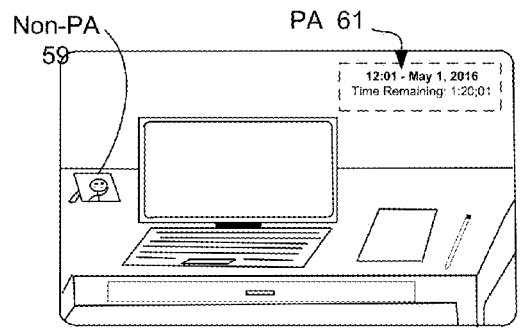

FIG. 6B illustrates an exemplary augmented view 60b of the actual view 60a illustrated in FIG. 6A. Included in the augmented view 60b is a non-persistent augmentation (e.g., non-PA) 59 and a persistent augmentation (e.g., PA) 61. The non-persistent augmentation 59 in this case is an augmentation in the form/shape of a desk photo frame that is placed on the desk in the augmented view 60b. This non-persistent augmentation 59 may be a vision based augmentation that depends on the presence of one or more visual cues (e.g., the shape of the desk) for its existence in the augmented view 60b. Also included in the augmented view 60b is a persistent augmentation 61 that has been inserted into a pre-selected location (e.g., top right corner) of the augmented view 60b. In this example, the persistent augmentation 61 being a time augmentation that provides time information. The exemplary persistent augmentation 61 may, for its existence in the augmented view 60b, be independent of any one or more visual cues in the actual view 60a. In other words, the persistent augmentation 61 may be inserted into multiple augmented views of multiple actual views of multiple scenes from the real environment even though the different actual views of the multiple scenes have no common visual markers or patterns. Note that the persistent augmentation 61 depicted in FIG. 6B is not formatted in the form of a mechanical object (e.g., a wall clock a desk clock, a wristwatch). Instead, the persistent augmentation 61 is presented in the form of plain text. Further note that the persistent augmentation 61 is, at least content-wise, dynamic. That is, since the current time is continuously changing, the time that is presented through the persistent augmentation 61 will evolve over time.

Figure 6C:
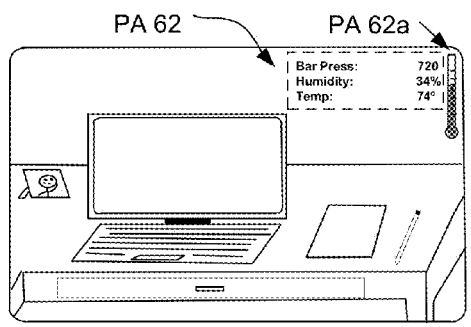

FIGS. 6C, 6D, 6E, and 6F illustrate some of the other types of information that may be provided through a persistent augmentation. For example, FIG. 6C illustrates another exemplary augmented view 60c of actual view 60a but which includes persistent augmentations 62 and 62a. Note that persistent augmentations 62 and 62a provides environmental information (e.g., barometric pressure, humidity, and temperature) rather than the time information provided by the persistent augmentation 61 of FIG. 6B. The persistent augmentations 62 and 62a, as illustrated in FIG. 6C are placed at a pre-selected location (e.g., right top corner similar to the preselected location in FIG. 6B) of the augmented view 60c of FIG. 6C. The persistent augmentations 62 and 62a having a purely textual format (e.g. persistent augmentation 62) and a graphical format (e.g., persistent augmentation 62a) in the form of an old fashion mercury thermometer. The persistent augmentations 62 and 62a are, at least content-wise, dynamic since the information provided by the persistent augmentation may evolve as the weather changes.

Figure 6D:
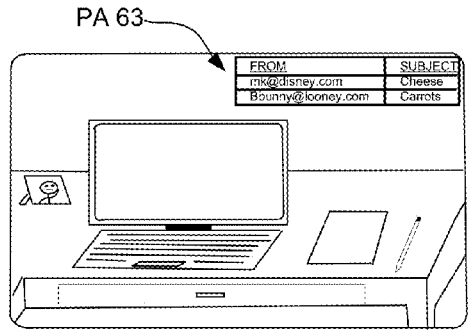

FIG. 6D illustrates yet another exemplary augmented view 60d that includes persistent augmentation 63 of the same actual view 60a of FIG. 6A. Note, however, that the persistent augmentation 63 of FIG. 6D provides current or latest electronic messaging information (e.g., reception of email messages, text messages, and/or instant messages) rather than the time or the environmental information provided by the persistent augmentations 61 and 62 of FIGS. 6B and 6C. The persistent augmentation 63, as illustrated in FIG. 6D is placed at a pre-selected location (e.g., right top corner similar to the preselected location in FIGS. 6B and 6C) of the augmented view 60d of FIG. 6D. The persistent augmentation 63 being in a table format that has both graphical and textual components. The persistent augmentation 63 is, at least content-wise, dynamic since the electronic message information provided by the persistent augmentation 63 may change over time as new messages are constantly being received.

Figure 6E:
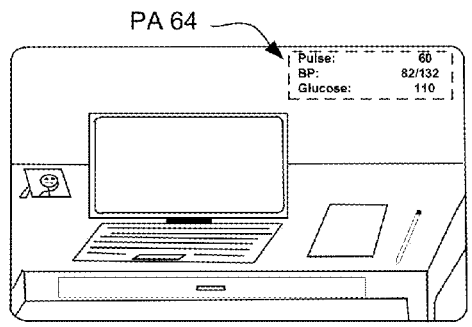

FIG. 6E illustrates still another exemplary augmented view 60e that includes persistent augmentation 64 of the same actual view 60a of FIG. 6A. Note, however, that the persistent augmentation 64 of FIG. 6E provides current or latest user physiological information (e.g., pulse rate, blood pressure, blood glucose level, and so froth) rather than the time, the environmental, and the electronic message information provided by the persistent augmentations 61, 62, and 63 of FIGS. 6B, 6C, and 6D. The persistent augmentation 64, as illustrated in FIG. 6E, is placed at a pre-selected location (e.g., right top corner similar to the preselected location in FIGS. 6B, 6C, and 6D) of the augmented view 60e of FIG. 6E. The persistent augmentation 64 being in a straight or plain textual format (e.g., with minimal graphics). The persistent augmentation 64 is, at least content-wise, dynamic since the user physiological information provided by the persistent augmentation 64 may change over time as the physiological characteristics of a user changes.

Figure 6F:
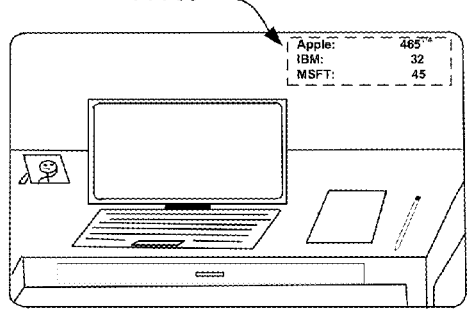

FIG. 6F illustrates still another exemplary augmented view 60f that includes persistent augmentation 65 of the same actual view 60a of FIG. 6A. Note, however, that the persistent augmentation 65 of FIG. 6F provides current or latest user business/financial information (e.g., stock market prices) rather than the time, the environmental, the electronic message, and the user physiological information provided by the persistent augmentations 61, 62, 63, and 64 of FIGS. 6B, 6C, 6D, and 6E. The persistent augmentation 65, as illustrated in FIG. 6F, is placed at a pre-selected location (e.g., right top corner similar to the preselected location in FIGS. 6B, 6C, 6D, and 6E) of the augmented view 60f of FIG. 6F. The persistent augmentation 65 being in a straight or plain textual format (e.g., with minimal graphics). The persistent augmentation 65 is, at least content-wise, dynamic since the business/financial information provided by the persistent augmentation 65 may change over time as the business/financial information (e.g., stock market prices) changes over time.

Figure 6G:
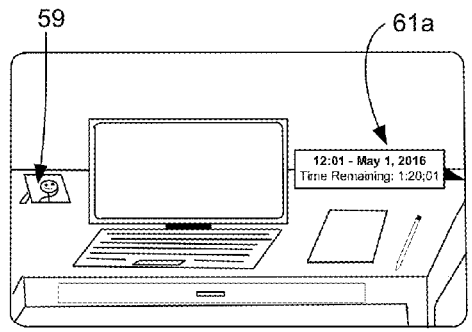

Referring now to FIG. 6G, which illustrates another exemplary augmented view 60g of the actual view 60a of FIG. 6A. In particular, the augmented view 60g of FIG. 6G includes a persistent "time" augmentation 61a that provides the same type of time information provided by the persistent time augmentation 61 included in the augmented view 60b of FIG. 6B. Note, however, that the persistent time augmentation 61a of FIG. 6G is in a different format (e.g., a digital table clock) than the simple or straight text format of the persistent time augmentation 61 of FIG. 6B. Further, the persistent augmentation 61a of FIG. 6G is not located at the same preselected location that the persistent augmentation 61 of FIG. 6B was located at in the augmented views (e.g., augmented views 60b and 60g). Instead, the persistent augmentation 61a is placed or interposed on the desk based, for example, on a visual cue (e.g., desk) that is found in the actual view of the real environment (e.g., the actual view 60a of the office scene illustrated in FIG. 6A). Thus, although a persistent augmentation 61a may at least not solely depend on any one or more visual cues in the actual view of a scene from the real environment for its existence in the augmented view, it may in fact depend on one or more visual cues in the actual view of an actual scene from the real environment for its formatting including placement in a preselected location of the augmented view 60b or 60g.

Figure 6H:
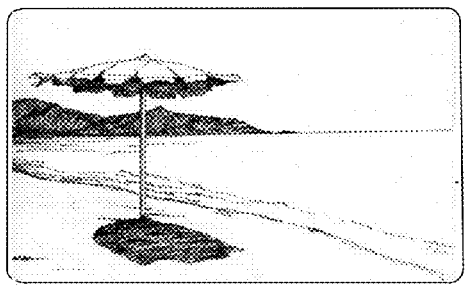
Figure 6I:
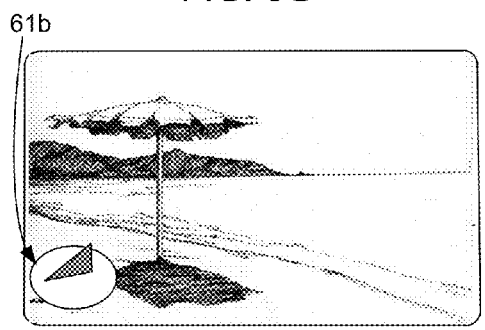
Figure 7A:
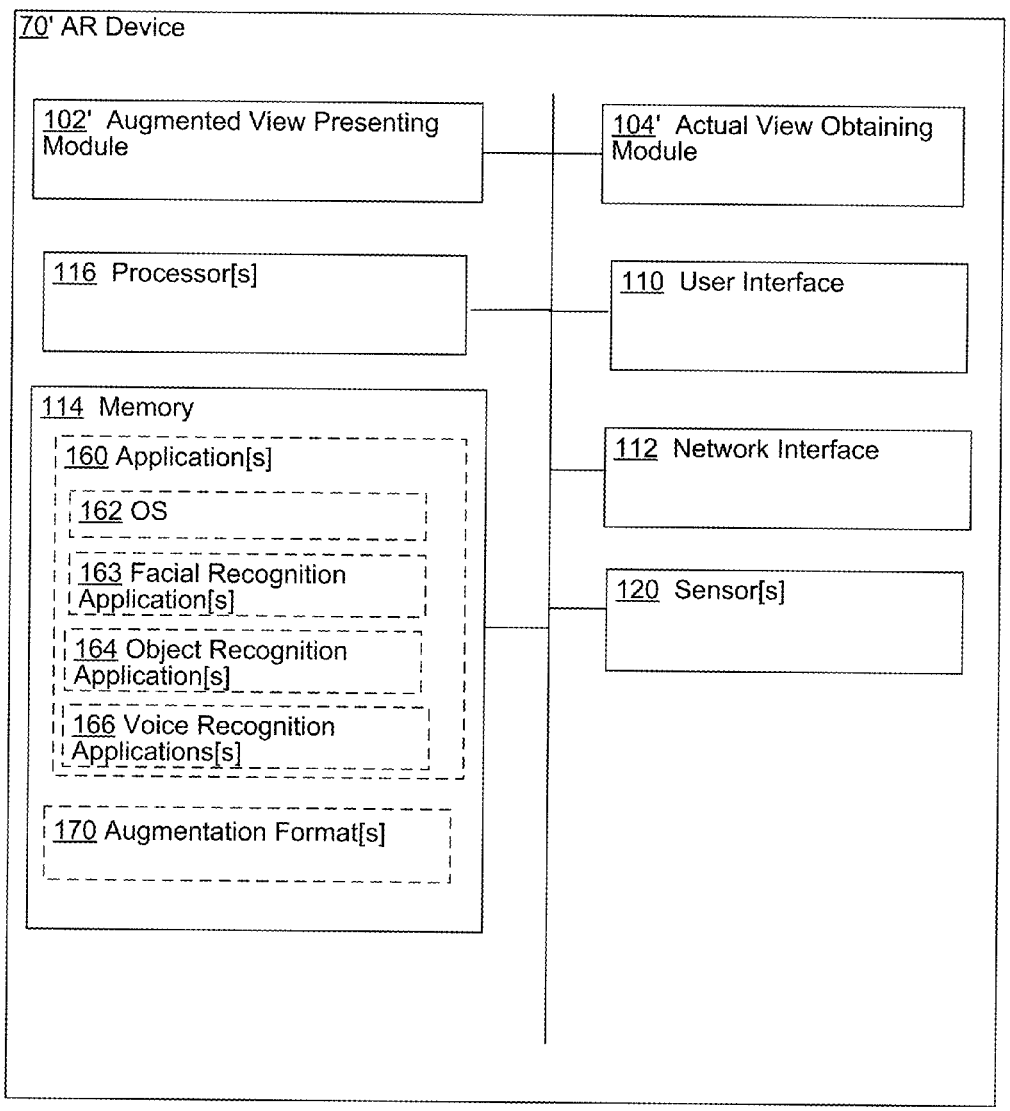
FIG. 7A shows a block diagram of particular implementation of an AR device 70'.
Figure 7B:
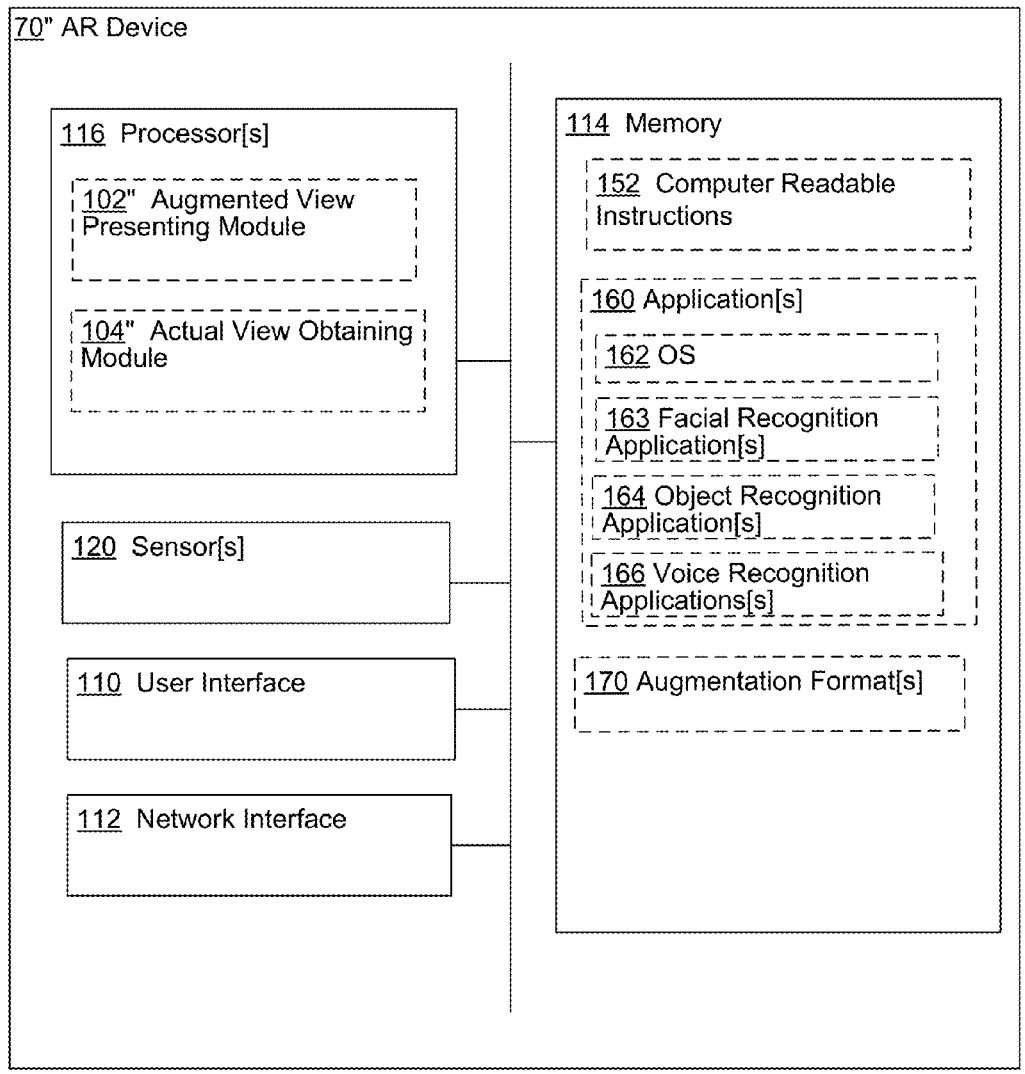
FIG. 7B shows a block diagram of yet another implementation of an AR device 70".

Turning to FIG. 6H, which illustrates an actual view 60h of a beach scene that may be captured by, for example, the AR device 70* of FIG. 7A or 7B. In particular, the actual view 60h being an unmodified view of a beach scene and which does not include any augmentation. Referring now to FIG. 6I, which is an augmented view 60i of the actual view 60h of FIG. 6H and which may be provided by, for example, the AR device 70* of FIG. 7A or 7B. The augmented view 60i, as illustrated, includes a persistent augmentation 61b, which in essence is the same or similar as the persistent "time" augmentations 61 and 61a of FIGS. 6B and 6G but in a different format (e.g., sundial format as opposed to the plain text or desk clock formats illustrated in FIGS. 6B and 6G). As will be described herein, the formatting of the persistent augmentation 60b may be based on multiple input factors including based on detecting of one or more visual cues in the actual view (e.g., actual view 60h of a beach in FIG. 6H) and based on one or more other input factors (e.g., audio data that indicates "beach" sounds—crashing waves or wind, location data that confirms beach location, personal information manager data that provides user scheduling information indicating a user's activities, and so forth).

Figure 6K:
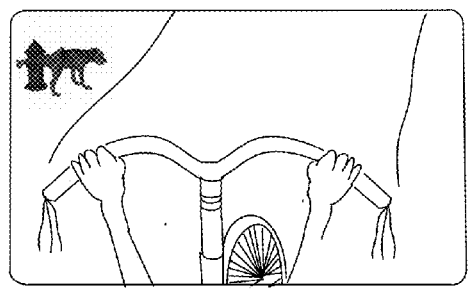
Figure 6M:
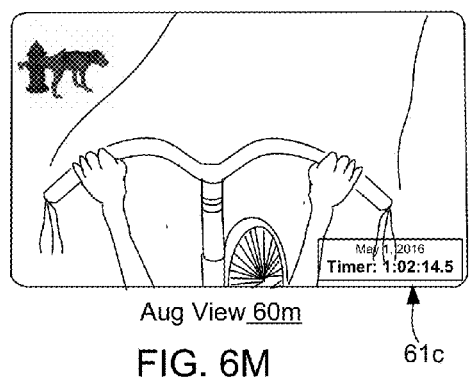
Figure 6N:
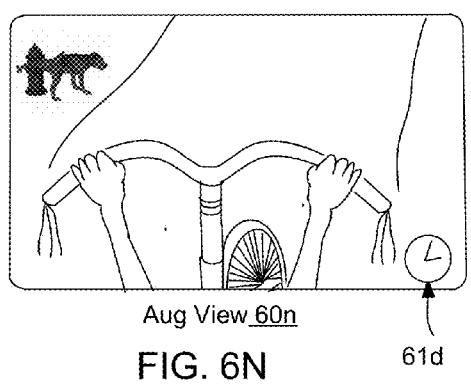

Turning now to FIG. 6K, which illustrates an actual view 60k of a user bicycling scene that may be captured by, for example, the AR device 70* of FIG. 7A or 7B. In particular, the actual view 60k illustrated in FIG. 6K being an unmodified view of a user bicycling along a path and which does not include any augmentation. Referring now to FIGS. 6M and 6N, which shows two alternative augmented views 60m and 60n with two alternative persistent augmentations 61c and 61d of the actual view 60k of FIG. 6K and which may be alternatively provided by, for example, the AR device 70* of FIG. 7A or 7B. The augmented view 60m of FIG. 6M, as illustrated, includes a persistent augmentation 61c, which essentially is the same or similar as the persistent "time" augmentations 61, 61a, and 61b of FIGS. 6B, 6G, and 6I but in a different format (e.g., a simple text format that is located at the bottom right corner of the augmented view 60i rather than the plain text format located at the top right corner of the augmented view 60b illustrated in FIG. 6B, the desk clock format illustrated in FIG. 6G, or the sundial format illustrated in FIG. 6I). With respect to the persistent augmentation 61d illustrated in FIG. 6N, the persistent augmentation 61d being the same or similar to the persistent "time" augmentation 61c of FIG. 6M, the only significant difference being that the persistent augmentation 61d having an alternative format (e.g., a wrist watch chronograph format) rather than the plain textual format of persistent augmentation 61c of FIG. 6M. As will be further described herein, in various embodiments, the formatting of the persistent augmentation 61c or 61d may be based on multiple input factors including based on detecting of one or more visual cues in the actual view (e.g., actual view 60k of a portion of a bicycle and path in FIG. 6K) and based on one or more other input factors (e.g., audio data that indicates heavy breathing, GPS data or data provided by an accelerometer indicating movement and/or speed, and so forth).

Figure 6P:
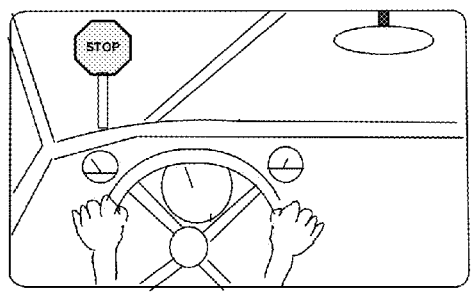
Figure 6Q:
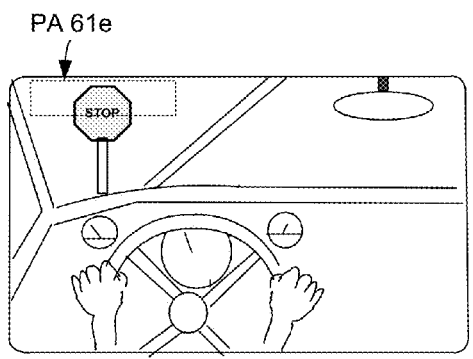
Figure 6R:
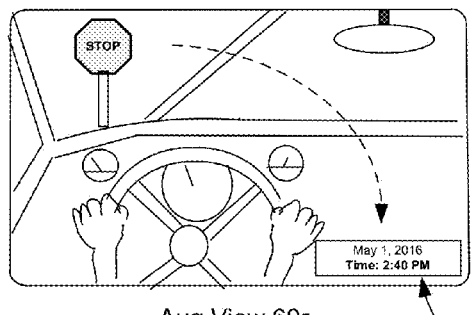

Referring to FIG. 6p, which illustrates yet another actual view 60p of another scene (e.g., interior of an automobile as an AR device user operates the automobile) from the real environment that may be captured by, for example, the AR device 70* of FIG. 7A or 7B. In particular, the actual view 60p illustrated in FIG. 6P being an unmodified view of a user's hands on a steering wheel of an automobile being operated by the user and which does not include any augmentation. Referring now to FIGS. 6Q and 6R, which shows two alternative augmented views 60q and 60r with two alternative persistent augmentations 61e and 61f of the actual view 60p of FIG. 6P and which may be alternatively provided by, for example, the AR device 70* of FIG. 7A or 7B. The augmented view 60q of FIG. 6Q, as illustrated, includes a persistent augmentation 61e, which essentially is the same or similar as the persistent "time" augmentations 61, 61a, and 61b of FIGS. 6B, 6G, and 6I but in a different format (e.g., a faded or semi-transparent text format that is located at the top left corner of the augmented view 60q rather than the plain text format located at the top right corner of the augmented view 60b illustrated in FIG. 6B, the desk clock format illustrated in FIG. 6G, or the sundial format illustrated in FIG. 6I). Note that based on the determination of the visual cue (e.g., a stop sign) in the actual view 60p, the persistent augmentation 61e has been formatted to be faded or semi-transparent so that the stop sign can still be seen in the augmented view 60q. With respect to the persistent augmentation 61f illustrated in FIG. 6R, the persistent augmentation 61f being the same or similar to the persistent "time" augmentation 61e of FIG. 6Q, the only significant difference being that the persistent augmentation 61f having an alternative format (e.g., a non-transparent textual format that is located at another location in the augmented view 60r so that the stop sign is not hidden) rather than the faded or semi-transparent text format of persistent augmentation 61e of FIG. 6Q. As will be further described herein, in various embodiments, the formatting of the persistent augmentation 61e or 61f may be based on multiple input factors including based on detecting of one or more visual cues in the actual view (e.g., actual view 60p of the interior view of an automobile in FIG. 6P) and based on one or more other input factors (e.g., GPS data or data provided by an accelerometer indicating movement and/or speed, audio data that provides sounds associated with automobile operations, and so forth).

Referring now to FIGS. 7A and 7B, FIGS. 7A and 7B are two block diagrams representing two different implementations of an augmented reality (AR) device 70* that can execute the operations and processes to be described herein. In particular, and as will be further described herein, FIG. 7A illustrates an AR device 70' that is the "hardwired" or "hard" implementation of an AR device 70' that can implement the operations and processes to be described herein. The AR device 70' includes certain logic modules including an augmented view presenting module 102' and an actual view obtaining module 104' that are implemented using purely hardware or circuitry components (e.g., application specific integrated circuit or ASIC). In contrast, FIG. 7B illustrates an AR device 70" that is the "soft" implementation of the AR device 70' of FIG. 7A in which certain logic modules including an augmented view presenting module 102" and an actual view obtaining module 104" are implemented using electronic circuitry (e.g., one or more processors including one or more microprocessors, controllers, etc.) executing one or more programming instructions (e.g., software).

The embodiments of the AR device 70* illustrated in FIGS. 7A and 7B are two extreme implementations of the AR device 70* in which all of the logic modules (e.g., the augmented view presenting module 102' and the actual view obtaining module 104') are implemented using purely hardware solutions (e.g., circuitry such as ASIC) as illustrated in FIG. 7A or in which all of the logic modules (e.g., the augmented view presenting module 102" and the actual view obtaining module 104") are implemented using software solutions (e.g., programmable instructions being executed by hardware such as one or more processors) as illustrated in FIG. 7B. Since, there are many ways of combining hardware, software, and/or firmware in order to implement the various logic modules (e.g., the augmented view presenting module 102* and the actual view obtaining module 104*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of AR device 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g. "configured to") generally encompass active-state components and/or inactive-state components and/or standby-state components, unless context requires otherwise.

Referring particularly now to FIG. 7A, which illustrates an AR device 70' that includes an augmented view presenting module 102', an actual view obtaining module 104', one or more processors 116, a memory 114 that may store one or more applications 160 (e.g., an operating system (OS) 162, one or more facial recognition applications 163, one or more objection recognition applications 164, one or more voice recognition applications 166, and so forth) and one or more augmentation formats 170, a user interface 110 (e.g., a display, a mouse, a microphone, etc.), a network interface 112 (e.g., a network interface card or "NIC"), and/one or more sensors 120. Although not depicted, the memory 114 may also include communication applications such as email applications and/or personal information manager applications such as Microsoft Outlook.

In various embodiments, the augmented view presenting module 102' of FIG. 7A is a logic module that is designed to, among other things, present (e.g., display, save, and/or transmit) a first augmented view 60i (see FIG. 6I) of a first scene (e.g., see the actual view 60h of FIG. 6H) from a real environment, the first augmented view 60i to be presented by the augmented view presenting module 102' including one or more persistent augmentations (e.g., persistent augmentation 61b) in a first one or more formats (e.g., sundial), and the first augmented view to be presented by the augmented view presenting module 102' being generated, at least in part, by augmenting an actual view (e.g., actual view 60h) of the first scene (e.g., beach or shoreline) of the real environment to include at least the one or more persistent augmentations (e.g., persistent augmentation 61b), the existence of the one or more persistent augmentations in the first augmented view 60i (see FIG. 6I) being independent of presence of one or more visual cues (e.g., a marker or recognizable pattern) in the actual view (e.g., actual view 60h) of the first scene from the real environment.

In contrast, the actual view obtaining module 104' of FIG. 7A is a logic module that is configured to obtain (e.g., acquiring using a camera) an actual view 60k (see FIG. 6K) of a second scene (e.g., a AR device user operating a bicycle) from the real environment, the actual view 60k of the second scene (e.g., the AR device user operating a bicycle) being different from the actual view 60h of the first scene (e.g., beach or shoreline scene).

Based at least on the actual view obtaining module 104' obtaining the actual view 60k of the second scene (e.g., the AR device user operating a bicycle), the augmented view presenting module 102' of FIG. 7A may be designed to present a second augmented view 60n (see FIG. 6N) of the second scene (e.g., the AR device user operating a bicycle) from the real environment, the second augmented view 60n to be presented including the one or more persistent augmentations (e.g., persistent augmentation 61d of FIG. 6N) in a second one or more formats (e.g., wrist watch chronograph), the second one or more formats being based, at least in part, on multiple input factors including the obtaining of the actual view 60k of the second scene (e.g., the AR device user operating a bicycle) and one or more other input factors (e.g., information provided in a personal information manager such as Microsoft Outlook that indicates the AR device user's schedule or user physiological data that suggests that the AR device user is exercising) unrelated to the obtaining of the actual view of the second scene.

Turning now to FIG. 7B, which illustrates another AR device 70" that can implement the operations and processes to be described herein. As indicated earlier, the AR device 70" in FIG. 7B is merely the "soft" version of the AR device 70' of FIG. 7A because the two logic modules: the augmented view presenting module 102" and the actual view obtaining module 104" are implemented using software and one or more processors 116 (e.g., one or more microprocessors or controllers) executing the software rather than being implemented using purely hardware (e.g., ASIC) as was the case in the AR device 70' of FIG. 7A. Thus, the augmented view presenting module 102" and the actual view obtaining module 104" of FIG. 7B are designed to execute the same functions as the augmented view presenting module 102' and the actual view obtaining module 104' of FIG. 7A. The AR device 70", as illustrated in FIG. 7B, has the same or similar components as the components included in the AR device 70' of FIG. 7A. Note that in the embodiment of the AR device 70* illustrated in FIG. 7B, the augmented view presenting module 102" and the actual view obtaining module 104" may be implemented by the one or more processors 116 (or other types of circuitry such as field programmable gate arrays or FPGAs) executing one or more computer readable instructions 152 stored in memory 114.

In various embodiments, the memory 114 of the AR device 70' of FIG. 7A and the AR device 70' of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 8A:
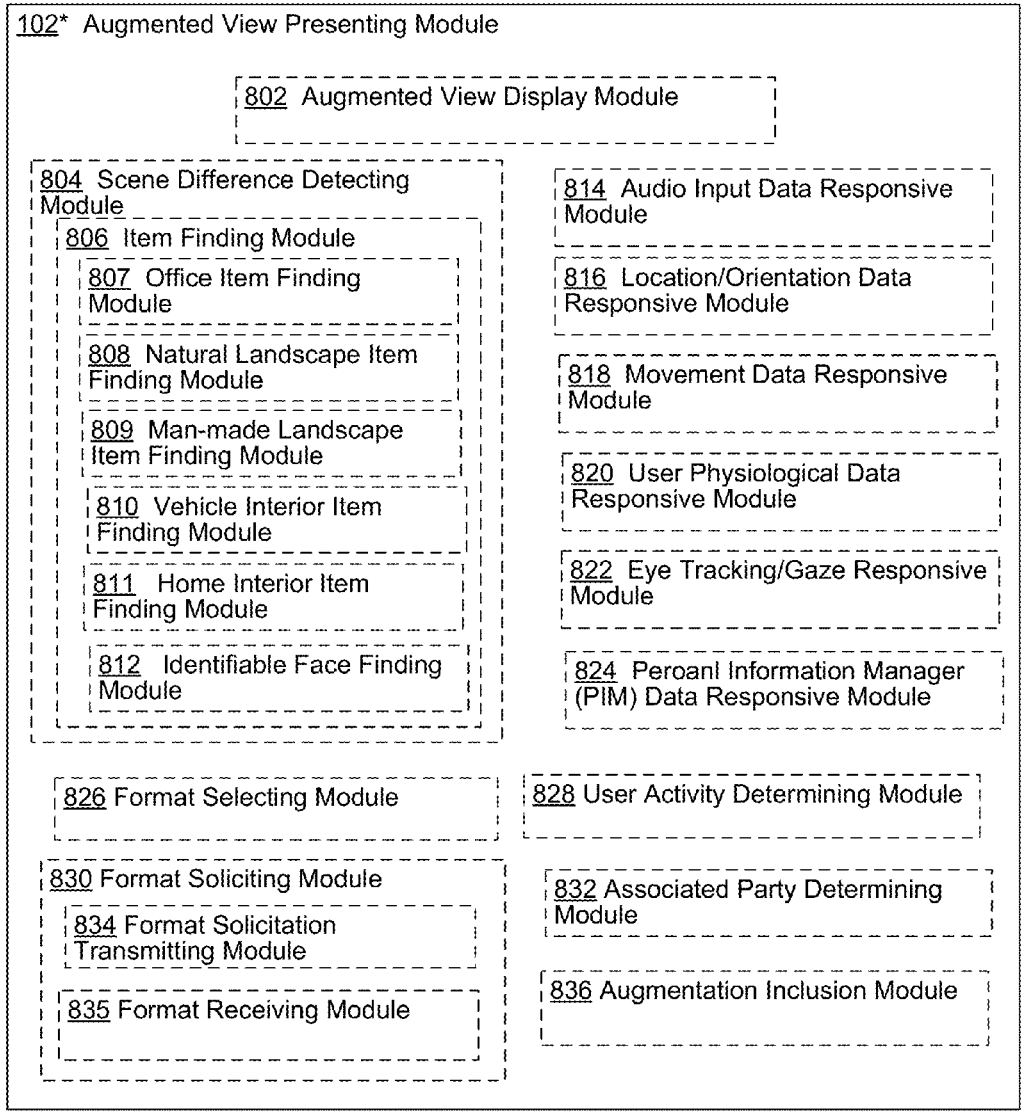
FIG. 8A shows another perspective of the augmented view presenting module 102* of FIGS. 7A and 7B (e.g., the augmented view presenting module 102' of FIG. 7A or the augmented view presenting module 102" of FIG. 7B).

Turning now to FIG. 8A illustrating a particular implementation of the augmented view presenting module 102* (e.g., the augmented view presenting module 102' or the augmented view presenting module 102") of FIGS. 7A and 7B. As illustrated, the augmented view presenting module 102* may include one or more sub-logic modules in various alternative implementations. For example, in various embodiments, the augmented view presenting module 102* may include an augmented view display module 802, a scene difference detecting module 804 (which may include an item finding module 806 that may further comprise an office item finding module 807, a natural landscape item finding module 808, a man-made landscape item finding module 809, a vehicle interior item finding module 810, a home interior item finding module 811, and/or an identifiable face finding module 812), an audio input data responsive module 814, a location/orientation data responsive module 816, a movement data responsive module 818, a user physiological data responsive module 820, an eye tracking/gaze responsive module 822, a personal information manager (PIM) data responsive module 824, a format selecting module 826, a user activity determining module 828, a format soliciting module 830 (which may further include a format solicitation transmitting module 834 and/or format receiving module 835), an associated party determining module 832, and/or an augmentation inclusion module 836). Specific details related to the augmented view presenting module 102* as well as the above-described sub-modules of the augmented view presenting module 102* will be provided below with respect to the operations and processes to be described herein.

FIG. 8B illustrates the various types of user interface devices that may be part of the user interface 110 of the AR device 70* of FIG. 7A or 7B. In various embodiments, the user interface 110 may include one or more displays 852 (e.g., a touchscreen, a liquid crystal display (LCD), a see-through display, and/or other types of displays), one or more visual capturing devices 854 (e.g., one or more video or web cameras, digital cameras, and/or other types of cameras), one or more audio speakers 856, one or more audio input devices 858 (e.g., one or more microphones), and/or one or more keyboard/keypads 860. Although not depicted, other types of user interfaces may be included with the user interface 110 in various alternative embodiments including, for example, a mouse or other types of user input/output devices.

FIG. 8C illustrates at least some of the various types of sensors 120 that may be included with the AR device 70* (e.g. the AR device 70' of FIG. 7A or the AR device 70" of FIG. 7B). As illustrated, the one or more sensors 120 that may be included with the AR device 70* may include one or more cameras 870 (note that the one or more cameras 870 may be the same as the one or more visual capturing devices 854 described above), one or more audio sensors 872 (see also audio input device[s] 858 described above), one or more location sensors 874 such as one or more global positioning systems 875, one or more orientation/movement sensors 876 (which may comprise one or more accelerometers 877, one or more gyroscopes 878, one or more inertia sensors 879, one or more pedometers 880), and/or one or more user physiological sensors 882 (e.g., one or more blood pressure sensors 883, one or more pulse/heart rate sensors 884, one or more blood sugar sensors 885). Note that with respect to the one or more location sensors 874, the one or more orientation/movement sensors 876, and/or one or more user physiological sensors 882 may include other types of sensors not depicted in FIG. 8C. For example the one or more location sensors 874 in some alternative implementations may include a location sensor that employs triangulation techniques and signals from cellular towers to determine location while the one or more user physiological sensors 882 may include in some alternative embodiments one or more galvanic skin sensors.

A more detailed discussion related to the AR device 70* (e.g., the AR device 70' of FIG. 7A or the AR device 70" of FIG. 7B) discussed above will now be provided with respect to the processes and operations to be described herein. FIG. 9 illustrates an operational flow 900 representing example operations for, among other things, presenting a first augmented view (e.g., augmented view 60g of FIG. 6G) of a first scene (e.g., an office scene) from a real environment, the first augmented view 60g to be presented including one or more persistent augmentations (e.g., persistent augmentation 61a) in a first one or more formats (e.g., time data presented in the form of a digital desk clock as illustrated in FIG. 6G), and the first augmented view 60g to be presented being generated, at least in part, by augmenting an actual view (e.g. actual view 60a of FIG. 6A) of the first scene of the real environment to include at least the one or more persistent augmentations 61a, the existence of the one or more persistent augmentations 61a in the first augmented view 60g being independent of presence of one or more visual cues in the actual view 60a of the first scene from the real environment; obtaining an actual view 60h (see FIG. 6H) of a second scene (e.g., beach scene) from the real environment, the actual view 60h of the second scene being different from the actual view 60a of the first scene; and presenting a second augmented view 60i (see FIG. 6I) of a second scene from the real environment, the second augmented view 60i to be presented including the one or more persistent augmentations 61b in a second one or more formats (e.g., time data presented as a sundial), the second one or more formats being based, at least in part, on multiple input factors including the obtaining of the actual view 60h of the second scene and one or more other input factors (e.g., audio data, locational data, and so forth) unrelated to the obtaining of the actual view 60h of the second scene.

In FIG. 9 and in the following figures that include various examples of operational flows, discussions and explanations will be provided with respect to the AR device 70* described above and as illustrated in FIGS. 1A, 1B, 2A, 2B, 3A, 3B, 4A, 4B, 7A, 7B, 8A, 8B, and 8C and/or with respect to other examples (e.g., as provided in FIGS. 5A, 5B, 5C, 6A, 6B, 6C, 6D, 6E, 6F, 6G, 6H, 6I, 6K, 6M, 6N, 6P, 6Q, and 6R) and contexts. However, it should be understood that the operational flows may be executed in a number of other environments and contexts, and/or in modified versions of FIGS. 1A, 1B, 2A, 2B, 3A, 3B, 4A, 4B, 5A, 5B, 5C, 6A, 6B, 6C, 6D, 6E, 6F, 6G, 6H, 6I, 6K, 6M, 6N, 6P, 6Q, 6R, 7A, 7B, 8A, 8B, and 8C. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine, an article of manufacture, or a composition of matter.

In any event, after a start operation, the operational flow 900 of FIG. 9 may move to a first augmented view presenting operation 902 for presenting a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment. For instance, and as illustration, the augmented view presenting module 102* of FIG. 7A or 7B (e.g., the augmented view presenting module 102' of FIG. 7A or the augmented view presenting module 102" of FIG. 7B) presenting a first augmented view (see, for example, the augmented view 60g of FIG. 6G) of a first scene from a real environment, the first augmented view to be presented including one or more persistent augmentations (e.g., the persistent augmentation (PA) 61a of FIG. 6G) in a first one or more formats (e.g., in FIG. 6G, the PA 61a is time data presented in the form of a desk clock), and the first augmented view to be presented being generated, at least in part, by augmenting an actual view (e.g., the actual view 60a of FIG. 6A as obtained by, for example, a camera 870 of FIG. 8B) of the first scene from the real environment to include at least the one or more persistent augmentations (e.g., PA 61a of FIG. 6G), the inclusion of the one or more persistent augmentations (e.g., PA 61a of FIG. 6G) in the first augmented view (e.g., AR view 60g) being independent of presence of one or more visual cues in the actual view of the first scene from the real environment (e.g., the inclusion of the one or more persistent augmentations, such as the PA 61a of FIG. 6G, being independent of any identifiable visual pattern such as the visual features of a face, a textual sign such as a street or store name, the visual patterns of a natural or manmade landmark such as waves of an ocean or granular visual patterns of sand, or any other types of visual cues in the actual first scene of the real environment). Note that although the inclusion of the one or more persistent augmentations (such as PA 61a of FIG. 6G) may be independent of presence of any visual cues in the actual view (e.g., actual view 60a of FIG. 6A) of the first scene (e.g., office scene in FIG. 6A), the formatting of the one or more persistent augmentations being linked to one or more visual cues in the actual view of the first scene.

As further illustrated in FIG. 9, operational flow 900 may also include an actual view obtaining operation 904 for obtaining an actual view of a second scene from the real environment, the actual view of the second scene being different from the actual view of the first scene. For instance, the actual view obtaining module 104* (e.g., the actual view obtaining module 104' of FIG. 7A or the actual view obtaining module 104" of FIG. 7B) of the AR device 70* obtaining an actual view (e.g., actual view 60h of FIG. 6H that may have been obtained using one or more cameras 870) of a second scene (e.g., the beach scene of FIG. 6H) from the real environment, the actual view of the second scene (e.g., actual view 60h of FIG. 6H) being different from the actual view of the first scene (e.g., actual view 60a of an office as illustrated in FIG. 6A). References to the "real environment" herein is in reference to the true physical environment surrounding, for an example, an augmented reality system such as the AR device 70* of FIG. 7A or 7B and/or the user of such device (hereinafter "AR device user") rather than a reference to a virtual environment or world.

In addition to the first augmented view presenting operation 902 and the actual view obtaining operation 904, operational flow 900 may also include a second augmented view presenting operation 906 for presenting a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene. For instance, the augmented view presenting module 102* of FIG. 7A or 7B presenting (e.g., displaying through a display monitor such as a touchscreen) a second augmented view of the second scene from the real environment (see, for example, the AR view 60i of FIG. 6I or the AR view 60m of FIG. 6M), the second augmented view to be presented including the one or more persistent augmentations in a second one or more formats (e.g., the persistent augmentation 61b of FIG. 6I or the persistent augmentation 61c of FIG. 6M, which are the persistent time data augmentation 61a of FIG. 6G in different formats), the second one or more formats being based, at least in part, on multiple input factors including the obtaining of the actual view of the second scene (e.g., the actual view 60h of FIG. 6H or the actual view 60k of FIG. 6K) and one or more other input factors (e.g., audio input, location input, personal information input such as personal appointment book or calendar information, and so forth that indicate or suggests mood or atmosphere of the second scene) unrelated to the obtaining of the actual view of the second scene.

Figure 10A:
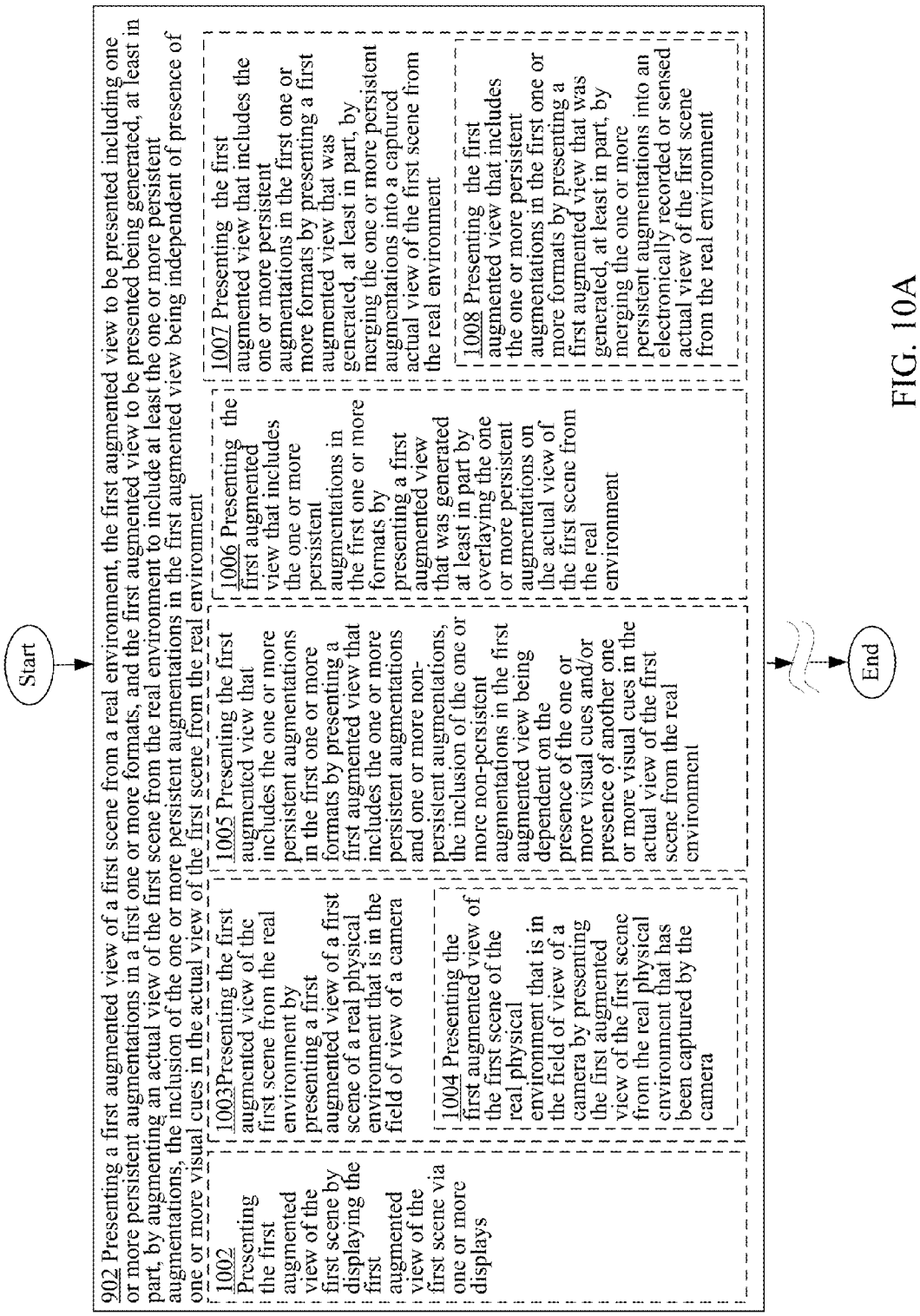
FIG. 10A is a high-level logic flowchart of a process depicting alternate implementations of the first augmented view presenting operation 902 of FIG. 9.

As will be described below, the first augmented view presenting operation 902, the actual view obtaining operation 904, and the second augmented view presenting operation 906 of FIG. 9 may be executed in a variety of different ways in various alternative implementations. FIGS. 10A, 10B, 10C, 10D, 10E and 10F, for example, illustrate at least some of the alternative ways that the first augmented view presenting operation 902 of FIG. 9 may be executed in various alternative implementations. For example, in various implementations, the first augmented view presenting operation 902 of FIG. 9 may include an operation 1002 for presenting the first augmented view of the first scene by displaying the first augmented view of the first scene via one or more displays as illustrated in FIG. 10A. For instance, the augmented view presenting module 102* including the augmented view display module 802 (see FIG. 8A) presenting the first augmented view (e.g., augmented view 60g of FIG. 6G) of the first scene by having the augmented view display module 802 display the first augmented view of the first scene via one or more displays 852 (see FIG. 8B—see also displays 18, 28, 38a and 38b, and 46 of FIGS. 1A, 2A, 3B, and 4B). In the same or different implementations, the first augmented view presenting operation 902 may involve presenting the first augmented view (e.g., augmented view 60g of FIG. 6G) by transmitting the first augmented view via one or more wireless and/or wired networks and/or saving the first augmented view into a volatile or non-volatile memory.

As further illustrated in FIG. 10A, the first augmented view presenting operation 902 may additionally or alternatively include an operation 1003 for presenting the first augmented view of the first scene from the real environment by presenting a first augmented view of a first scene of a real physical environment that is in the field of view of a camera. For instance, the augmented view presenting module 102* presenting the first augmented view of the first scene from the real environment by presenting a first augmented view (e.g., augmented view 60g of FIG. 6G) of a first scene (e.g., office scene as illustrated in FIG. 6G) of a real physical environment that is in the field of view 51 (see FIG. 5A) of a camera 870.

References to the "first scene" in the first augmented view presenting operation 902 may be in reference to a number of things. For example, in some cases, operation 1003 may include an operation 1004 for presenting the first augmented view of the first scene of the real physical environment that is in the field of view of a camera by presenting the first augmented view of the first scene from the real physical environment that has been captured by the camera. For instance, the augmented view presenting module 102* of the AR device 70* (e.g., the AR device 70' of FIG. 7A or the AR device 70" of FIG. 7B) presenting the first augmented view (e.g., augmented views 60b or 60g of FIG. 6B or 6G) of the first scene of the real physical environment that is in the field of view of a camera 870 by presenting the first augmented view of the first scene from the real physical environment that has been captured (e.g., scanned and/or recorded) by the camera 870.

In some implementations, the first augmented view presenting operation 902 may additionally or alternatively include an operation 1005 for presenting the first augmented view that includes the one or more persistent augmentations in the first one or more formats by presenting a first augmented view that includes the one or more persistent augmentations and one or more non-persistent augmentations, the inclusion of the one or more non-persistent augmentations in the first augmented view being dependent on the presence of the one or more visual cues and/or presence of another one or more visual cues in the actual view of the first scene from the real environment. For instance, the augmented view presenting module 102* of the AR device 70* (e.g., the AR device 70' of FIG. 7A or the AR device 70" of FIG. 7B) presenting the first augmented view 60b (see FIG. 6B) that includes the one or more persistent augmentations (e.g., see, for example, the persistent augmentation 61 of FIG. 6B) in the first one or more formats by presenting a first augmented view 60b that includes the one or more persistent augmentations (e.g., see, for example, the persistent augmentation 61 of FIG. 6B) and one or more non-persistent augmentations (e.g., see, for example, the non-persistent augmentation 59 of FIG. 6B, the non-persistent augmentation 59 being a photo and a photo frame of a person), the inclusion of the one or more non-persistent augmentations (e.g., non-persistent augmentation 59) in the first augmented view 60b being dependent (e.g., relying) on the presence of the one or more visual cues (e.g., one or more visual patterns such as the visual pattern of the top of the desk depicted in FIG. 6B) and/or presence of another one or more visual cues (e.g., a wall painting or sign) in the actual view (e.g., actual view 60a of FIG. 6A) of the first scene from the real environment.

In the same or different implementations, the first augmented view presenting operation 902 may additionally or alternatively include an operation 1006 for presenting the first augmented view that includes the one or more persistent augmentations in the first one or more formats by presenting a first augmented view that was generated at least in part by overlaying the one or more persistent augmentations on the actual view of the first scene from the real environment. For instance, the augmented view presenting module 102* of FIG. 7A or 7B presenting the first augmented view that includes the one or more persistent augmentations in the first one or more formats by presenting a first augmented view (e.g., augmented view 60b of FIG. 6B) that was generated at least in part by overlaying the one or more persistent augmentations (e.g., persistent augmentation 61 of FIG. 6B) on the actual view (e.g., actual view 60a of FIG. 6A) of the first scene from the real environment. As a further illustration, if the AR device 70* of FIG. 7A or 7B has the "glasses" form factor illustrated in FIGS. 4A and 4B, then the persistent augmentation 61 of FIG. 6B may be presented in the augmented view 60b by overlaying the persistent augmentation 61 on the actual view 60a (see FIG. 6B) of a scene from the real environment that may be provided through the see-through display 46 of FIGS. 4A and 4B.

In the same or different implementations, the first augmented view presenting operation 902 may additionally or alternatively include an operation 1007 for presenting the first augmented view that includes the one or more persistent augmentations in the first one or more formats by presenting a first augmented view that was generated, at least in part, by merging the one or more persistent augmentations into a captured actual view of the first scene from the real environment as further depicted in FIG. 10A. For instance, the augmented view presenting module 102* of FIG. 7A or 7B presenting the first augmented view that includes the one or more persistent augmentations in the first one or more formats by presenting a first augmented view (e.g., augmented view 60g of FIG. 6G) that was generated, at least in part, by merging the one or more persistent augmentations (e.g., persistent augmentation 61a as illustrated in FIG. 6G) into a captured actual view (e.g., an actual view 60a as illustrated in FIG. 6A that was captured using, for example, a camera 870) of the first scene from the real environment. As a further illustration, if the AR device 70* of FIG. 7A or 7B has the smartphone, the tablet computer, or the goggle form factors illustrated in FIGS. 1A, 1B, 2A, 2B, 3A, and 3B then the persistent augmentation 61a of FIG. 6G may be presented in the augmented view 60g by overlaying the persistent augmentation 61a on the actual view (e.g., actual view 60a of FIG. 6A) of a scene from the real environment that may be provided through a display 18, 28, 38a, or 38b of FIG. 1A, 2A, or 3B.

In some cases, and as further illustrated in FIG. 10A, operation 1007 may include an operation 1008 for presenting the first augmented view that includes the one or more persistent augmentations in the first one or more formats by presenting a first augmented view that was generated, at least in part, by merging the one or more persistent augmentations into an electronically recorded or sensed actual view of the first scene from the real environment. For instance, the augmented view presenting module 102* of FIG. 7A or 7B presenting first augmented view that includes the one or more persistent augmentations in the first one or more formats by presenting a first augmented view (e.g., augmented view 60g of FIG. 6G) that was generated, at least in part, by merging the one or more persistent augmentations (e.g., persistent augmentation 61a of FIG. 6G) into an electronically recorded or sensed (e.g., as electronically recorded or sensed by camera 870) actual view 60a (of FIG. 6A) of the first scene from the real environment.

Figure 10B:
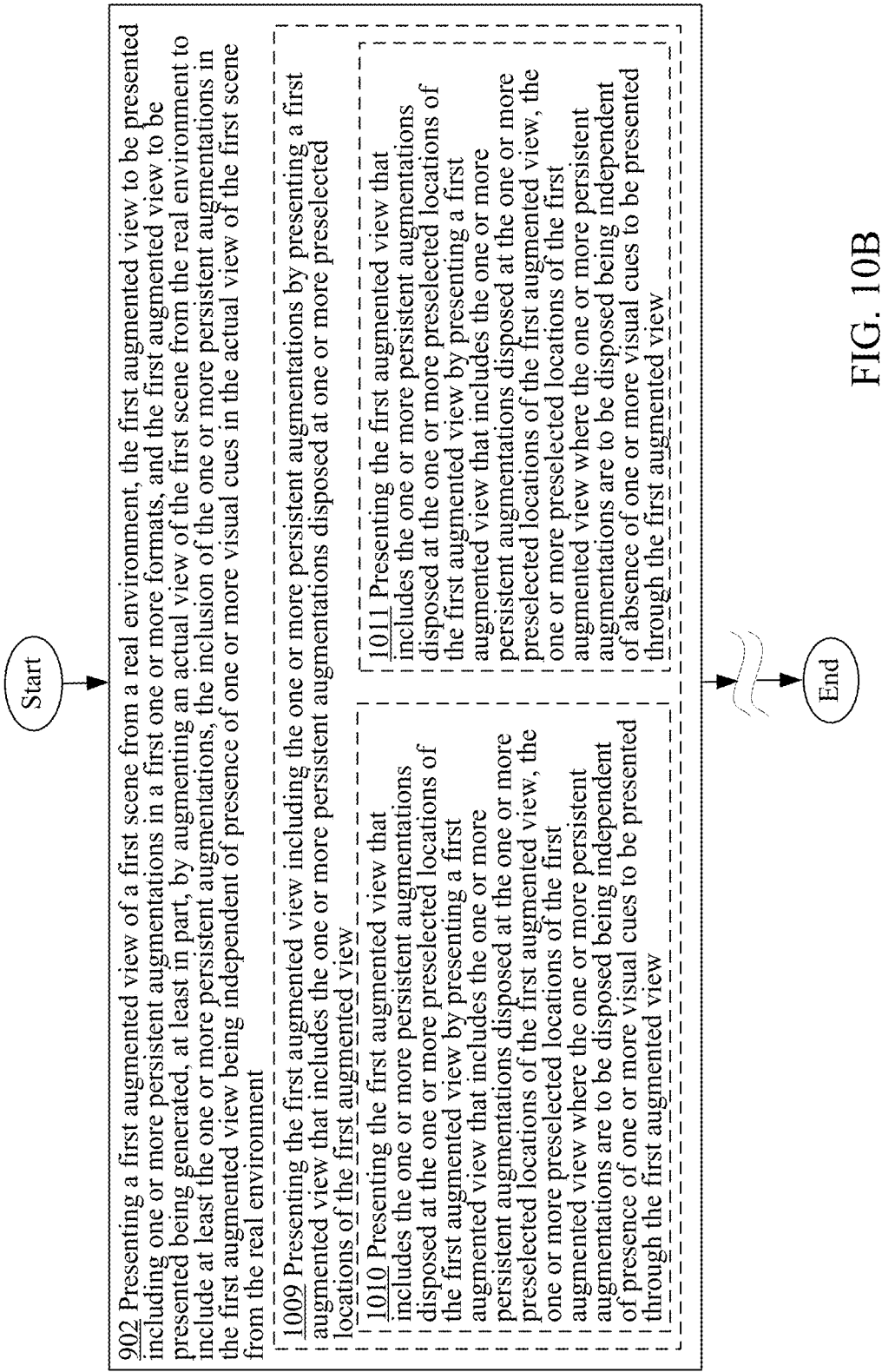
FIG. 10B is a high-level logic flowchart of a process depicting alternate implementations of the first augmented view presenting operation 902 of FIG. 9.

The persistent augmentations referred to in the first augmented view presenting operation 902 of FIG. 9 may be related to a variety of different augmentations having a variety of characteristics. For example, and as illustrated in FIG. 10B, in various implementations, the first augmented view presenting operation 902 may additionally or alternatively include an operation 1009 for presenting the first augmented view including the one or more persistent augmentations by presenting a first augmented view that includes the one or more persistent augmentations disposed at one or more preselected locations of the first augmented view. For instance, the augmented view presenting module 102* of FIG. 7A or 7B presenting the first augmented view including the one or more persistent augmentations by presenting a first augmented view 60b (of FIG. 6B) that includes the one or more persistent augmentations (e.g., the persistent augmentation 61 of FIG. 6B) disposed at one or more preselected locations of the first augmented view 60b—in this case, the preselected location being the right top corner of the augmented view 60b).

As further illustrated in FIG. 10B, operation 1009 may include one or more operations in various alternative implementations. For example, in some implementations, operation 1009 may include an operation 1010 for presenting the first augmented view that includes the one or more persistent augmentations disposed at the one or more preselected locations of the first augmented view by presenting a first augmented view that includes the one or more persistent augmentations disposed at the one or more preselected locations of the first augmented view, the one or more preselected locations of the first augmented view where the one or more persistent augmentations are to be disposed being independent of presence of one or more visual cues to be presented through the first augmented view. For instance, the augmented view presenting module 102* of FIG. 7A or 7B presenting the first augmented view that includes the one or more persistent augmentations disposed at the one or more preselected locations of the first augmented view by presenting a first augmented view 60b (see FIG. 6B) that includes the one or more persistent augmentations (e.g., persistent augmentation 61 of FIG. 6B) disposed at the one or more preselected locations (e.g., top right corner) of the first augmented view 60b, the one or more preselected locations (e.g., top right corner) of the first augmented view 60b where the one or more persistent augmentations (e.g., persistent augmentation 61) are to be disposed being independent of presence of (any) one or more visual cues to be presented through the first augmented view 60b.

In the same or alternative implementations, operation 1009 may include an operation 1011 for presenting the first augmented view that includes the one or more persistent augments disposed at the one or more preselected locations of the first augmented view by presenting a first augmented view that includes the one or more persistent augmentations disposed at the one or more preselected locations of the first augmented view, the one or more preselected locations of the first augmented view where the one or more persistent augmentations are to be disposed being independent of absence of one or more visual cues to be presented through the first augmented view as further illustrated in FIG. 10B. For instance, the augmented view presenting module 102* of FIG. 7A or 7B presenting the first augmented view that includes the one or more persistent augmentations disposed at the one or more preselected locations of the first augmented view by presenting a first augmented view 60b (of FIG. 6B) that includes the one or more persistent augmentations (e.g., persistent augmentation 61 of FIG. 6B) disposed at the one or more preselected locations (e.g., top right corner) of the first augmented view 60b, the one or more preselected locations (e.g., top right corner) of the first augmented view 60b where the one or more persistent augmentations (e.g., persistent augmentation 61) are to be disposed being independent of absence of (any) one or more visual cues to be presented through the first augmented view 60b.

Figure 10C:
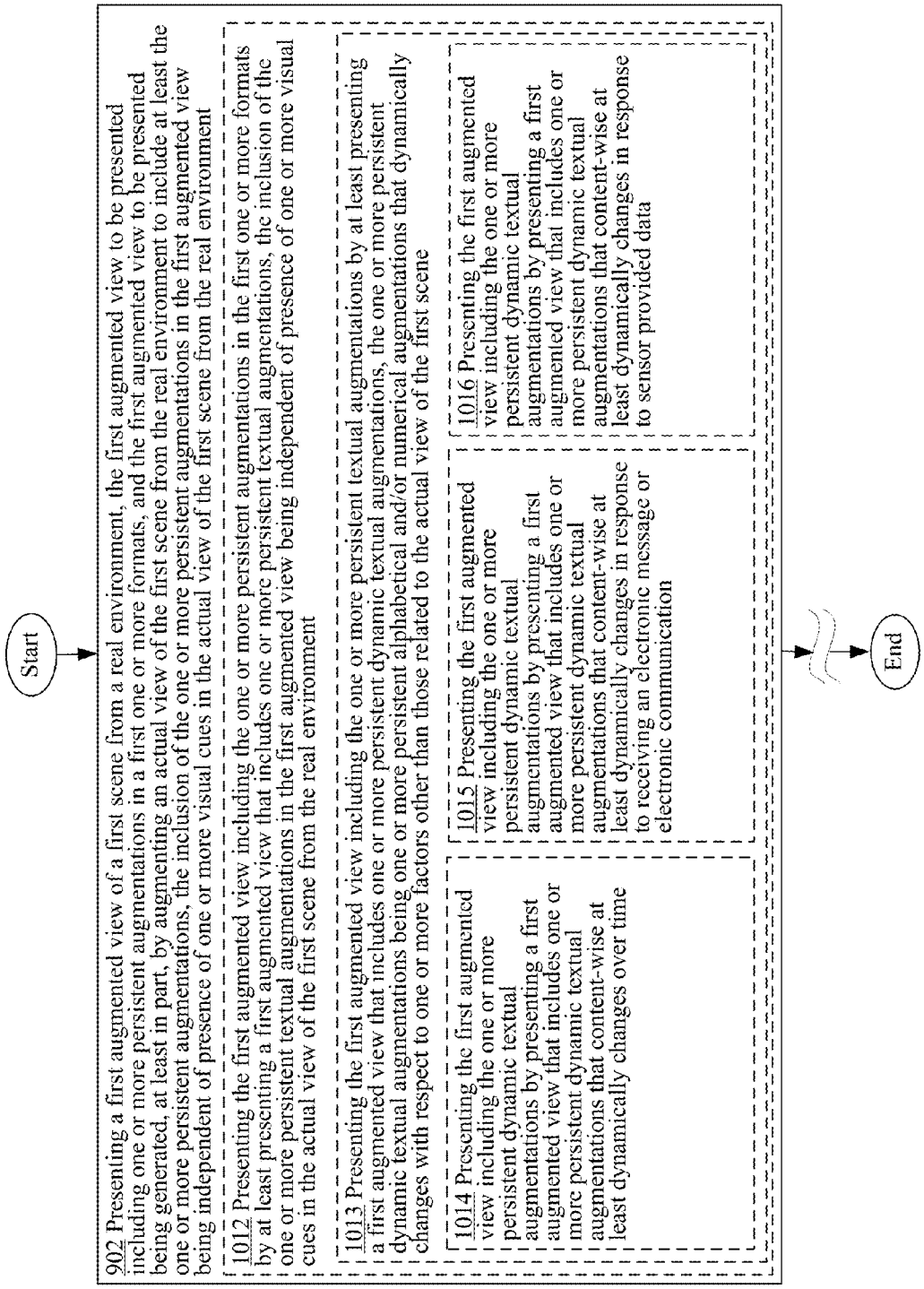
FIG. 10C is a high-level logic flowchart of a process depicting alternate implementations of the first augmented view presenting operation 902 of FIG. 9.

Referring now to FIG. 10C, in some cases, the first augmented view presenting operation 902 may additionally or alternatively include an operation 1012 for presenting the first augmented view including the one or more persistent augmentations in the first one or more formats by at least presenting a first augmented view that includes one or more persistent textual augmentations, the inclusion of the one or more persistent textual augmentations in the first augmented view being independent of presence of one or more visual cues in the actual view of the first scene from the real environment. For instance, the augmented view presenting module 102* of FIG. 7A or 7B presenting the first augmented view including the one or more persistent augmentations in the first one or more formats by at least presenting (e.g., displaying) a first augmented view (e.g., the augmented views 60b, 60c, 60d, 60e, 60f, 60g, 60m, 60q, or 60r of FIG. 6B, 6C, 6D, 6E, 6F, 6G, 6M, 6Q, or 6R) that includes one or more persistent textual augmentations (e.g., the persistent augmentation 61, 62, 63, 64, 65, 61a, 61c, 61e, or 60r of FIG. 6B, 6C, 6D, 6E, 6F, 6G, 6M, 6Q, or 6R), the inclusion of the one or more persistent textual augmentations in the first augmented view (e.g., augmented view 60b, 60c, 60d, 60e, 60f, 60g, 60m, 60q, or 60r of FIG. 6B, 6C, 6D, 6E, 6F, 6G, 6M, 6Q, or 6R) being independent of presence of (any particular) one or more visual cues in the actual view 60a (see FIG. 6A) of the first scene from the real environment.

As further illustrated in FIG. 10C, operation 1012 may include one or more additional operations in various alternative implementations. For example, in some cases, operation 1012 may include an operation 1013 for presenting the first augmented view including the one or more persistent textual augmentations by at least presenting a first augmented view that includes one or more persistent dynamic textual augmentations, the one or more persistent dynamic textual augmentations being one or more persistent alphabetical and/or numerical augmentations that dynamically changes with respect to one or more factors other than those related to the actual view of the first scene. For instance, the augmented view presenting module 102* of FIG. 7A or 7B presenting the first augmented view including the one or more persistent textual augmentations by at least presenting a first augmented view (e.g., the augmented views 60b, 60c, 60d, 60e, 60f, 60g, 60m, 60q, or 60r of FIG. 6B, 6C, 6D, 6E, 6F, 6G, 6M, 6Q, or 6R) that includes one or more persistent dynamic textual augmentations (e.g., the persistent augmentation 61, 62, 63, 64, 65, 61a, 61c, 61e, or 60r of FIG. 6B, 6C, 6D, 6E, 6F, 6G, 6M, 6Q, or 6R, which are at least partially persistent textual augmentations), the one or more persistent dynamic textual augmentations being one or more persistent alphabetical and/or numerical augmentations that dynamically changes with respect to one or more factors other than those related to the actual view of the first scene. For example, in the examples illustrated in FIG. 6B, 6C, 6D, 6E, 6F, 6G, 6M, 6Q, or 6R, the information content of the persistent augmentations 61, 62, 63, 64, 65, 61a, 61c, 61e, or 60r may dynamically evolve in response to changes in time, atmospheric conditions, financial market conditions, user physiological conditions, and so forth.

In various implementations, operation 1013 may include or may involve one or more additional operations in various alternative implementations. For example, in some implementations operation 1013 may include an operation 1014 for presenting the first augmented view including the one or more persistent dynamic textual augmentations by presenting a first augmented view that includes one or more persistent dynamic textual augmentations that content-wise at least dynamically changes over time. For instance, the augmented view presenting module 102* of FIG. 7A or 7B presenting the first augmented view including the one or more persistent dynamic textual augmentations by presenting, for example, a first augmented view 60b of FIG. 6B that includes one or more persistent dynamic textual augmentations (e.g., the persistent augmentation 61 in FIG. 6B indicates the current time, thus such an augmentation will dynamically evolve over time) that content-wise at least dynamically changes over time.

In the same or different implementations, operation 1013 may additionally or alternatively include an operation 1015 for presenting the first augmented view including the one or more persistent dynamic textual augmentations by presenting a first augmented view that includes one or more persistent dynamic textual augmentations that content-wise at least dynamically changes in response to receiving an electronic message or electronic communication. For instance, the augmented view presenting module 102* of FIG. 7A or 7B presenting the first augmented view including the one or more persistent dynamic textual augmentations by presenting, for example, a first augmented view 60d of FIG. 6D that includes one or more persistent dynamic textual augmentations (e.g., the persistent augmentation 63 that indicates the latest received emails) that content-wise at least dynamically changes in response to receiving an electronic message or electronic communication (e.g., an email, a text message, an instant message, etc.).

In the same or different implementations, operation 1013 may additionally or alternatively include an operation 1016 for presenting the first augmented view including the one or more persistent dynamic textual augmentations by presenting a first augmented view that includes one or more persistent dynamic textual augmentations that content-wise at least dynamically changes in response to sensor provided data. For instance, the augmented view presenting module 102* of FIG. 7A or 7B presenting the first augmented view including the one or more persistent dynamic textual augmentations by presenting, for example, a first augmented view 60c or 60d of FIG. 6C or 6D that includes one or more persistent dynamic textual augmentations (e.g., the persistent augmentation 62 of FIG. 6C or the persistent augmentation 64 of FIG. 6E) that content-wise at least dynamically changes in response to sensor provided data. For example, the information (e.g., user interest information that a user may want to monitor or may have an interest in) provided through the persistent augmentation 62 of FIG. 6C may change as a result of sensor readings provided by environmental sensors (e.g., thermometer, barometer, etc.). Similarly, the information provided through the persistent augmentation 64 of FIG. 6E may change as a result of sensor readings provided by physiological sensors (e.g., a heart rate or pulse sensor, a blood pressure sensor, a blood sugar sensor, and so forth).

Figure 10D:
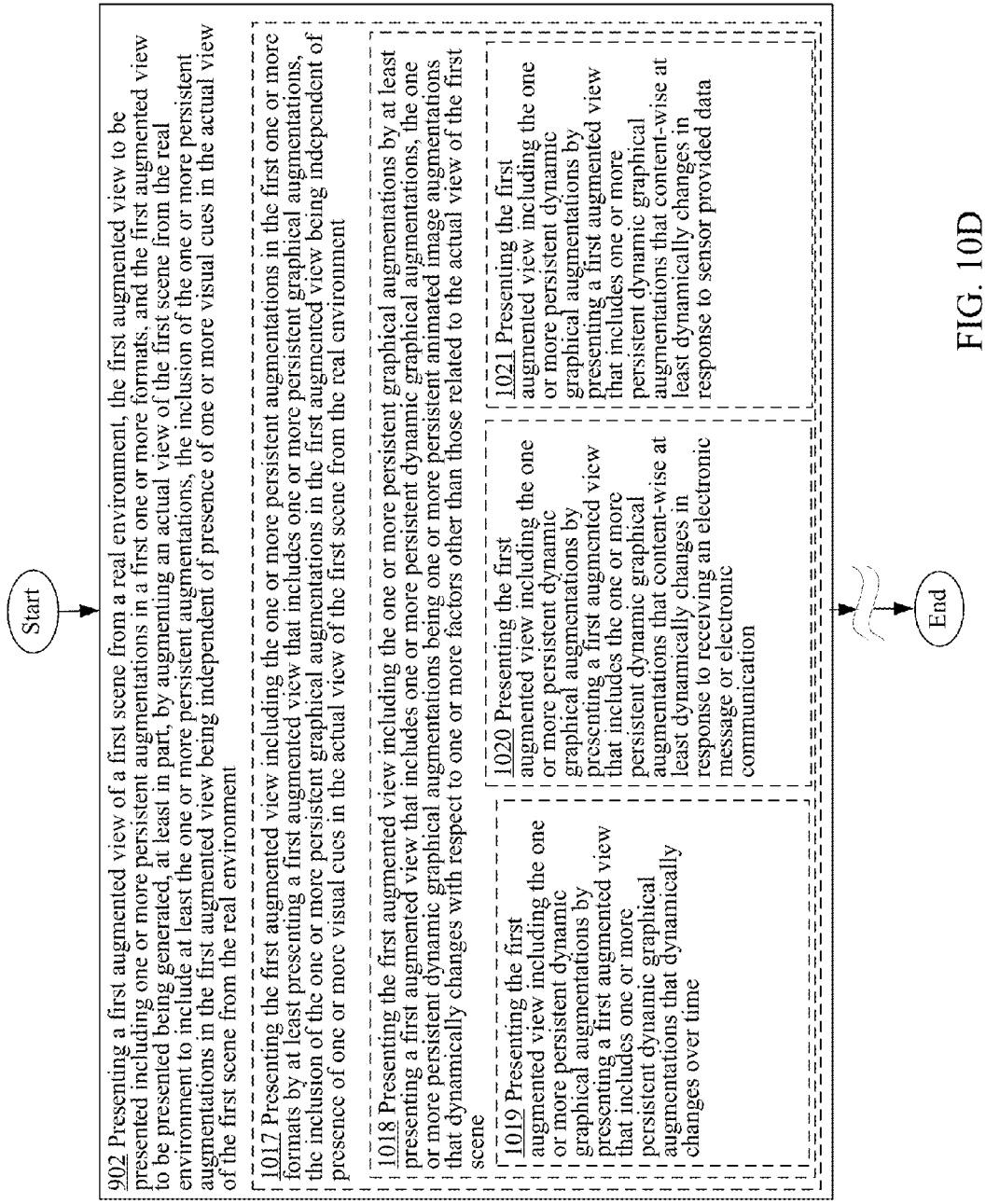
FIG. 10D is a high-level logic flowchart of a process depicting alternate implementations of the first augmented view presenting operation 902 of FIG. 9.

Turning now to FIG. 10D, in the same or different implementations, the first augmented view presenting operation 902 of FIG. 9 may actually involve or include an operation 1017 for presenting the first augmented view including the one or more persistent augmentations in the first one or more formats by at least presenting a first augmented view that includes one or more persistent graphical augmentations, the inclusion of the one or more persistent graphical augmentations in the first augmented view being independent of presence of one or more visual cues in the actual view of the first scene from the real environment. For instance, the augmented view presenting module 102* of FIG. 7A or 7B presenting the first augmented view including the one or more persistent augmentations in the first one or more formats by at least presenting a first augmented view (e.g., the augmented view 60g or 60i of FIG. 6G or 6I) that includes one or more persistent graphical augmentations (e.g., the persistent augmentation 61a or 61b of FIG. 6G or 6I), the inclusion of the one or more persistent graphical augmentations in the first augmented view (e.g., the augmented view 60g or 60i) being independent of presence of (any particular) one or more visual cues in the actual view (e.g., the actual view 60a or 60h of FIG. 6A or 6H) of the first scene (e.g., the office scene of FIG. 6A or the beach scene of FIG. 6H) from the real environment.

As further illustrated in FIG. 10D, operation 1017 may include one or more additional operations in various alternative implementations. For example, in some cases, operation 1017 may include an operation 1018 for presenting the first augmented view including the one or more persistent graphical augmentations by at least presenting a first augmented view that includes one or more persistent dynamic graphical augmentations, the one or more persistent dynamic graphical augmentations being one or more persistent animated image augmentations that dynamically changes with respect to one or more factors other than those related to the actual view of the first scene. For instance, the augmented view presenting module 102* of FIG. 7A or 7B presenting the first augmented view including the one or more persistent graphical augmentations by at least presenting a first augmented view (e.g., the augmented view 60*i* of FIG. 6I) that includes one or more persistent dynamic graphical augmentations (e.g., the persistent augmentation 61*b* of FIG. 6I), the one or more persistent dynamic graphical augmentations (e.g., the persistent augmentation 61*b*) being one or more persistent animated image augmentations that dynamically changes with respect to one or more factors (e.g., time) other than those related to the actual view (e.g., actual view 60*h* of FIG. 6H) of the first scene. For example, the persistent augmentation 61*b* of FIG. 6I being in the shape of a sundial and the shadow of the sundial moving over the course of a day (e.g., over time).

In various implementations, operation 1018 may include or may involve one or more additional operations in various alternative implementations. For example, in some implementations, operation 1018 may include an operation 1019 for presenting the first augmented view including the one or more persistent dynamic graphical augmentations by presenting a first augmented view that includes one or more persistent dynamic graphical augmentations that dynamically changes over time as further illustrated in FIG. 10D. For instance, the augmented view presenting module 102* of FIG. 7A or 7B presenting the first augmented view including the one or more persistent dynamic graphical augmentations by presenting a first augmented view (e.g., the augmented view 60*i* of FIG. 6I) that includes one or more persistent dynamic graphical augmentations (e.g., the persistent augmentation 61*b* of FIG. 6I that is in the form of a sundial) that dynamically changes over time (e.g., the shadow of the sundial persistent augmentation 61*b* of FIG. 6I changing over time).

In the same or alternative implementations, operation 1018 may additionally or alternatively include an operation 1020 for presenting the first augmented view including the one or more persistent dynamic graphical augmentations by presenting a first augmented view that includes the one or more persistent dynamic graphical augmentations that content-wise at least dynamically changes in response to receiving an electronic message or electronic communication. For instance, the augmented view presenting module 102* of FIG. 7A or 7B presenting the first augmented view including the one or more persistent dynamic graphical augmentations by presenting, for example, a first augmented view 60*d* of FIG. 6D that includes the one or more persistent dynamic graphical augmentations (e.g., the persistent augmentation 63 that indicates the latest received emails in a table format) that content-wise at least dynamically changes in response to receiving an electronic message or electronic communication. Note that although the vast majority of the example persistent augmentations (e.g., persistent augmentations 61, 62, 62*a*, 63, 64, 65, 61*a*, 61*c*, 61*e*, and 610 included in the example augmented views illustrated in FIGS. 6B, 6C, 6D, 6E, 6F, 6G, 6M, 6Q, and 6R are primarily textual augmentations, those of ordinary skill in the art would recognize that such augmentations may alternatively be in the form of graphical representations. For example, the temperature information, the barometric information and other environmental information that was textually provided through the persistent augmentation 62 of FIG. 6C may alternatively be provided by presenting an image of a thermometer, a barometric sensor, and so forth.

In the same or alternative implementations, operation 1018 may additionally or alternatively include an operation 1021 for presenting the first augmented view including the one or more persistent dynamic graphical augmentations by presenting a first augmented view that includes one or more persistent dynamic graphical augmentations that content-wise at least dynamically changes in response to sensor provided data. For instance, the augmented view presenting module 102* of FIG. 7A or 7B presenting the first augmented view including the one or more persistent dynamic graphical augmentations by presenting, for example, a first augmented view 60*c* of FIG. 6C that includes one or more persistent dynamic graphical augmentations (e.g., the persistent augmentation 62*a* of FIG. 6C that will show the mercury level of a thermometer moving up and down in accordance with actual sensor provided ambient temperature readings) that content-wise at least dynamically changes in response to sensor provided data.

Various types of information may be provided through the one or more persistent augmentations presented through the first augmented view presenting operation 902 of FIG. 9. For example, and referring now to FIG. 10E, in some implementations, the first augmented view presenting operation 902 of FIG. 9 may actually involve or include an operation 1022 for presenting the first augmented view including the one or more persistent augmentations in the first one or more formats by at least presenting a first augmented view that includes at least one persistent augmentation that provides time data. For instance, the augmented view presenting module 102* of FIG. 7A or 7B presenting, as illustrated in FIG. 6B for example, the first augmented view including the one or more persistent augmentations in the first one or more formats by at least presenting a first augmented view 60*b* that includes at least one persistent augmentation 61 that provides time data (e.g., month, day, year, hour, seconds, timer data, etc.).

Figure 10E:
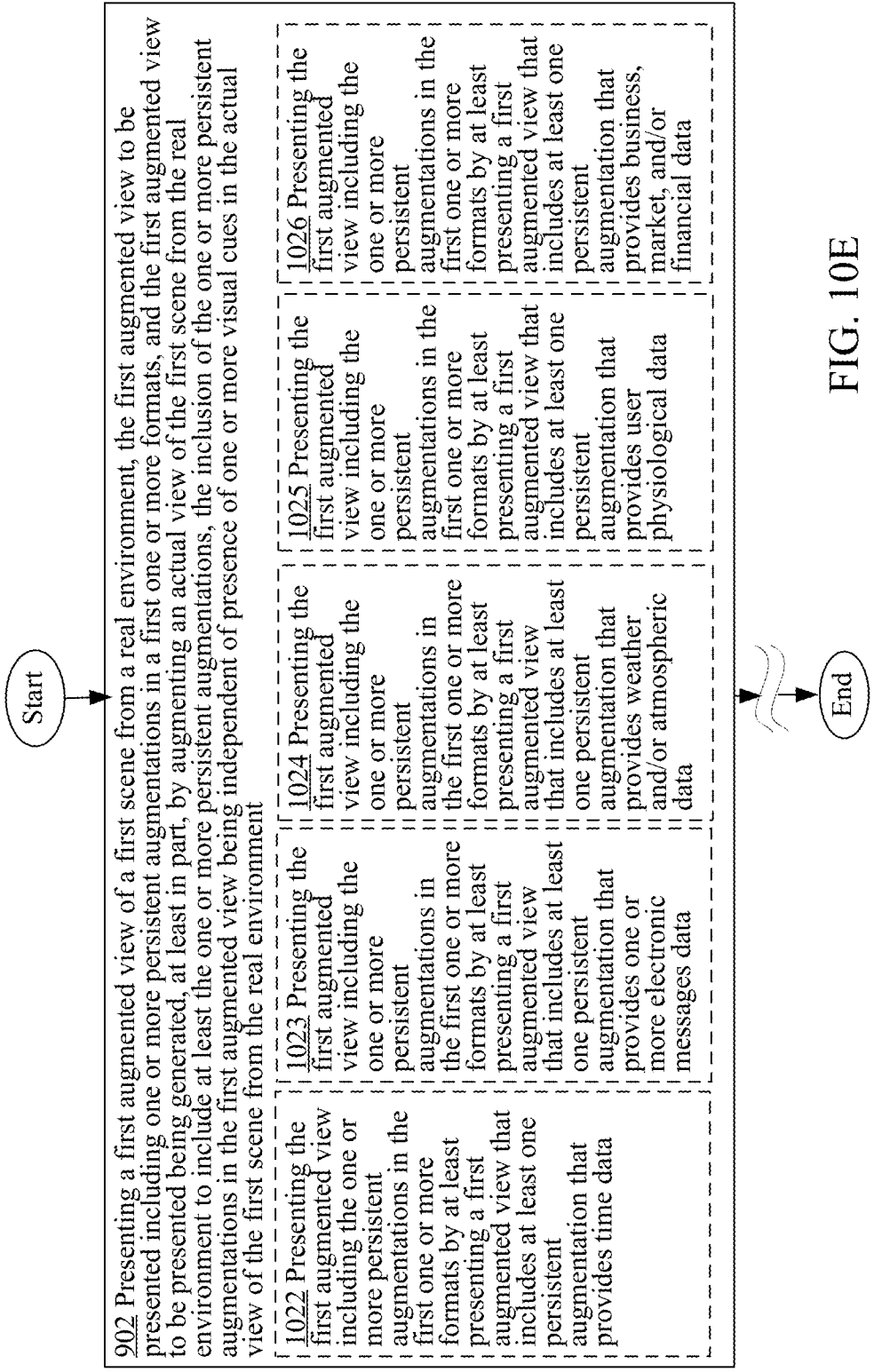
FIG. 10E is a high-level logic flowchart of a process depicting alternate implementations of the first augmented view presenting operation 902 of FIG. 9.

In the same or different implementations, the first augmented view presenting operation 902 of FIG. 9 may additionally or alternatively include an operation 1023 for presenting the first augmented view including the one or more persistent augmentations in the first one or more formats by at least presenting a first augmented view that includes at least one persistent augmentation that provides one or more electronic messages data as further illustrated in FIG. 10E. For instance, the augmented view presenting module 102* of FIG. 7A or 7B presenting, as illustrated in FIG. 6D, for example, the first augmented view including the one or more persistent augmentations in the first one or more formats by at least presenting a first augmented view 60*d* that includes at least one persistent augmentation 63 that provides one or more electronic messages data (e.g., sender's name or address, message subject or heading, and so forth).

In the same or different implementations, the first augmented view presenting operation 902 may additionally or alternatively include an operation 1024 for presenting the first augmented view including the one or more persistent augmentations in the first one or more formats by at least presenting a first augmented view that includes at least one persistent augmentation that provides weather and/or atmospheric data. For instance, the augmented view presenting module 102* of FIG. 7A or 7B presenting, as illustrated in FIG. 6C, for example, the first augmented view including the one or more persistent augmentations in the first one or more formats by at least presenting a first augmented view 60*c* that includes at least one persistent augmentation 62 and/or 62*a* that provides weather and/or atmospheric information (e.g., temperature, pressure, humidity, etc.).

In the same or different implementations, the first augmented view presenting operation 902 may additionally or alternatively include an operation 1025 for presenting the first augmented view including the one or more persistent augmentations in the first one or more formats by at least presenting a first augmented view that includes at least one persistent augmentation that provides user physiological data. For instance, the augmented view presenting module 102* of FIG. 7A or 7B presenting, as illustrated in FIG. 6E, for example, the first augmented view including the one or more persistent augmentations in the first one or more formats by at least presenting a first augmented view 60e that includes at least one persistent augmentation 64 that provides user physiological data (e.g., heart rate, blood pressure, blood glucose level, etc.).

In the same or different implementations, the first augmented view presenting operation 902 may additionally or alternatively include an operation 1026 for presenting the first augmented view including the one or more persistent augmentations in the first one or more formats by at least presenting a first augmented view that includes at least one persistent augmentation that provides business, market, and/or financial data. For instance, the augmented view presenting module 102* of FIG. 7A or 7B presenting, as illustrated in FIG. 6F, for example, the first augmented view including the one or more persistent augmentations in the first one or more formats by at least presenting a first augmented view 60f that includes at least one persistent augmentation 65 that provides business, market, and/or financial data (e.g., stock or commodity prices).

As described earlier, the of the one or more persistent augmentations in the first augmented view, as presented through the first augmented view presenting operation 902 of FIG. 9, "may be independent of presence of one or more visual cues in the actual view of the first scene." There may be various reasons as to why the one or more persistent augmentations to be presented in the first augmented view may be independent of any visual cues in the actual view of the first scene. For example, in the same or different implementations, the first augmented view presenting operation 902 may additionally or alternatively include an operation 1027 for presenting the first augmented view including the one or more persistent augmentations that are independent of the presence of the one or more visual cues in the actual view of the first scene for their inclusion in the first augmented view by at least presenting a first augmented view that includes one or more persistent augmentations that do not rely on the presence of one or more particular visual cues in the actual view of the first scene to exist in the first augmented view as further illustrated in FIG. 10F. For instance, the augmented view presenting module 102* of FIG. 7A or 7B presenting the first augmented view including the one or more persistent augmentations that are independent of the presence of the one or more visual cues in the actual view of the first scene for their inclusion in the first augmented view by at least presenting a first augmented view 60b (see FIG. 6B) that includes one or more persistent augmentations 61 (see FIG. 6B) that do not rely on the presence of one or more particular visual cues in the actual view 60a (see FIG. 6A) of the first scene to exist (e.g., to be presented) in the first augmented view 60b.

Figure 10F:
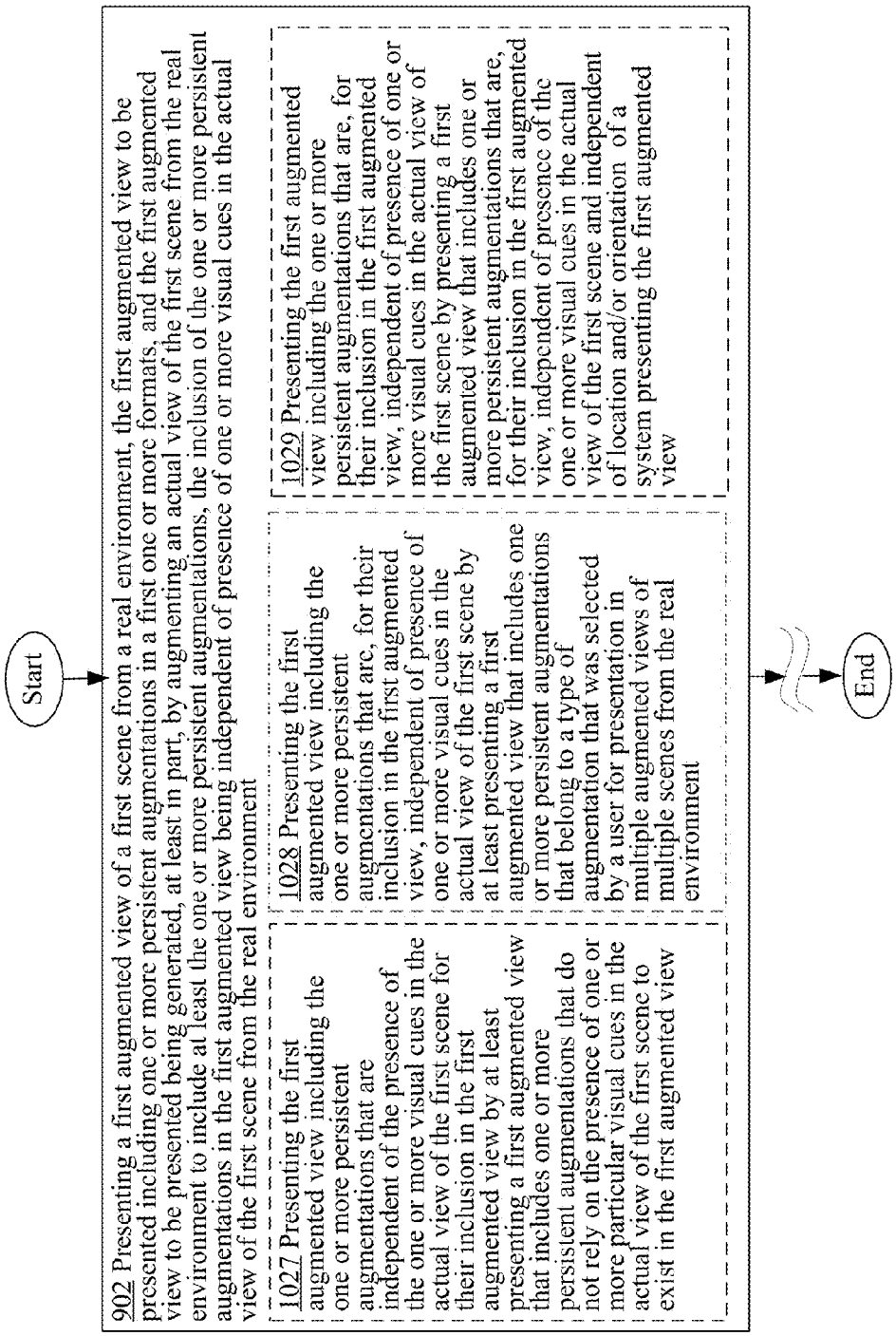
FIG. 10F is a high-level logic flowchart of a process depicting alternate implementations of the first augmented view presenting operation 902 of FIG. 9.
Figure 11:
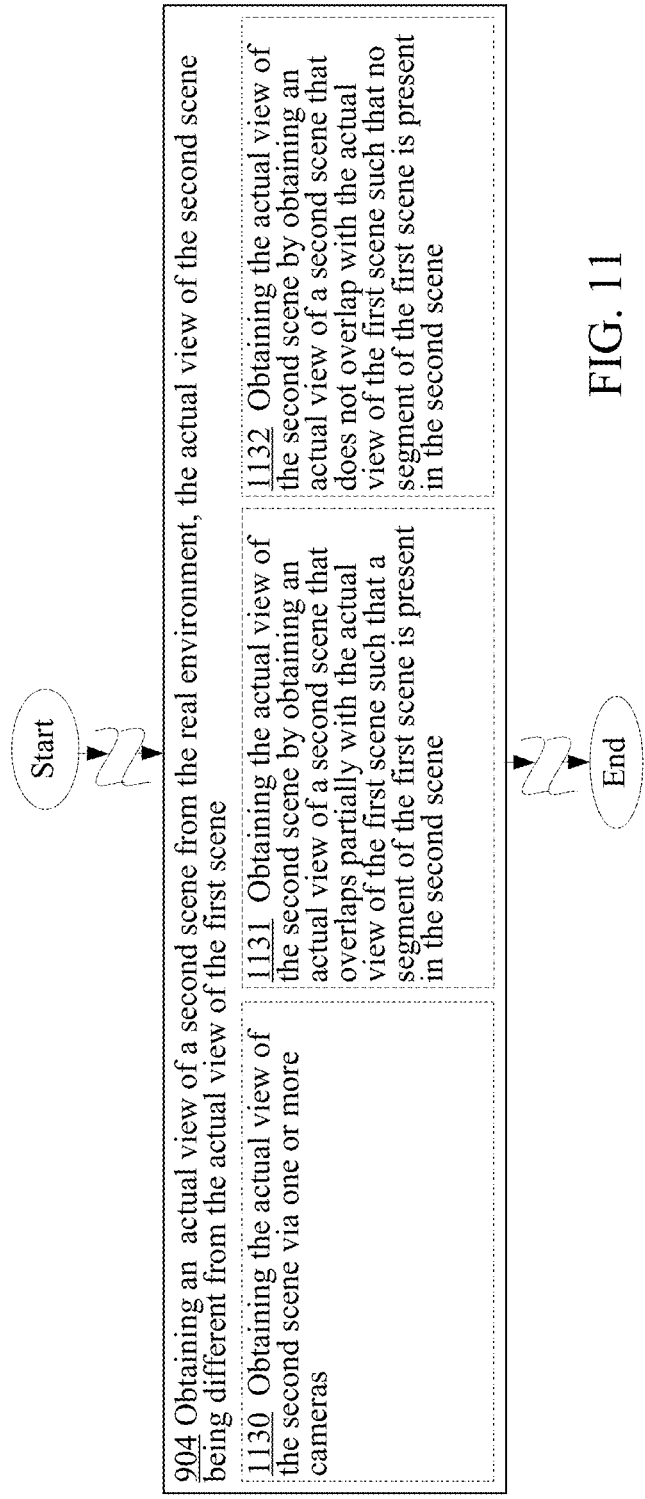
FIG. 11 is a high-level logic flowchart of a process depicting alternate implementations of the actual view obtaining operation 904 of FIG. 9.

As further illustrated in FIG. 10F, in the same or different implementations, the first augmented view presenting operation 902 may additionally or alternatively include an operation 1028 for presenting the first augmented view including the one or more persistent augmentations that are, for their inclusion in the first augmented view, independent of presence of one or more visual cues in the actual view of the first scene by at least presenting a first augmented view that includes one or more persistent augmentations that belong to a type of augmentation that was selected by a user for presentation in multiple augmented views of multiple scenes from the real environment. For instance, the augmented view presenting module 102* of FIG. 7A or 7B presenting the first augmented view including the one or more persistent augmentations that are, for their inclusion in the first augmented view, independent of presence of one or more visual cues in the actual view of the first scene by at least presenting a first augmented view (e.g. augmented view 60b, 60c, 60d, 60e, or 60f of FIGS. 6B, 6C, 6D, 6E, and 6F) that includes one or more persistent augmentations (e.g., persistent augmentation 61, 62, 63, 64, and/or 65) that belong to a type of augmentation that was selected by a user of, for example, the AR device 70* of FIG. 7A or 7B for presentation in multiple augmented views of multiple scenes from the real environment. The type of augmentation selected by the user may provide specific type or types of information such as time information (see, for example, augmented view 60b of FIG. 6B), environmental information (see, for example, augmented view 60c of FIG. 6C), communication information (see, for example, augmented view 60d of FIG. 6D), and so forth. Note that in various alternative implementations, a user may select multiple types of augmentations for presentation in an augmented view (e.g., augmented view 60b, 60c, 60d, 60e, or 60i).

In the same or different implementations, the first augmented view presenting operation 902 may additionally or alternatively include an operation 1029 for presenting the first augmented view including the one or more persistent augmentations that are, for their inclusion in the first augmented view, independent of presence of one or more visual cues in the actual view of the first scene by presenting a first augmented view that includes one or more persistent augmentations that are, for their inclusion in the first augmented view, independent of presence of the one or more visual cues in the actual view of the first scene and independent of location and/or orientation of a system presenting the first augmented view. For instance, the augmented view presenting module 102* of FIG. 7A or 7B presenting the first augmented view including the one or more persistent augmentations that are, for their inclusion in the first augmented view, independent of presence of one or more visual cues in the actual view of the first scene by presenting a first augmented view (e.g., augmented view 60b, 60c, 60d, 60e, 60f, 60g, 60i, 60m, or 60n of FIG. 6B, 6C, 6D, 6E, 6F, 6G, 6I, 6M, or 6N) that includes one or more persistent augmentations (e.g., persistent augmentation 61, 62, 62a, 63, 64, 65, 61a, 61b, 61c, and/or 61d of FIG. 6B, 6C, 6D, 6E, 6F, 6G, 6I, 6M, or 6N) that are, for their inclusion in the first augmented view, independent of presence of the one or more visual cues (e.g., identifiable visual pattern or item) in the actual view of the first scene and independent of location and/or orientation (e.g., tilt, directional orientation, etc.) of a system (e.g., the AR device 70* of FIG. 7A or 7B) presenting the first augmented view.

Referring back to the actual view obtaining operation 904, the actual view obtaining operation 904 similar to the first augmented view presenting operation 902 of FIG. 9 may be executed in a number of different ways in various alternative implementations as illustrated in FIG. 6 For example, in some implementations, the actual view obtaining operation 904 may include an operation 1130 for obtaining the actual view of the second scene via one or more cameras. For instance, the actual view obtaining module 104* of FIG. 7A or 7B obtaining the actual view 60h or 60k of FIG. 6H or 6K for example of the second scene via one or more cameras 870.

In the same or different implementations, the actual view obtaining operation 904 may additionally or alternatively include an operation 1131 for obtaining the actual view of the second scene by obtaining an actual view of a second scene that overlaps partially with the actual view of the first scene such that a segment of the first scene is present in the second scene. For instance, the actual view obtaining module 104* of FIG. 7A or 7B obtaining the actual view of the second scene by obtaining an actual view 53b (see FIG. 5B) of a second scene that overlaps (see overlap 55 of FIG. 5B) partially with the actual view of the first scene 53a (see FIG. 5B) such that a segment (see overlap 55 of FIG. 5B) of the first scene is present in the second scene.

In the same or different implementations, the actual view obtaining operation 904 may additionally or alternatively include an operation 1132 for obtaining the actual view of the second scene by obtaining an actual view of a second scene that does not overlap with the actual view of first scene such that no segment of the first scene is present in the second scene. For instance, the actual view obtaining module 104* of FIG. 7A or 7B obtaining the actual view of the second scene by obtaining an actual view (e.g., actual view 53d of FIG. 5C) of a second scene that does not overlap with the actual view of the first scene such that no segment of the first scene is present in the second scene as illustrated in, for example, FIG. 5C.

Figure 12A:
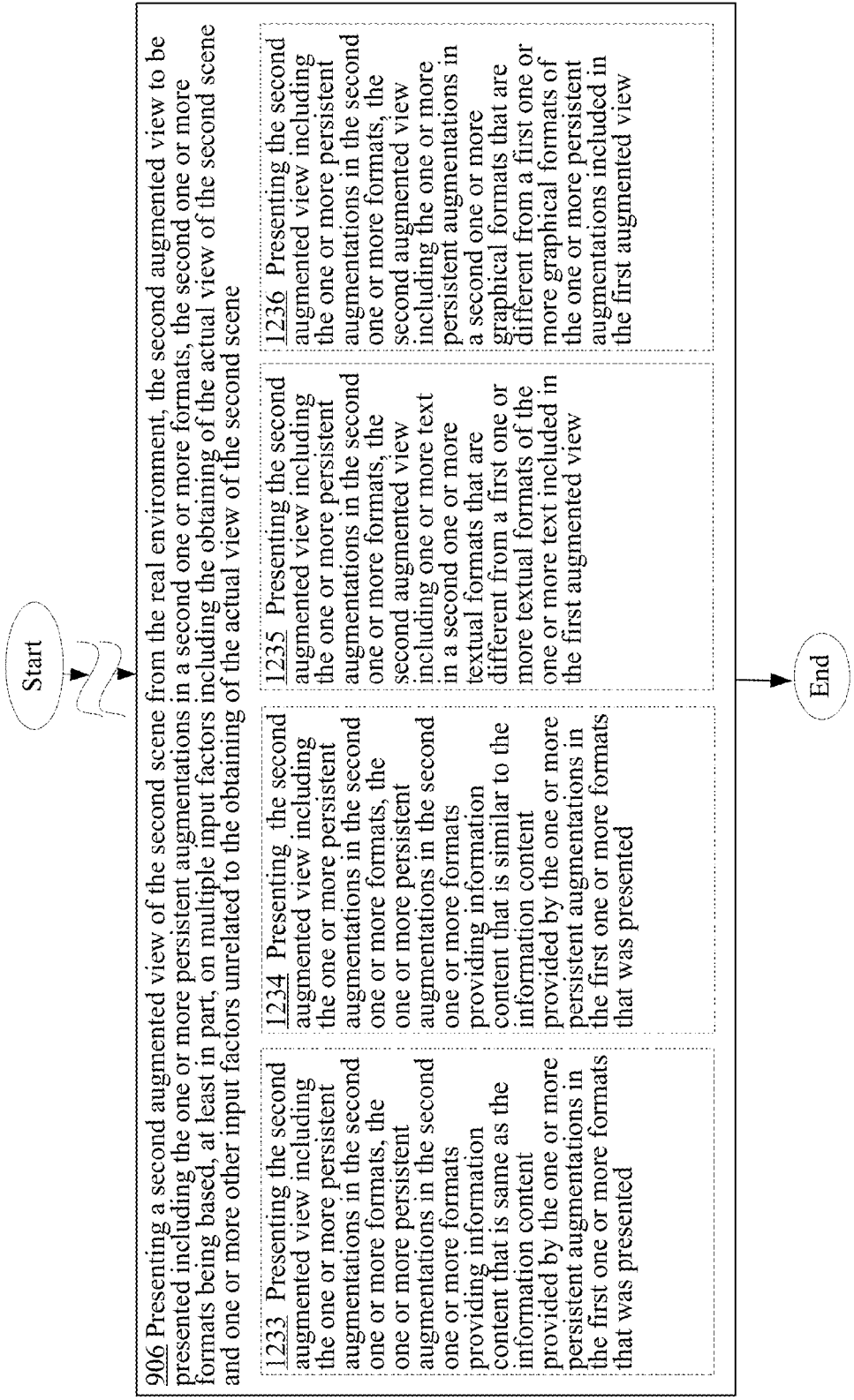
FIG. 12A is a high-level logic flowchart of a process depicting alternate implementations of the second augmented view presenting operation 906 of FIG. 9.

Referring back to the second augmented view presenting operation 906 of FIG. 9, the second augmented view presenting operation 906 similar to the first augmented view presenting operation 902 and the actual view obtaining operation 904 of FIG. 9 may be executed in a number of different ways in various alternative embodiments as illustrated in FIGS. 12A, 12B, 12C, 12D, 12E, 12F, and 12G. In some implementations, for example, the second augmented view presenting operation 906 may include an operation 1233 for presenting the second augmented view including the one or more persistent augmentations in the second one or more formats, the one or more persistent augmentations in the second one or more formats providing information content that is same as the information content provided by the one or more persistent augmentations in the first one or more formats that was presented as illustrated in FIG. 12A. For instance, the augmented view presenting module 102* of FIG. 7A or 7B presenting the second augmented view 60m (see FIG. 6M) including the one or more persistent augmentations in the second one or more formats (e.g., persistent augmentation 61c of FIG. 6M in which the persistent "time" augmentation 61c is located at a different location in the augmented view 60i than the location of the persistent augmentation 61 in the augmented view 60b of FIG. 6B), the one or more persistent augmentations 61c in the second one or more formats (e.g., plain text format and located at bottom right corner of the augmented view 60m as depicted in FIG. 6M) providing information content (e.g., time) that is same as the information content provided by the one or more persistent augmentations (e.g., the persistent augmentation 61 of FIG. 6I) in the first one or more formats (e.g., time data being presented in the form of a sundial) that was presented.

As further illustrated in FIG. 12A, in the same or different implementations, the second augmented view presenting operation 906 may include an operation 1234 for presenting the second augmented view including the one or more persistent augmentations in the second one or more formats, the one or more persistent augmentations in the second one or more formats providing information content that is similar to the information content provided by the one or more persistent augmentations in the first one or more formats that was presented. For instance, the augmented view presenting module 102* of FIG. 7A or 7B presenting the second augmented view 60n (see FIG. 6N) including the one or more persistent augmentations in the second one or more formats (e.g., persistent augmentation 61d in the shape of a wristwatch), the one or more persistent augmentations (e.g., persistent augmentation 61d) in the second one or more formats providing information content (e.g., time) that is similar to the information content provided by the one or more persistent augmentations in the first one or more formats (e.g., the persistent augmentation 61a of FIG. 6G) that was presented. Note that the phrase "similar to" used herein may be in reference to the substantive content (e.g., time information here but in other cases it may be user blood pressure, user or ambient room temperature, and so forth) that is being provided by the one or more persistent augmentations in the second one or more formats is or are at least comparable or related to the content provided by the one or more persistent augmentations in the first one or more formats.

In the same or different implementations, the second augmented view presenting operation 906 may include an operation 1235 for presenting the second augmented view including the one or more persistent augmentations in the second one or more formats, the second augmented view including one or more text in a second one or more textual formats that are different from a first one or more textual formats of the one or more text included in the first augmented view. For instance, the augmented view presenting module 102* of FIG. 7A or 7B presenting the second augmented view 60n (see FIG. 6N) including the one or more persistent augmentations in the second one or more formats (e.g., persistent augmentation 61d in the shape of a wristwatch), the second augmented view 60n including one or more text (e.g., alphanumeric characters) in a second one or more textual formats (note that the wristwatch may include text in the form of numbers in one or more particular formats) that are different from a first one or more textual formats of the one or more text included in the first augmented view e.g., the persistent augmentation 61a of FIG. 6G).

In the same or different implementations, the second augmented view presenting operation 906 may include an operation 1236 for presenting the second augmented view including the one or more persistent augmentations in the second one or more formats, the second augmented view including the one or more persistent augmentations in a second one or more graphical formats that are different from a first one or more graphical formats of the one or more persistent augmentations included in the first augmented view. For instance, the augmented view presenting module 102* of FIG. 7A or 7B presenting the second augmented view 60i (see FIG. 6I) including the one or more persistent augmentations (e.g., persistent augmentation 61b of FIG. 6I) in the second one or more formats, the second augmented view 60i including the one or more persistent augmentations (e.g., persistent augmentation 61b) in a second one or more graphical formats (e.g., sundial) that are different from a first one or more graphical formats (e.g., wristwatch face) of the one or more persistent augmentations (e.g., persistent augmentation 61d in FIG. 6N) included in the first augmented view 60n (see FIG. 6N).

Figure 12B:
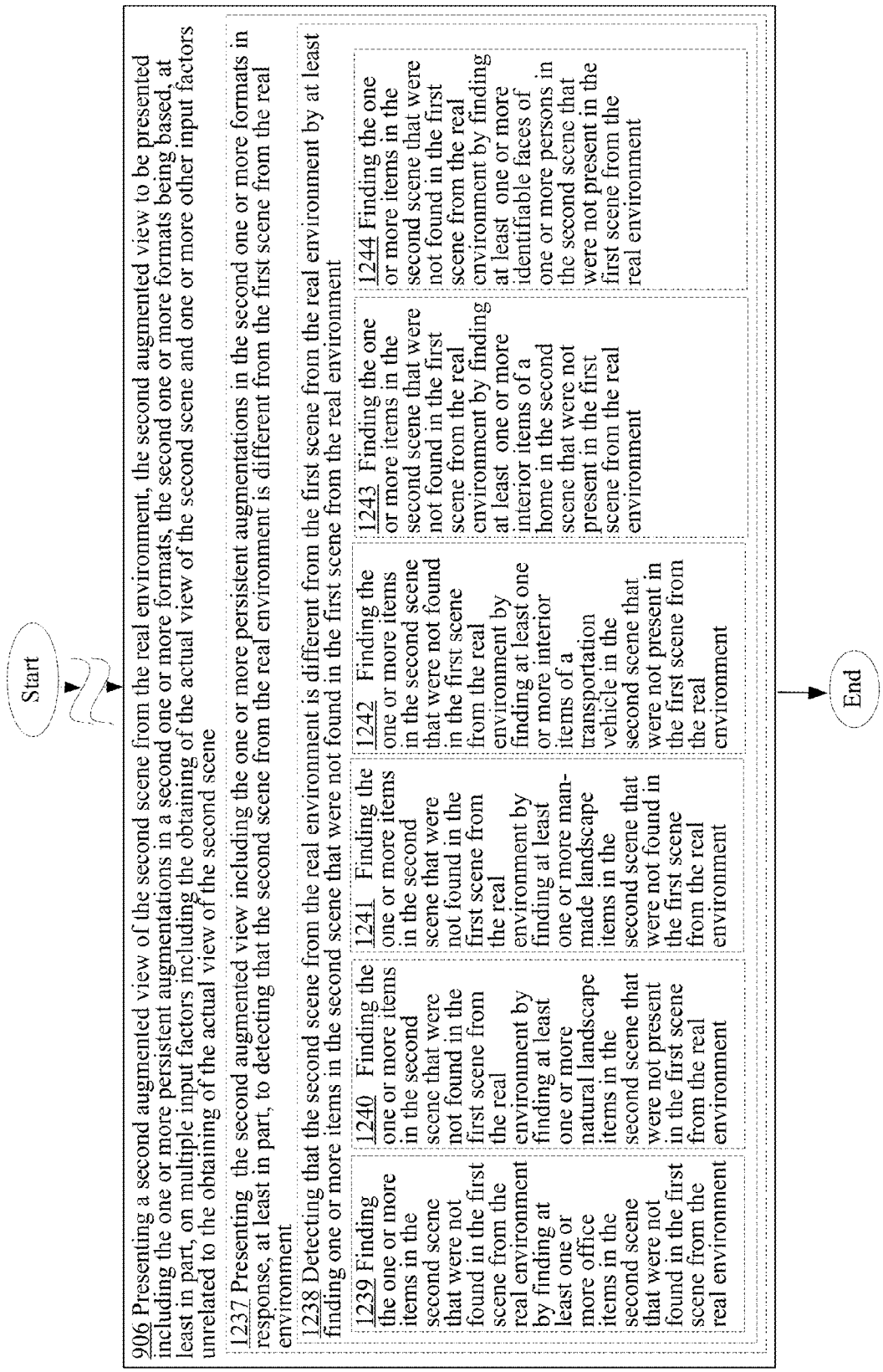
FIG. 12B is a high-level logic flowchart of a process depicting alternate implementations of the second augmented view presenting operation 906 of FIG. 9.

In various implementations, the second one or more formats of the one or more persistent augmentations that are to be presented through the second augmented view presenting operation 906 of FIG. 9 may be based, at least in part, on one or more factors related to the obtaining of the actual view of the second scene executed during the actual view obtaining operation 904 of FIG. 9. For example, and as illustrated in FIG. 12B, the second augmented view presenting operation 906 of FIG. 9 may include an operation 1237 for presenting the second augmented view including the one or more persistent augmentations in the second one or more formats in response, at least in part, to detecting that the second scene from the real environment is different from the first scene from the real environment. For instance, the augmented view presenting module 102* of FIG. 7A or 7B including a scene difference detecting module 804 (see FIG. 8A) presenting the second augmented view 60*i* (see FIG. 6I) including the one or more persistent augmentations (e.g., persistent augmentation 61*b*) in the second one or more formats (e.g., sundial) in response, at least in part, to detecting by the scene difference detecting module 804 that the second scene (see, for example, actual view 60*h* of FIG. 6H) from the real environment is different from the first scene (see, for example, the actual view 60*a* of FIG. 6A) from the real environment.

As further illustrated in FIG. 12B, operation 1237 may actually include or involve one or more additional operations in various implementations. For example, in certain implementations, operation 1237 include an operation 1238 for detecting that the second scene from the real environment is different from the first scene from the real environment by at least finding one or more items in the second scene that were not found in the first scene from the real environment. For instance the scene difference detecting module 804 including an item finding module 806 (see FIG. 8A) of the AR device 70* of FIG. 7A or 7B detecting that the second scene (see, for example, actual view 60*h* of FIG. 6H) from the real environment is different from the first scene (see, for example, actual view 60*k* of FIG. 6K) from the real environment when the item finding module 806 finds at least one or more items (e.g., a visual object or a combination of such objections such as a body of water such as the ocean, a beach, a building, a sign, and/or any other objects that have identifiable feature or features) in the second scene that were not found in the first scene from the real environment.

In some cases, operation 1238 may include an operation 1239 for finding the one or more items in the second scene that were not found in the first scene from the real environment by finding at least one or more office items in the second scene that were not found in the first scene from the real environment. For instance, the item finding module 806 including an office item finding module 807 (see FIG. 8A) of the AR device 70* of FIG. 7A or 7B finding the one or more items in the second scene (e.g. actual view 60*a* of FIG. 6A) that were not found in the first scene (e.g., actual view 60*h* of FIG. 6H) from the real environment when the office item finding module 807 finds at least one or more office items (e.g., wall painting or picture, a keyboard, etc.) in the second scene (e.g. actual view 60*a* of FIG. 6A) that were not found in the first scene (e.g., actual view 60*h* of FIG. 6H) from the real environment.

In the same or different implementations, operation 1238 may include an operation 1240 for finding the one or more items in the second scene that were not found in the first scene from the real environment by finding at least one or more natural landscape items in the second scene that were not present in the first scene from the real environment. For instance, the item finding module 806 including a natural landscape item finding module 808 (see FIG. 8A) of the AR device 70* of FIG. 7A or 7B finding the one or more items in the second scene (see, for example, the actual view 60*h* of FIG. 6H) that were not found in the first scene (see, for example, the actual view 60*a* of FIG. 6A) from the real environment when the natural landscape item finding module 808 finds at least one or more natural landscape items (e.g., body of water, beach, mountains, and so forth) in the second scene (e.g., the actual view 60*h* of FIG. 6H) that were not present in the first scene (the actual view 60*a* of FIG. 6A) from the real environment.

In the same or different implementations, operation 1238 may include an operation 1241 for finding the one or more items in the second scene that were not found in the first scene from the real environment by finding at least one or more man-made landscape items in the second scene that were not found in the first scene from the real environment. For instance, the item finding module 806 including a man-made landscape item finding module 809 (see FIG. 8A) of the AR device 70* of FIG. 7A or 7B finding the one or more items in the second scene (see, for example, the actual view 60*k* of FIG. 6K) that were not found in the first scene (see, for example, the actual view 60*h* of FIG. 6H) from the real environment when the man-made landscape item finding module 809 finds at least one or more man-made landscape items (e.g., buildings, roads, street signs, and so forth) in the second scene (see, for example, the actual view 60*k* of FIG. 6K) that were not found in the first scene (see, for example, the actual view 60*h* of FIG. 6H) from the real environment.

In the same or different implementations, operation 1238 may include an operation 1242 for finding the one or more items in the second scene that were not found in the first scene from the real environment by finding at least one or more interior items of a transportation vehicle in the second scene that were not present in the first scene from the real environment. For instance, the item finding module 806 including a vehicle interior item finding module 810 (see FIG. 8A) of the AR device 70* of FIG. 7A or 7B finding the one or more items in the second scene (see, for example, the actual view 60*p* of FIG. 6P) that were not found in the first scene (see, for example, the actual view 60*h* of FIG. 6H) from the real environment when the vehicle interior item finding module 810 finds at least one or more interior items (e.g., steering wheel, rear view mirror, gauges, and so forth) of a transportation vehicle (e.g., automobile, boat, airplane, and so forth) in the second scene (see, for example, the actual view 60*p* of FIG. 6P) that were not present in the first scene (see, for example, the actual view 60*h* of FIG. 6H) from the real environment.

In the same or different implementations, operation 1238 may include an operation 1243 for finding the one or more items in the second scene that were not found in the first scene from the real environment by finding at least one or more interior items of a home in the second scene that were not present in the first scene from the real environment. For instance, the item finding module 806 including an home interior item finding module 811 (see FIG. 8A) of the AR device 70* of FIG. 7A or 7B finding the one or more items in the second scene that were not found in the first scene from the real environment when the home interior item finding module 811 finds at least one or more interior items (e.g., a particular wall painting or photo, a couch, a kitchen or kitchen item, and so forth) of a home in the second scene that were not present in the first scene from the real environment.

In the same or different implementations, operation 1238 may include an operation 1244 for finding the one or more items in the second scene that were not found in the first scene from the real environment by finding at least one or more identifiable faces of one or more persons in the second scene that were not present in the first scene from the real environment. For instance, the item finding module 806 including an identifiable face finding module 812 (see FIG. 8A) of the AR device 70* of FIG. 7A or 7B finding the one or more items in the second scene that were not found in the first scene from the real environment when the home interior item finding module 811 finds at least one or more identifiable faces of one or more persons (e.g., a spouse and/or family member or members of the user of the AR device 70* or employer or co-worker of the user of the AR device 70*) in the second scene that were not present in the first scene from the real environment.

Figure 12C:
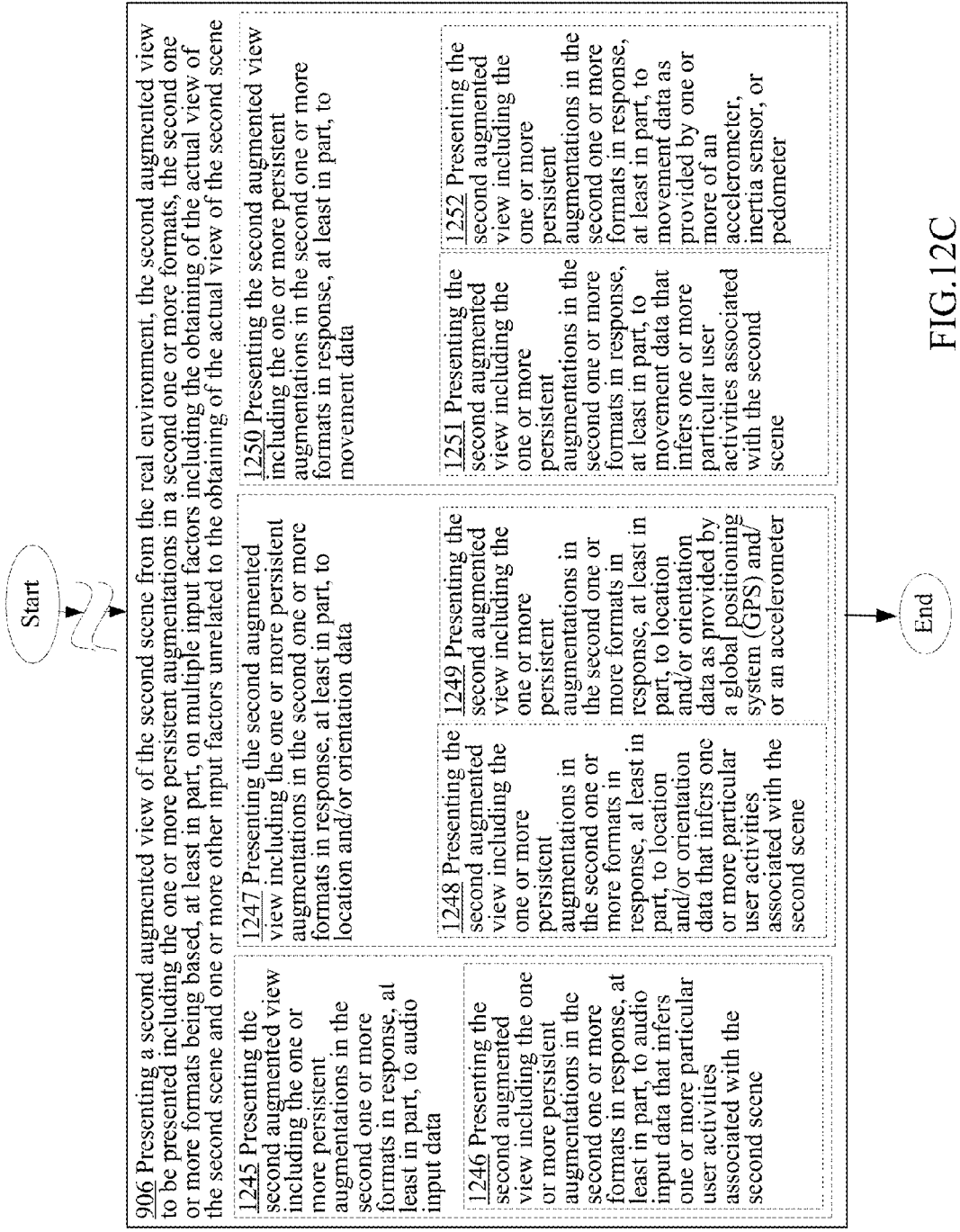
FIG. 12C is a high-level logic flowchart of a process depicting alternate implementations of the second augmented view presenting operation 906 of FIG. 9.

In various implementations, the second one or more formats of the one or more persistent augmentations that are to be presented through the second augmented view presenting operation 906 of FIG. 9 may be based, at least in part, on one or more factors other than those related to the obtaining of the actual view of the second scene executed during the actual view obtaining operation. For example, and as illustrated in FIG. 12C, in some implementations, the second augmented view presenting operation 906 may include an operation 1245 for presenting the second augmented view including the one or more persistent augmentations in the second one or more formats in response, at least in part, to audio input data. For instance, the augmented view presenting module 102* of FIG. 7A or 7B including an audio input data responsive module 814 (see FIG. 8A) presenting the second augmented view 60i (see FIG. 6I) including the one or more persistent augmentations (e.g., persistent augmentation 61b of FIG. 6I) in the second one or more formats (e.g., sundial) in response, at least in part, by the audio input data responsive module 814 to audio input data (e.g., audio data of ocean waves crashing on the beach, the howling of ocean winds and/or birds).

In some cases, operation 1245 may include an operation 1246 for presenting the second augmented view including the one or more persistent augmentations in the second one or more formats in response, at least in part, to audio input data that infers one or more particular user activities associated with the second scene. For instance, the augmented view presenting module 102* of FIG. 7A or 7B including the audio input data responsive module 814 (see FIG. 8A) presenting the second augmented view 60r (see FIG. 6R) including the one or more persistent augmentations (e.g., persistent augmentation 61e of FIG. 6Q) in the second one or more formats (e.g., standard textual format at a preselected location of the augmented view 60r) in response, at least in part, by the audio input data responsive module 814 to audio input data (e.g., sound of an automobile engine) that infers one or more particular user activities (e.g. driving a car) associated with the second scene (e.g., interior of a car).

In the same or alternative implementations, the second augmented view presenting operation 906 may include or involve an operation 1247 for presenting the second augmented view including the one or more persistent augmentations in the second one or more formats in response, at least in part, to location and/or orientation data as illustrated in FIG. 12C. For instance, the augmented view presenting module 102* of FIG. 7A or 7B including a location/orientation data responsive module 816 (see FIG. 8A) presenting the second augmented view including the one or more persistent augmentations in the second one or more formats in response, at least in part, by the location/orientation data responsive module 816 to location and/or orientation data (e.g., location and/or orientation of the AR device 70*).

As further illustrated in FIG. 12C, operation 1247 may include one or more additional operations in various implementations. For example, in some implementations, operation 1247 may include an operation 1248 for presenting the second augmented view including the one or more persistent augmentations in the second one or more formats in response, at least in part, to location and/or orientation data that infers one or more particular user activities associated with the second scene. For instance, the augmented view presenting module 102* of FIG. 7A or 7B including the location/orientation data responsive module 816 presenting the second augmented view 60i (FIG. 6I) including the one or more persistent augmentations in the second one or more formats (e.g., persistent "time" augmentation 61b in the form of a sundial) in response, at least in part, by the location/orientation data responsive module 816 to location and/or orientation data that infers one or more particular user activities (e.g., relaxing or vacationing on the beach) associated with the second scene.

In the same or different implementations, operation 1247 may additionally or alternatively include or involve an operation 1249 for presenting the second augmented view including the one or more persistent augmentations in the second one or more formats in response, at least in part, to location and/or orientation data as provided by a global positioning system (GPS) and/or an accelerometer. For instance, the augmented view presenting module 102* of FIG. 7A or 7B including the location/orientation data responsive module 816 presenting the second augmented view including the one or more persistent augmentations in the second one or more formats in response, at least in part, by the location/orientation data responsive module 816 to location and/or orientation data as provided by a global positioning system (GPS) and/or an accelerometer. Note that references to a global positioning system (GPS) here may be in reference to a satellite based system, a cellular based system, and/or other types of systems for determining locations.

In some implementations, the second augmented view presenting operation 906 may include or involve an operation 1250 for presenting the second augmented view including the one or more persistent augmentations in the second one or more formats in response, at least in part, to movement data. For instance, the augmented view presenting module 102* of FIG. 7A or 7B including a movement data responsive module 818 (see FIG. 8A) presenting the second augmented view including the one or more persistent augmentations in the second one or more formats in response, at least in part, by the movement data responsive module 818 to movement data (e.g., data provided by one or more orientation and/or movement sensors 876 to sense movements and/or orientation of the AR device 70* of FIG. 7A or 7B. The movements indicated by the movement data may suggest or infer the activities of the AR device user of the AR device 70*. The detected movements in conjunction with other data (e.g., location data) may further suggest or infer the mood or atmosphere of the environment (e.g., scenes) surrounding the AR device 70* and its user.

As further illustrated in FIG. 12C, operation 1250 may include one or more additional operations in various implementations. For example, in some implementations, operation 1250 may include an operation 1251 for presenting the second augmented view including the one or more persistent augmentations in the second one or more formats in response, at least in part, to movement data that infers one or more particular user activities associated with the second scene. For instance, the augmented view presenting module 102* of FIG. 7A or 7B including the movement data responsive module 818 (see FIG. 8A) presenting the second augmented view including the one or more persistent augmentations in the second one or more formats in response, at least in part, by the movement data responsive module 818 to movement data that infers one or more particular user activities (e.g., jogging, riding a bicycle, riding or driving an automobile, and so forth) associated with the second scene (e.g., the user of the AR device 70* jogging past a particular identifiable location or scene).

In the same or different implementations, operation 1250 may additionally or alternatively include or involve an operation 1252 for presenting the second augmented view including the one or more persistent augmentations in the second one or more formats in response, at least in part, to movement data as provided by one or more of an accelerometer, inertia sensor, or pedometer. For instance, the augmented view presenting module 102* of FIG. 7A or 7B including the movement data responsive module 818 presenting the second augmented view including the one or more persistent augmentations in the second one or more formats in response, at least in part, by the movement data responsive module 818 to movement data as provided by one or more of an accelerometer 877, inertia sensor 879, or pedometer 880.

Figure 12D:
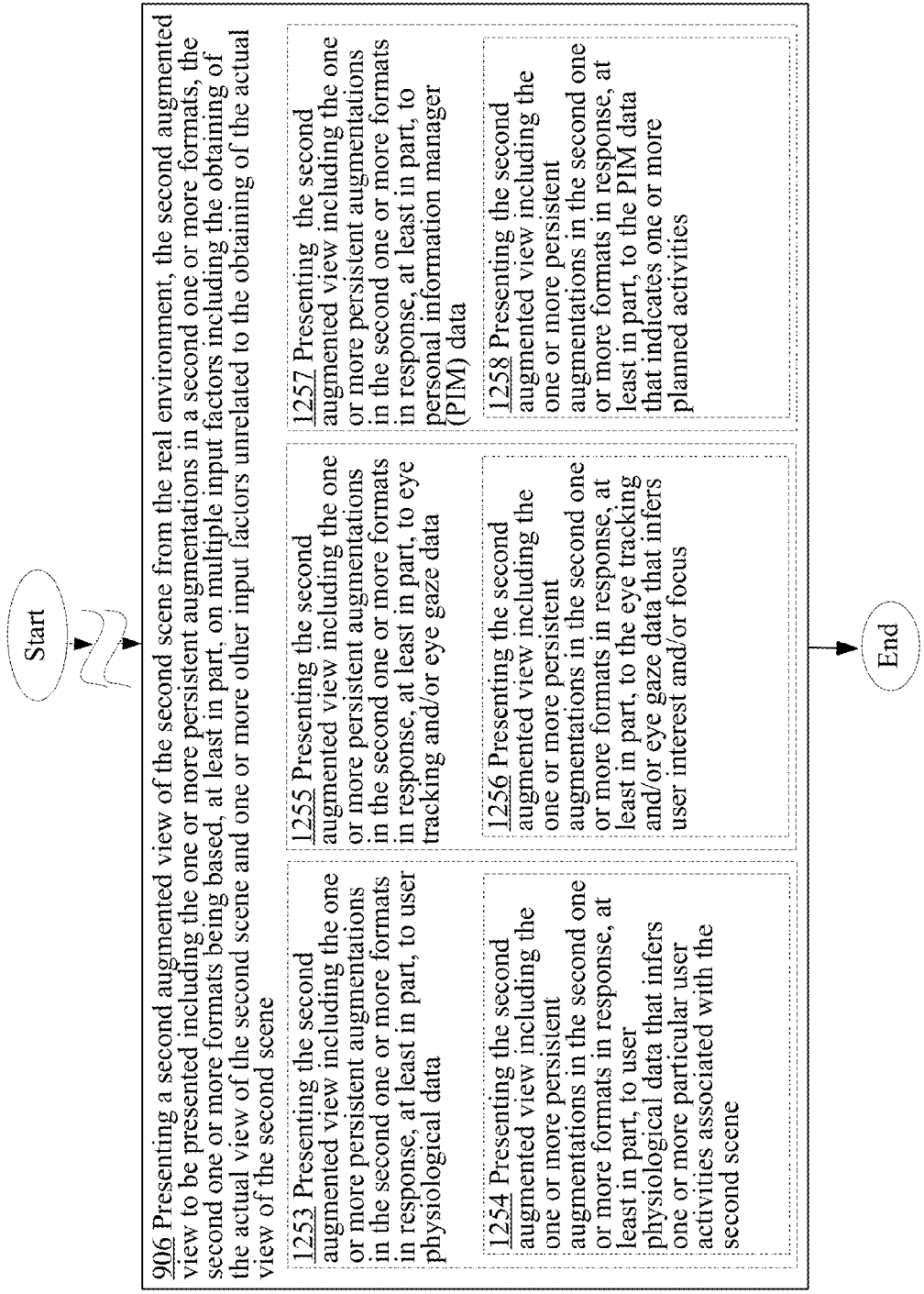
FIG. 12D is a high-level logic flowchart of a process depicting alternate implementations of the second augmented view presenting operation 906 of FIG. 9.

Referring now to FIG. 12D, in some implementations, the second augmented view presenting operation 906 may include or involve an operation 1253 for presenting the second augmented view including the one or more persistent augmentations in the second one or more formats in response, at least in part, to user physiological data. For instance, the augmented view presenting module 102* of FIG. 7A or 7B including a user physiological data responsive module 820 (see FIG. 8A) presenting the second augmented view including the one or more persistent augmentations in the second one or more formats in response, at least in part, by the user physiological data responsive module 820 to user physiological data (e.g., data that indicates blood pressure, heart rate, pupil dilation, skin characteristics such as galvanic skin response using a galvanic skin sensor device, and so forth). Such data in some implementations may be used in order to infer, for example, the emotional state or mood of a user using the AR device 70*. Based on such a determination, an inference may be made in some cases as to the mood or atmosphere of the environment surrounding the AR device 10* and its user.

As further illustrated in FIG. 12D, in some implementations, operation 1253 may include an operation 1254 for presenting the second augmented view including the one or more persistent augmentations in the second one or more formats in response, at least in part, to user physiological data that infers one or more particular user activities associated with the second scene. For instance, the augmented view presenting module 102* of FIG. 7A or 7B including the user physiological data responsive module 820 presenting the second augmented view including the one or more persistent augmentations in the second one or more formats in response, at least in part, by the user physiological data responsive module 820 to user physiological data that infers one or more particular user activities (e.g., increased heart rate of the AR device user suggesting strenuous physical activities such as riding a bicycle, elevated blood sugar level suggesting dining activities, and so forth) associated with the second scene. Note that in various implementations, the physiological data along with other types of data such as visual or image data that provides one or more visual cues may be processed in order to determine the mood or atmosphere of the real environment (e.g., scenes) surrounding the AR device 70* and its user.

In the same or different implementations, the second augmented view presenting operation 906 of FIG. 9 may include or involve an operation 1255 for presenting the second augmented view including the one or more persistent augmentations in the second one or more formats in response, at least in part, to eye tracking and/or eye gaze data as further illustrated in FIG. 12D. For instance, the augmented view presenting module 102* of FIG. 7A or 7B including an eye tracking/gaze responsive module 822 (see FIG. 8A) presenting the second augmented view including the one or more persistent augmentations in the second one or more formats in response, at least in part, by the eye tracking/gaze responsive module 822 to eye tracking and/or eye gaze data. The eye tracking and/or eye gaze data may be processed in order to determine what object or objects the AR device user is focused on or tracking Such information may then be used in order to select the proper format for the one or more persistent augmentations to be presented to the AR device user.

As further illustrated in FIG. 12D, in some cases, operation 1255 may further include an operation 1256 for presenting the second augmented view including the one or more persistent augmentations in the second one or more formats in response, at least in part, to the eye tracking and/or eye gaze data that infers user interest and/or focus. For instance, the augmented view presenting module 102* of FIG. 7A or 7B including the eye tracking/gaze responsive module 822 presenting the second augmented view including the one or more persistent augmentations in the second one or more formats in response, at least in part, by the eye tracking/gaze responsive module 822 to the eye tracking and/or eye gaze data that infers user interest and/or focus as it relates to, for example, a scene from the real environment.

In the same or different implementations, the second augmented view presenting operation 906 of FIG. 9 may include or involve an operation 1257 for presenting the second augmented view including the one or more persistent augmentations in the second one or more formats in response, at least in part, to personal information manager (PIM) data. For instance, the augmented view presenting module 102* of FIG. 7A or 7B including a PIM data responsive module 824 (see FIG. 8A) presenting the second augmented view including the one or more persistent augmentations in the second one or more formats in response, at least in part, by the PIM data responsive module 824 to PIM data provided by a PIM application (e.g., Microsoft's Outlook). Examples of PIM data include, for example, appointment schedules.

As further illustrated in FIG. 12D, in some cases, operation 1257 may further include an operation 1258 for presenting the second augmented view including the one or more persistent augmentations in the second one or more formats in response, at least in part, to the PIM data that indicates one or more planned activities. For instance, the augmented view presenting module 102* of FIG. 7A or 7B including the PIM data responsive module 824 presenting the second augmented view including the one or more persistent augmentations in the second one or more formats in response, at least in part, by the PIM data responsive module 824 to the PIM data that indicates one or more planned activities (e.g., attending a funeral, shopping trip, leisure activities such as boating or hiking, and so forth).

The selection of the second one or more formats for formatting the persistent one or more augmentations may involve a number of factors. For example, and turning now to FIG. 12k, in some implementations, the second augmented view presenting operation 906 of FIG. 9 may include or involve an operation 1259 for presenting a second augmented view including the one or more persistent augmentations in a second one or more formats, the second one or more formats to be applied to the one or more persistent augmentations being selected based on a determination of one or more user activities as inferred by the multiple input factors. For instance, the augmented view presenting module 102* of FIG. 7A or 7B including a format selecting module 826 and a user activity determining module 828 (see FIG. 8A) presenting a second augmented view including the one or more persistent augmentations (e.g., time augmentation) in a second one or more formats (e.g., sundial), the second one or more formats to be applied to the one or more persistent augmentations being selected by the format selecting module 826 based on a determination by the user activity determining module 828 of one or more user activities (e.g., laying out on the beach relaxing) as inferred by the multiple input factors.

Figure 12E:
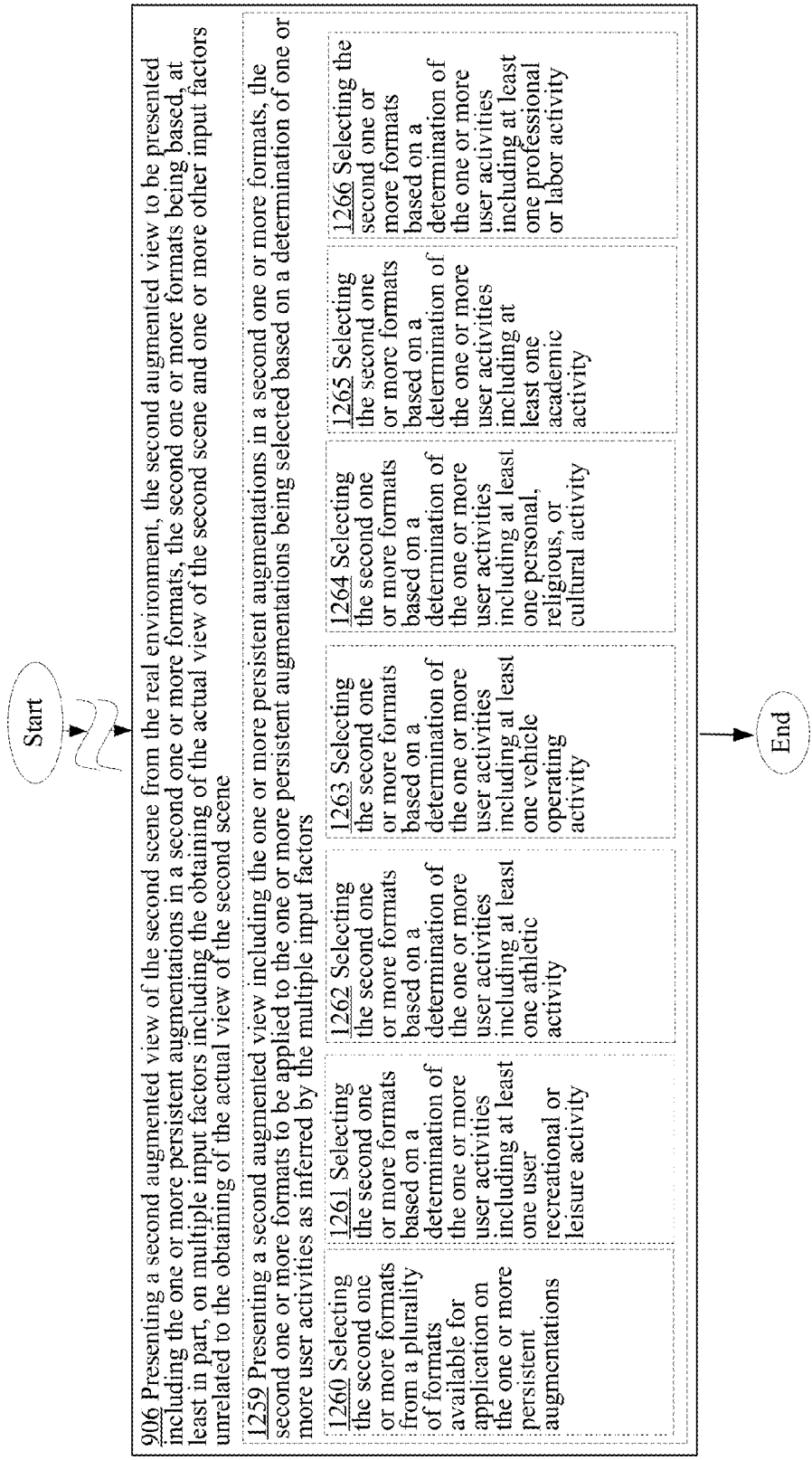
FIG. 12E is a high-level logic flowchart of a process depicting alternate implementations of the second augmented view presenting operation 906 of FIG. 9.

As further illustrated in FIG. 12E, operation 1259 may include or may involve one or more operations in various alternative implementations. For example, in some implementations, operation 1259 may include an operation 1260 for selecting the second one or more formats from a plurality of formats available for application on the one or more persistent augmentations. For instance, the format selecting module 826 (see FIG. 8A) of the AR device 70* of FIG. 7A or 7B selecting the second one or more formats from a plurality of formats 170 (e.g., as stored in, for example, memory 114) available for application on the one or more persistent augmentations.

In the same or different implementations, operation 1259 may additionally or alternatively include an operation 1261 for selecting the second one or more formats based on a determination of the one or more user activities including at least one user recreational or leisure activity. For instance, the format selecting module 826 (see FIG. 8A) of the AR device 70* of FIG. 7A or 7B selecting the second one or more formats based on a determination by the user activity determining module 828 of the one or more user activities including at least one user recreational or leisure activity (e.g., shopping, laying out in the sun, boating, relaxing at home). For example, based on visual cues (e.g., detected scenes of stores and store signs, scenes that include items typically found in a home such as a wall painting or photo) detected in the actual view or views of the AR device 70* as well as GPS data may suggest or infer that the AR device user is shopping or at home.

In the same or different implementations, operation 1259 may additionally or alternatively include an operation 1262 for selecting the second one or more formats based on a determination of the one or more user activities including at least one athletic activity. For instance, the format selecting module 826 (see FIG. 8A) of the AR device 70* of FIG. 7A or 7B selecting the second one or more formats based on a determination by the user activity determining module 828 of the one or more user activities including at least one athletic activity. For example, based on visual cues (e.g., a portion of a bicycle or one or more objects passing through the field of view of the AR device 70* within a range of particular speeds) detected in the actual view or views of the AR device 70* as well as audio data (e.g., heavy breathing of the AR device user) may suggest or infer that the AR device user is exercising using her bicycle. Of course, if the rate of respiration or breathing is detected as being relatively slow, this may suggest that the AR user is riding her bicycle for transportation or leisure purposes only and not for exercise. Based on such a determination, an appropriate format may be selected for formatting a time augmentation (e.g., a stop watch/timer formatting, a sundial, and so forth).

In the same or different implementations, operation 1259 may additionally or alternatively include an operation 1263 for selecting the second one or more formats based on a determination of the one or more user activities including at least one vehicle operating activity. For instance, the format selecting module 826 (see FIG. 8A) of the AR device 70* of FIG. 7A or 7B selecting the second one or more formats based on a determination by the user activity determining module 828 of the one or more user activities including at least one vehicle operating activity. The determination of a vehicle operating activity may be based on a number of factors including GPS data, visual cues (e.g., view of speedometer), audio cues (e.g., sound of engine or a car moving along a road), and so forth.

In the same or different implementations, operation 1259 may additionally or alternatively include an operation 1264 for selecting the second one or more formats based on a determination of the one or more user activities including at least one personal, religious, or cultural activity. For instance, the format selecting module 826 (see FIG. 8A) of the AR device 70* of FIG. 7A or 7B selecting the second one or more formats based on a determination by the user activity determining module 828 of the one or more user activities including at least one personal, religious, or cultural activity.

In the same or different implementations, operation 1259 may additionally or alternatively include an operation 1265 for selecting the second one or more formats based on a determination of the one or more user activities including at least one academic activity. For instance, the format selecting module 826 (see FIG. 8A) of the AR device 70* of FIG. 7A or 7B selecting the second one or more formats based on a determination by the user activity determining module 828 of the one or more user activities including at least one academic activity (e.g., a classroom or lecture, a test, and so forth).

In the same or different implementations, operation 1259 may additionally or alternatively include an operation 1266 for selecting the second one or more formats based on a determination of the one or more user activities including at least one professional or labor activity. For instance, the format selecting module 826 (see FIG. 8A) of the AR device 70* of FIG. 7A or 7B selecting the second one or more formats based on a determination by the user activity determining module 828 of the one or more user activities including at least one professional or labor (e.g., employment) activity.

In some cases, the second one or more formats of the one or more persistent augmentations to be presented through the second augmented view presenting operation 906 of FIG. 9 may be solicited from a third party (who is not the AR device user) or a server associated with the third party. For example, and turning now to FIG. 12F, in some implementations, the second augmented view presenting operation 906 of FIG. 9 may include or involve an operation 1267 for presenting a second augmented view including the one or more persistent augmentations in a second one or more formats, the second one or more formats having been solicited in response, at least in part, to said obtaining of the actual view of the second scene. For instance, the augmented view presenting module 102* of FIG. 7A or 7B including a format soliciting module 830 (see FIG. 8A) presenting a second augmented view including the one or more persistent augmentations in a second one or more formats, the second one or more formats having been solicited by the format soliciting module 830 in response, at least in part, to said obtaining by the actual view obtaining module 104* of the actual view of the second scene.

Figure 12F:
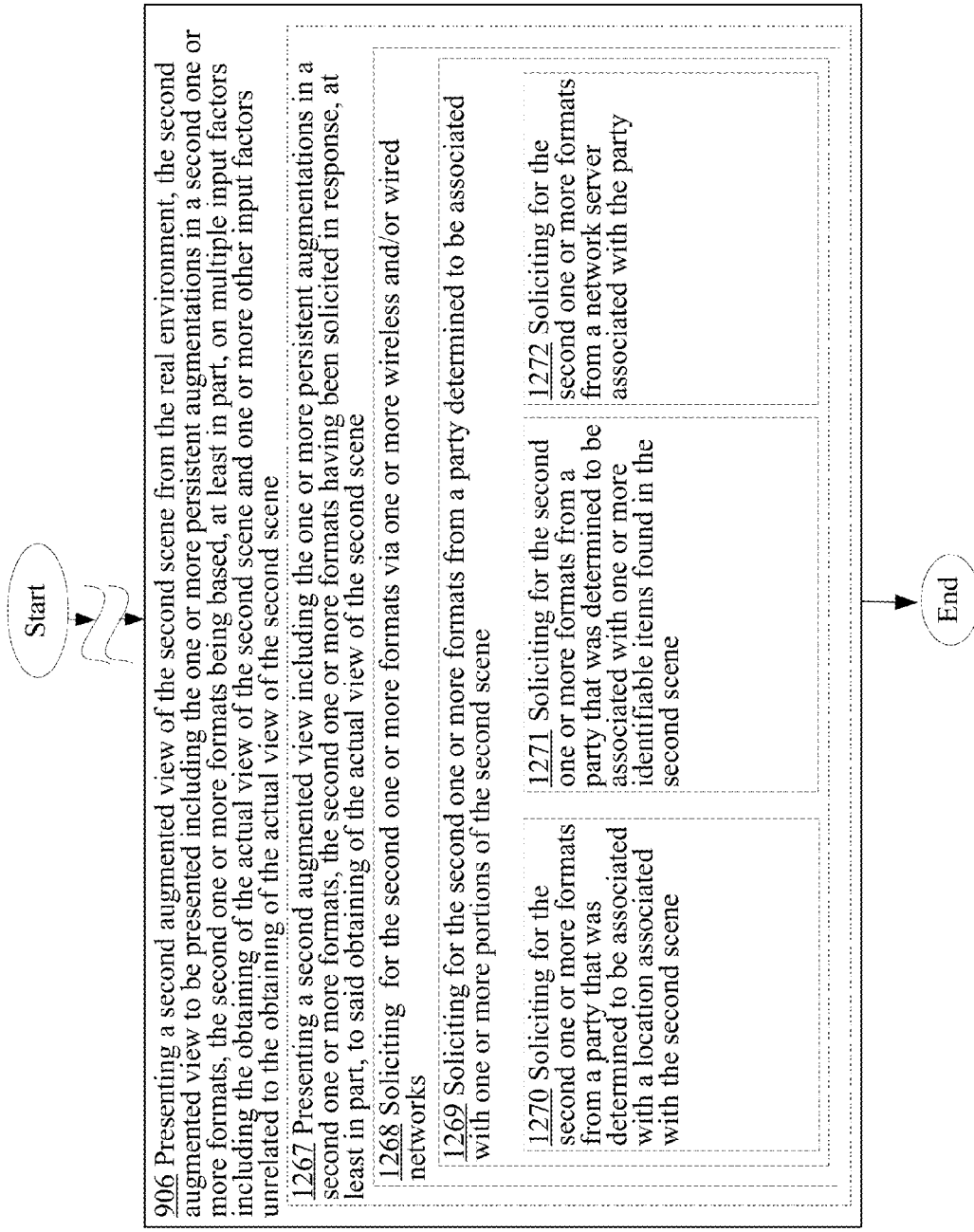
FIG. 12F is a high-level logic flowchart of a process depicting alternate implementations of the second augmented view presenting operation 906 of FIG. 9.

As further illustrated in FIG. 12F, in various implementations operation 1267 may include one or more additional operations including an operation 1268 for soliciting for the second one or more formats via one or more wireless and/or wired networks. For instance, the format soliciting module 830 of the AR device 70* of FIG. 7A or 7B soliciting for the second one or more formats via one or more wireless and/or wired networks (e.g., a cellular telephone or data network, a wireless local area network (WLAN), a wireless wide area network or WAN, a public switched telephone network (PTSN), and/or other types of network).

In some implementations, operation 1268 may include or involve an operation 1269 for soliciting for the second one or more formats from a party determined to be associated with one or more portions of the second scene. For instance, the format soliciting module 830 of the AR device 70* of FIG. 7A or 7B soliciting the second one or more formats from a party (e.g., a business) that was determined by the associated party determining module 832 to be associated with one or more portions (e.g., a store or a shopping mall) of the second scene. For example, when the identifiable features (e.g., a name, a logo, a particular audio or architectural cue, and so forth) of a store or mall is detected in an actual scene of the real environment that is captured by, for example the AR device 70* of FIG. 7A or 7B, then the party or parties associated with the store or mall may be quickly determined. After identifying the one or more parties associated with the store or mall, the one or more identified parties may be solicited for the one or more second formats that may be applied to the one or more persistent augmentations for presenting in the second augmented view.

In some cases, operation 1269 may include or involve an operation 1270 for soliciting for the second one or more formats from a party that was determined to be associated with a location associated with the second scene. For instance, the format soliciting module 830 of the AR device 70* of FIG. 7A or 7B soliciting for the second one or more formats from a party (e.g., a person, a business, an organization, an academic institution, and so forth) that was determined by the associated party determining module 832 to be associated with a location (e.g., a house, a business such as a resort or retail store) associated with the second scene.

In the same or different implementations, operation 1269 may include or involve an operation 1271 for soliciting for the second one or more formats from a party that was determined to be associated with one or more identifiable items found in the second scene. For instance, the format soliciting module 830 of the AR device 70* of FIG. 7A or 7B soliciting for the second one or more formats from a party that was determined by an item finding module 806 to be associated with one or more identifiable items (e.g., an automobile or a portion thereof, an image, a logo, a sign, and so forth) found in the second scene.

In the same or different implementations, operation 1269 may include or involve an operation 1272 for soliciting for the second one or more formats from a network server associated with the party. For instance, the format soliciting module 830 of the AR device 70* of FIG. 7A or 7B soliciting for the second one or more formats from a network server associated with the party (e.g., a business entity, a public or private organization or institution such as a school or a church, an individual, and so forth) who was determined to be associated with the one or more portions of the second scene.

Figure 12G:
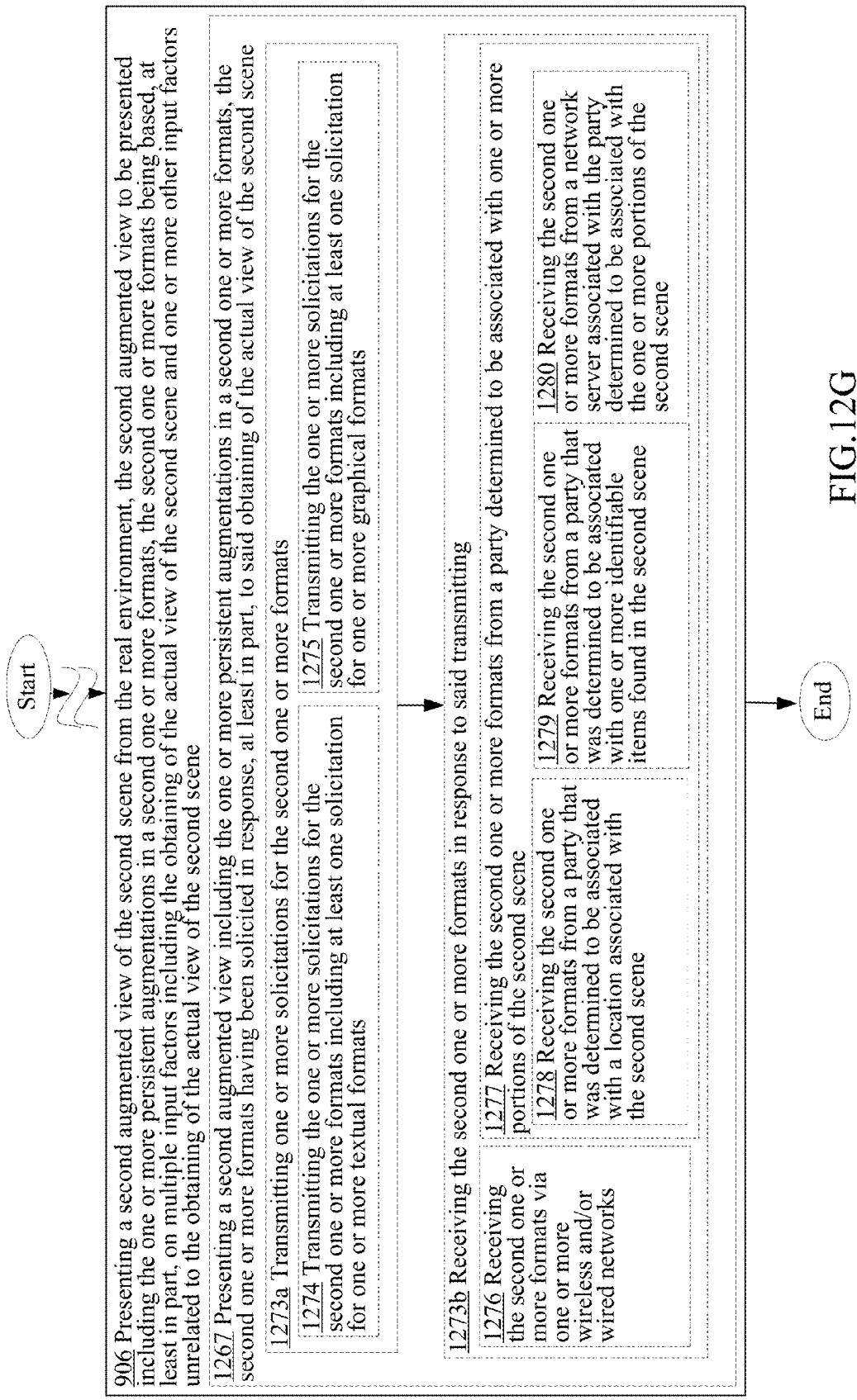
FIG. 12G is a high-level logic flowchart of a process depicting alternate implementations of the second augmented view presenting operation 906 of FIG. 9.

In various implementations, the second one or more formats solicited in operation 1267 of FIG. 12F may actually involve an operation 1273a for transmitting one or more solicitations for the second one or more formats and an operation 1273b for receiving the second one or more formats in response to said transmitting as illustrated in FIG. 12G. For instance, the format solicitation transmitting module 834 (see FIG. 8A) of the AR device 70* of FIG. 7A or 7B transmitting one or more solicitations for the second one or more formats and the format receiving module 835 (see FIG. 8A) of the AR device 70* of FIG. 7A or 7B receiving the second one or more formats in response to said transmitting of the one or more solicitations. In various embodiments, the transmission of the one or more solicitations for the second one or more formats may involve the transmission of the one or more solicitations to one or more third parties (or their servers) who were determined to be associated with at least one or more portions of the actual view of the second scene of the real environment.

As will be further described herein and as further illustrated in FIG. 12G, operation 1273a and 1273b may be implemented in a number of different ways in various alternative implementations. For example, in some implementations, operation 1273a may include or involve an operation 1274 for transmitting the one or more solicitations for the second one or more formats including at least one solicitation for one or more textual formats. For instance, the format solicitation transmitting module 834 (see FIG. 8A) of the AR device 70* of FIG. 7A or 7B transmitting the one or more solicitations for the second one or more formats including at least one solicitation for one or more textual formats.

In the same or different implementations, operation 1273a may include or involve an operation 1275 for transmitting the one or more solicitations for the second one or more formats including at least one solicitation for one or more graphical formats. For instance, the format solicitation transmitting module 834 (see FIG. 8A) of the AR device 70* of FIG. 7A or 7B transmitting the one or more solicitations for the second one or more formats including at least one solicitation for one or more graphical formats.

As further illustrated in FIG. 12G, operation 1273b for receiving the second one or more formats in response to said transmitting may include one or more additional operations in various alternative implementations. For example, in some implementations, operation 1273b may include an operation 1276 for receiving the second one or more formats via one or more wireless and/or wired networks. For instance, the format receiving module 835 (see FIG. 8A) of the AR device 70* of FIG. 7A or 7B receiving the second one or more formats via one or more wireless and/or wired networks (e.g., WLAN, WiMAX, wireless WAN (wide area network), PAN (personal area network), Cellular network, PTSN, and so forth).

In the same or different implementations, operation 1273b may additionally or alternatively include an operation 1277 for receiving the second one or more formats from a party determined to be associated with one or more portions of the second scene. For instance, the format receiving module 835 including an associated party determining module 832 (see FIG. 8A) of the AR device 70* of FIG. 7A or 7B receiving the second one or more formats from a party determined by the associated party determining module 832 to be associated with one or more portions of the second scene (e.g., one or more visual cues in the second scene).

As further illustrated in FIG. 12G, in various implementations operation 1277 may include an operation for 1278 for receiving the second one or more formats from a party that was determined to be associated with a location associated with the second scene. For instance, the format receiving module 835 including the associated party determining module 832 (see FIG. 8A) of the AR device 70* of FIG. 7A or 7B receiving the second one or more formats from a party that was determined by the associated party determining module 832 to be associated with a location associated with the second scene.

In the same or different implementations, operation 1277 may additionally or alternatively include an operation 1279 for receiving the second one or more formats from a party that was determined to be associated with one or more identifiable items found in the second scene. For instance, the format receiving module 835 including the associated party determining module 832 (see FIG. 8A) of the AR device 70* of FIG. 7A or 7B receiving the second one or more formats from a party that was determined by the associated party determining module 832 to be associated with one or more identifiable items (e.g., a sign, a particular building or structure, and so forth) found in the second scene (e.g., as found by, for example, the item finding module 806 of the AR device 70* of FIG. 7A or 7B—see FIG. 8A).

In the same or different implementations, operation 1277 may additionally or alternatively include an operation 1280 for receiving the second one or more formats from a network server associated with the party determined to be associated with the one or more portions of the second scene. For instance, the format receiving module 835 of the AR device 70* of FIG. 7A or 7B receiving the second one or more formats from a network server associated with the party determined to be associated with the one or more portions of the second scene.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   presenting, by one or more processors of an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, wherein said presenting, by one or more processors, a first augmented view of a first scene from a real environment, comprises:
   presenting, by the one or more processors of the augmented reality device, a first augmented view that includes one or more persistent augmentations that do not depend on, for their existence in the first augmented view, the presence of the one or more visual cues in the actual view of the first scene and that do not depend on, for their existence in the first augmented view, location and orientation of the augmented reality device;
   obtaining, by the one or more processors of the augmented reality device, an actual view of a second scene from the real environment, the actual view of the second scene being different from the actual view of the first scene; and
   presenting, by the one or more processors of the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene, wherein said presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:
   presenting a second augmented view including the one or more persistent augmentations in a second one or more formats, the second one or more formats having been solicited in response, at least in part, to said obtaining of the actual view of the second scene.

2. A computationally-implemented system, comprising:
   means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, wherein said means for presenting, by an augmented realty device, a first augmented view of a first scene from a real environment, comprises:
   means for presenting, by the augmented reality device, a first augmented view that includes one or more persistent augmentations that do not depend on, for their existence in the first augmented view, the presence of the one or more visual cues in the actual view of the first scene and that do not depend on, for their existence in the first augmented view, location and orientation of the augmented reality device;
   means for obtaining, by the augmented reality device, an actual view of a second scene from the real environment, the actual view of the second scene being different from the actual view of the first scene; and
   means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting a second augmented view including the one or more persistent augmentations in a second one or more formats, the second one or more formats having been solicited in response, at least in part, to said obtaining of the actual view of the second scene.

3. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view that includes the one or more persistent augmentations in the first one or more formats by presenting a first augmented view that includes the one or more persistent augmentations and one or more non-persistent augmentations, the inclusion of the one or more non-persistent augmentations in the first augmented view being dependent on the presence of the one or more visual cues and/or presence of another one or more visual cues in the actual view of the first scene from the real environment.

4. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view including the one or more persistent augmentations by presenting a first augmented view that includes the one or more persistent augmentations disposed at one or more preselected locations of the first augmented view.

5. The computationally-implemented system of claim 4, wherein said means for presenting the first augmented view including the one or more persistent augmentations by presenting a first augmented view that includes the one or more persistent augmentations disposed at one or more preselected locations of the first augmented view comprises:

means for presenting the first augmented view that includes the one or more persistent augmentations disposed at the one or more preselected locations of the first augmented view by presenting a first augmented view that includes the one or more persistent augmentations disposed at the one or more preselected locations of the first augmented view, the one or more preselected locations of the first augmented view where the one or more persistent augmentations are to be disposed being independent of presence of one or more visual cues to be presented through the first augmented view.

6. The computationally-implemented system of claim 4, wherein said means for presenting the first augmented view including the one or more persistent augmentations by presenting a first augmented view that includes the one or more persistent augmentations disposed at one or more preselected locations of the first augmented view comprises:

means for presenting the first augmented view that includes the one or more persistent augments disposed at the one or more preselected locations of the first augmented view by presenting a first augmented view that includes the one or more persistent augmentations disposed at the one or more preselected locations of the first augmented view, the one or more preselected locations of the first augmented view where the one or more persistent augmentations are to be disposed being independent of absence of one or more visual cues to be presented through the first augmented view.

7. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view including the one or more persistent augmentations in the first one or more formats by at least presenting a first augmented view that includes one or more persistent textual augmentations, the inclusion of the one or more persistent textual augmentations in the first augmented view being independent of presence of one or more visual cues in the actual view of the first scene from the real environment.

8. The computationally-implemented system of claim 7, wherein said means for presenting the first augmented view including the one or more persistent augmentations in the first one or more formats by at least presenting a first augmented view that includes one or more persistent textual augmentations, the inclusion of the one or more persistent textual augmentations in the first augmented view being independent of presence of one or more visual cues in the actual view of the first scene from the real environment comprises:

means for presenting the first augmented view including the one or more persistent textual augmentations by at least presenting a first augmented view that includes one or more persistent dynamic textual augmentations, the one or more persistent dynamic textual augmentations being one or more persistent alphabetical and/or numerical augmentations that dynamically changes with respect to one or more factors other than those related to the actual view of the first scene.

9. The computationally-implemented system of claim 8, wherein said means for presenting the first augmented view including the one or more persistent textual augmentations by at least presenting a first augmented view that includes one or more persistent dynamic textual augmentations, the one or more persistent dynamic textual augmentations being one or more persistent alphabetical and/or numerical augmentations that dynamically changes with respect to one or more factors other than those related to the actual view of the first scene comprises:

means for presenting the first augmented view including the one or more persistent dynamic textual augmentations by presenting a first augmented view that includes one or more persistent dynamic textual augmentations that content-wise at least dynamically changes over time.

10. The computationally-implemented system of claim 8, wherein said means for presenting the first augmented view including the one or more persistent textual augmentations by at least presenting a first augmented view that includes one or more persistent dynamic textual augmentations, the one or more persistent dynamic textual augmentations being one or more persistent alphabetical and/or numerical augmentations that dynamically changes with respect to one or more factors other than those related to the actual view of the first scene comprises:

means for presenting the first augmented view including the one or more persistent dynamic textual augmentations by presenting a first augmented view that includes one or more persistent dynamic textual augmentations that content-wise at least dynamically changes in response to receiving an electronic message or electronic communication.

11. The computationally-implemented system of claim 8, wherein said means for presenting the first augmented view including the one or more persistent textual augmentations by at least presenting a first augmented view that includes one or more persistent dynamic textual augmentations, the one or more persistent dynamic textual augmentations being one or more persistent alphabetical and/or numerical augmentations that dynamically changes with respect to one or more factors other than those related to the actual view of the first scene comprises:

means for presenting the first augmented view including the one or more persistent dynamic textual augmentations by presenting a first augmented view that includes one or more persistent dynamic textual augmentations that content-wise at least dynamically changes in response to sensor provided data.

12. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view including the one or more persistent augmentations in the first one or more formats by at least presenting a first augmented view that includes one or more persistent graphical augmentations, the inclusion of the one or more persistent graphical augmentations in the first augmented view being independent of presence of one or more visual cues in the actual view of the first scene from the real environment.

13. The computationally-implemented system of claim 12, wherein said means for presenting the first augmented view including the one or more persistent augmentations in the first one or more formats by at least presenting a first augmented view that includes one or more persistent graphical augmentations, the inclusion of the one or more persistent graphical augmentations in the first augmented view being independent of presence of one or more visual cues in the actual view of the first scene from the real environment comprises:

means for presenting the first augmented view including the one or more persistent graphical augmentations by at least presenting a first augmented view that includes one or more persistent dynamic graphical augmentations, the one or more persistent dynamic graphical augmentations being one or more persistent animated image augmentations that dynamically changes with respect to one or more factors other than those related to the actual view of the first scene.

14. The computationally-implemented system of claim 13, wherein said means for presenting the first augmented view including the one or more persistent graphical augmentations by at least presenting a first augmented view that includes one or more persistent dynamic graphical augmentations, the one or more persistent dynamic graphical augmentations being one or more persistent animated image augmentations that dynamically changes with respect to one or more factors other than those related to the actual view of the first scene comprises:

means for presenting the first augmented view including the one or more persistent dynamic graphical augmentations by presenting a first augmented view that includes one or more persistent dynamic graphical augmentations that dynamically changes over time.

15. The computationally-implemented system of claim 13, wherein said means for presenting the first augmented view including the one or more persistent graphical augmentations by at least presenting a first augmented view that includes one or more persistent dynamic graphical augmentations, the one or more persistent dynamic graphical augmentations being one or more persistent animated image augmentations that dynamically changes with respect to one or more factors other than those related to the actual view of the first scene comprises:

means for presenting the first augmented view including the one or more persistent dynamic graphical augmentations by presenting a first augmented view that includes the one or more persistent dynamic graphical augmentations that content-wise at least dynamically changes in response to receiving an electronic message or electronic communication.

16. The computationally-implemented system of claim 13, wherein said means for presenting the first augmented view including the one or more persistent graphical augmentations by at least presenting a first augmented view that includes one or more persistent dynamic graphical augmentations, the one or more persistent dynamic graphical augmentations being one or more persistent animated image augmentations that dynamically changes with respect to one or more factors other than those related to the actual view of the first scene comprises:

means for presenting the first augmented view including the one or more persistent dynamic graphical augmentations by presenting a first augmented view that includes one or more persistent dynamic graphical augmentations that content-wise at least dynamically changes in response to sensor provided data.

17. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view including the one or more persistent augmentations that are independent of the presence of the one or more visual cues in the actual view of the first scene for their inclusion in the first augmented view by at least presenting a first augmented view that includes one or more persistent augmentations that do not rely on the presence of one or more particular visual cues in the actual view of the first scene to exist in the first augmented view.

18. The computationally-implemented system of claim 2, wherein said means for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment comprises:

means for presenting the first augmented view including the one or more persistent augmentations that are, for their inclusion in the first augmented view, independent of presence of one or more visual cues in the actual view of the first scene by at least presenting a first augmented view that includes one or more persistent augmentations that belong to a type of augmentation that was selected by a user for presentation in multiple augmented views of multiple scenes from the real environment.

19. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to detecting that the second scene from the real environment is different from the first scene from the real environment.

20. The computationally-implemented system of claim 19, wherein said means for presenting the second augmented view including the one or more persistent augmentations in the second one or more formats in response, at least in part, to detecting that the second scene from the real environment is different from the first scene from the real environment comprises:

means for detecting that the second scene from the real environment is different from the first scene from the real environment by at least finding one or more items in the second scene that were not found in the first scene from the real environment.

21. The computationally-implemented system of claim 20, wherein said means for detecting that the second scene from the real environment is different from the first scene from the real environment by at least finding one or more items in the second scene that were not found in the first scene from the real environment comprises:

means for finding the one or more items in the second scene that were not found in the first scene from the real environment by finding at least one or more office items in the second scene that were not found in the first scene from the real environment.

22. The computationally-implemented system of claim 20, wherein said means for detecting that the second scene from the real environment is different from the first scene from the real environment by at least finding one or more items in the second scene that were not found in the first scene from the real environment comprises:

means for finding the one or more items in the second scene that were not found in the first scene from the real environment by finding at least one or more natural landscape items in the second scene that were not present in the first scene from the real environment.

23. The computationally-implemented system of claim 20, wherein said means for detecting that the second scene from the real environment is different from the first scene from the real environment by at least finding one or more items in the second scene that were not found in the first scene from the real environment comprises:

means for finding the one or more items in the second scene that were not found in the first scene from the real environment by finding at least one or more interior items of a transportation vehicle in the second scene that were not present in the first scene from the real environment.

24. The computationally-implemented system of claim 20, wherein said means for detecting that the second scene from the real environment is different from the first scene from the real environment by at least finding one or more items in the second scene that were not found in the first scene from the real environment comprises:

means for finding the one or more items in the second scene that were not found in the first scene from the real environment by finding at least one or more identifiable faces of one or more persons in the second scene that were not present in the first scene from the real environment.

25. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to audio input data.

26. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to location and/or orientation data.

27. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to movement data.

28. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to user physiological data.

29. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to eye tracking and/or eye gaze data.

30. The computationally-implemented system of claim 2, wherein said means for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting the second augmented view including the one or more persistent augmentations in the second one or more formats in response, at least in part, to personal information manager (PIM) data.

31. The computationally-implemented system of claim 2, wherein said means for presenting, by the augmented reality device a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:

means for presenting a second augmented view including the one or more persistent augmentations in a second one or more formats, the second one or more formats to be applied to the one or more persistent augmentations being selected based on a determination of one or more user activities as inferred by the multiple input factors.

32. The computationally-implemented system of claim 31, wherein said means for presenting a second augmented view including the one or more persistent augmentations in a second one or more formats, the second one or more formats to be applied to the one or more persistent augmentations being selected based on a determination of one or more user activities as inferred by the multiple input factors comprises:

means for selecting the second one or more formats based on a determination of the one or more user activities including at least one user recreational or leisure activity.

33. The computationally-implemented system of claim 31, wherein said means for presenting a second augmented view including the one or more persistent augmentations in a second one or more formats, the second one or more formats to be applied to the one or more persistent augmentations being selected based on a determination of one or more user activities as inferred by the multiple input factors comprises:

means for selecting the second one or more formats based on a determination of the one or more user activities including at least one athletic activity.

34. The computationally-implemented system of claim 31, wherein said means for presenting a second augmented view including the one or more persistent augmentations in a second one or more formats, the second one or more formats to be applied to the one or more persistent augmentations being selected based on a determination of one or more user activities as inferred by the multiple input factors comprises:

means for selecting the second one or more formats based on a determination of the one or more user activities including at least one vehicle operating activity.

35. The computationally-implemented system of claim 31, wherein said means for presenting a second augmented view including the one or more persistent augmentations in a second one or more formats, the second one or more formats to be applied to the one or more persistent augmentations being selected based on a determination of one or more user activities as inferred by the multiple input factors comprises:

means for selecting the second one or more formats based on a determination of the one or more user activities including at least one academic activity.

36. The computationally-implemented system of claim 2 wherein said means for presenting a second augmented view including the one or more persistent augmentations in a second one or more formats, the second one or more formats having been solicited in response, at least in part, to said obtaining of the actual view of the second scene comprises:

means for soliciting for the second one or more formats via one or more wireless and/or wired networks.

37. The computationally-implemented system of claim 36, wherein said means for soliciting for the second one or more formats via one or more wireless and/or wired networks comprises:

means for soliciting for the second one or more formats from a party determined to be associated with one or more portions of the second scene.

38. The computationally-implemented system of claim 37, wherein said means for soliciting for the second one or more formats from a party determined to be associated with one or more portions of the second scene comprises:
    means for soliciting for the second one or more formats from a party that was determined to be associated with a location associated with the second scene.

39. The computationally-implemented system of claim 37, wherein said means for soliciting for the second one or more formats from a party determined to be associated with one or more portions of the second scene comprises:
    means for soliciting for the second one or more formats from a party that was determined to be associated with one or more visual identifiable items visually found in the second scene.

40. The computationally-implemented system of claim 37, wherein said means for soliciting for the second one or more formats from a party determined to be associated with one or more portions of the second scene comprises:
    means for soliciting for the second one or more formats from a network server associated with the party.

41. A system comprising:
    circuitry for presenting, by an augmented reality device, a first augmented view of a first scene from a real environment, the first augmented view to be presented including one or more persistent augmentations in a first one or more formats, and the first augmented view to be presented being generated, at least in part, by augmenting an actual view of the first scene from the real environment to include at least the one or more persistent augmentations, the inclusion of the one or more persistent augmentations in the first augmented view being independent of presence of one or more visual cues in the actual view of the first scene from the real environment, wherein said means for presenting, by an augmented realty device, a first augmented view of a first scene from a real environment, comprises:
        circuitry for presenting, by the augmented reality device, a first augmented view that includes one or more persistent augmentations that do not depend on, for their existence in the first augmented view, the presence of the one or more visual cues in the actual view of the first scene and that do not depend on, for their existence in the first augmented view, location and orientation of the augmented reality device;
    circuitry for obtaining, by the augmented reality device, an actual view of a second scene from the real environment, the actual view of the second scene being different from the actual view of the first scene; and
    circuitry for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene, wherein said circuitry for presenting, by the augmented reality device, a second augmented view of the second scene from the real environment, the second augmented view to be presented including the one or more persistent augmentations in a second one or more formats, the second one or more formats being based, at least in part, on multiple input factors including the obtaining of the actual view of the second scene and one or more other input factors unrelated to the obtaining of the actual view of the second scene comprises:
        circuitry for presenting a second augmented view including the one or more persistent augmentations in a second one or more formats, the second one or more formats having been solicited in response, at least in part, to said obtaining of the actual view of the second scene.

\* \* \* \* \*